(12) United States Patent
Woo et al.

(10) Patent No.: US 7,932,988 B2
(45) Date of Patent: Apr. 26, 2011

(54) LAYOUT OF LIQUID CRYSTAL DISPLAY PANELS AND SIZE OF MOTHER SUBSTRATE

(75) Inventors: Sang Soo Woo, Daegu-si (KR); Kwang Il Jeong, Gumi-si (KR); Gi Soo Nam, Gyeongsangbuk-do (KR); Myung Woo Nam, Gyeongsangbuk-do (KR); Hyun Jee Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 738 days.

(21) Appl. No.: 11/606,395

(22) Filed: Nov. 30, 2006

(65) Prior Publication Data
US 2007/0206149 A1 Sep. 6, 2007

Related U.S. Application Data

(63) Continuation-in-part of application No. 10/819,350, filed on Apr. 7, 2004, now Pat. No. 7,414,695.

(30) Foreign Application Priority Data

Apr. 7, 2003 (KR) .................................. 2003-21759

(51) Int. Cl.
*G02F 1/13* (2006.01)

(52) U.S. Cl. .......................................... 349/187; 438/30

(58) Field of Classification Search .................. 349/187; 438/30
See application file for complete search history.

(56) References Cited

U.S. PATENT DOCUMENTS

| 5,739,888 | A | 4/1998 | Ogura et al. |
| 6,654,084 | B1 | 11/2003 | Marukawa et al. |
| 2002/0197421 | A1* | 12/2002 | Yamazaki et al. ............. 428/1.1 |
| 2005/0237466 | A1 | 10/2005 | Chung et al. |

FOREIGN PATENT DOCUMENTS

| CN | 1165312 | 11/1997 |
| CN | 1355896 | 6/2002 |
| CN | 1397822 | 2/2003 |
| CN | 1447152 | 10/2003 |

* cited by examiner

*Primary Examiner* — Michael H Caley
(74) *Attorney, Agent, or Firm* — McKenna Long & Aldridge LLP

(57) ABSTRACT

A layout of LCD panels and a size of the mother substrate are disclosed, to improve the efficiency in arrangement of the LCD panels, and to maximize the substrate efficiency, the layout comprising a mother substrate; a dummy region of 15 mm or less in a periphery of the mother substrate; and six LCD panels of the 26-inch model in a matrix of 2×3 on the mother substrate excluding the dummy region with a margin corresponding to 2 ~4% of a length of the LCD panel.

4 Claims, 73 Drawing Sheets

Dummy region : 15mm

Margin : 0.3 ~ 4%

| Size | Picture ratio | Mode | Diagonal length | Panel size(TFT) | | X | | Y | |
|---|---|---|---|---|---|---|---|---|---|
| | | | | H(mm) | V(mm) | 90% | 100% | 90% | 100% |
| 23WX | 16:9 | IPS | 22.95 | 523.7 | 302.7 | 1206 | 1085 | 1387 | 1248 |
| 26WX | 16:9 | IPS | 26.0 | 590.9 | 341.5 | 1353 | 1218 | 1555 | 1399 |
| 32WX | 16:9 | IPS | 31.5 | 715.0 | 413.0 | 1630 | 1467 | 1873 | 1686 |
| 37WU | 16:9 | IPS | 37.0 | 846.0 | 485.2 | 1923 | 1730 | 2195 | 1976 |
| 40WU | 16:9 | IPS | 39.8 | 906.2 | 521.4 | 2057 | 1851 | 2356 | 2121 |
| 42WU | 16:9 | IPS | 42.0 | 956.0 | 549.0 | 2168 | 1952 | 2479 | 2231 |
| 46WU | 16:9 | IPS | 46.1 | 1043.0 | 600.5 | 2363 | 2126 | 2709 | 2438 |
| 47WU | 16:9 | IPS | 47.0 | 1065.0 | 610.5 | 2412 | 2171 | 2753 | 2478 |
| 49WU | 16:9 | IPS | 49.0 | 1115.6 | 640.9 | 2525 | 2272 | 2889 | 2600 |
| 50WU | 16:9 | IPS | 49.7 | 1127.5 | 646.5 | 2551 | 2296 | 2914 | 2622 |
| 52WU | 16:9 | IPS | 52.0 | 1174.5 | 670.5 | 2656 | 2391 | 3021 | 2719 |
| 55WU | 16:9 | IPS | 54.6 | 1233.0 | 710.0 | 2787 | 2508 | 3197 | 2877 |
| 65WU | 16:10 | IPS | 65.0 | 1476.0 | 846.0 | 3330 | 2997 | 3803 | 3422 |

Dummy resion : 15mm

Margin : 0.3 ~ 4 %

| Size | Picture ratio | Mode | Diagonal length | Panel size(TFT) | | Y | | X | |
|---|---|---|---|---|---|---|---|---|---|
| | | | | H(mm) | V(mm) | 90% | 100% | 90% | 100% |
| 23WX | 16:9 | IPS | 22.95 | 523.7 | 302.7 | 1206 | 1085 | 1049 | 994 |
| 26WX | 16:9 | IPS | 26.0 | 590.9 | 341.5 | 1353 | 1218 | 1175 | 1058 |
| 32WX | 16:9 | IPS | 31.5 | 715.0 | 413.0 | 1630 | 1467 | 1415 | 1273 |
| 37WU | 16:9 | IPS | 37.0 | 846.0 | 485.2 | 1923 | 1730 | 1656 | 1490 |
| 40WU | 16:9 | IPS | 39.8 | 906.2 | 521.4 | 2057 | 1851 | 1777 | 1599 |
| 42WU | 16:9 | IPS | 42.0 | 956.0 | 549.0 | 2168 | 1952 | 1869 | 1682 |
| 46WU | 16:9 | IPS | 46.1 | 1043.0 | 600.5 | 2363 | 2126 | 2042 | 1838 |
| 47WU | 16:9 | IPS | 47.0 | 1065.0 | 610.5 | 2412 | 2171 | 2075 | 1868 |
| 49WU | 16:9 | IPS | 49.0 | 1115.6 | 640.9 | 2525 | 2272 | 2177 | 1959 |
| 50WU | 16:9 | IPS | 49.7 | 1127.5 | 646.5 | 2551 | 2296 | 2196 | 1976 |
| 52WU | 16:9 | IPS | 52.0 | 1174.5 | 670.5 | 2656 | 2391 | 2276 | 2048 |
| 55WU | 16:9 | IPS | 54.6 | 1233.0 | 710.0 | 2787 | 2508 | 2408 | 2167 |
| 65WU | 16:10 | IPS | 65.0 | 1476.0 | 846.0 | 3330 | 2997 | 2863 | 2576 |

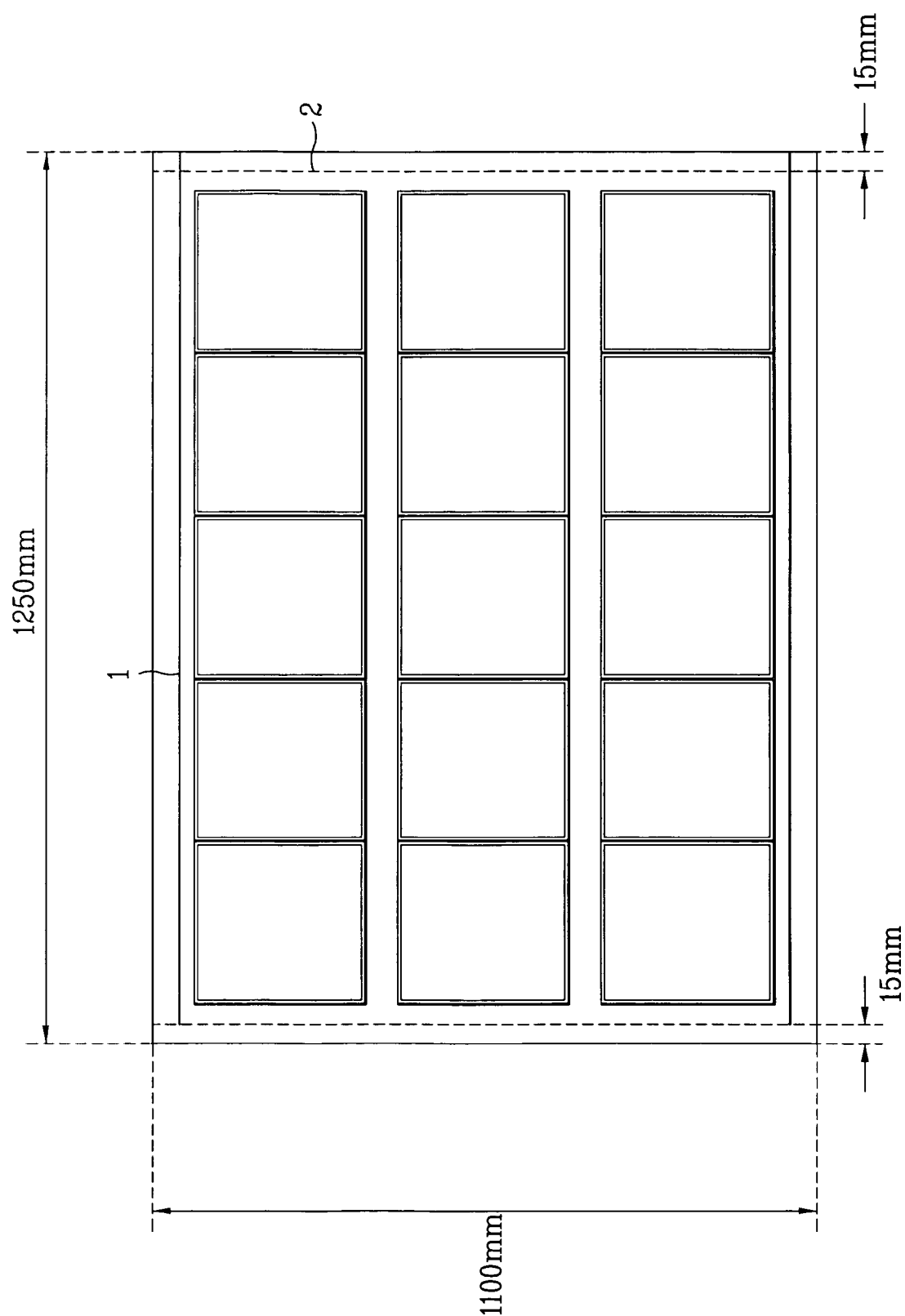

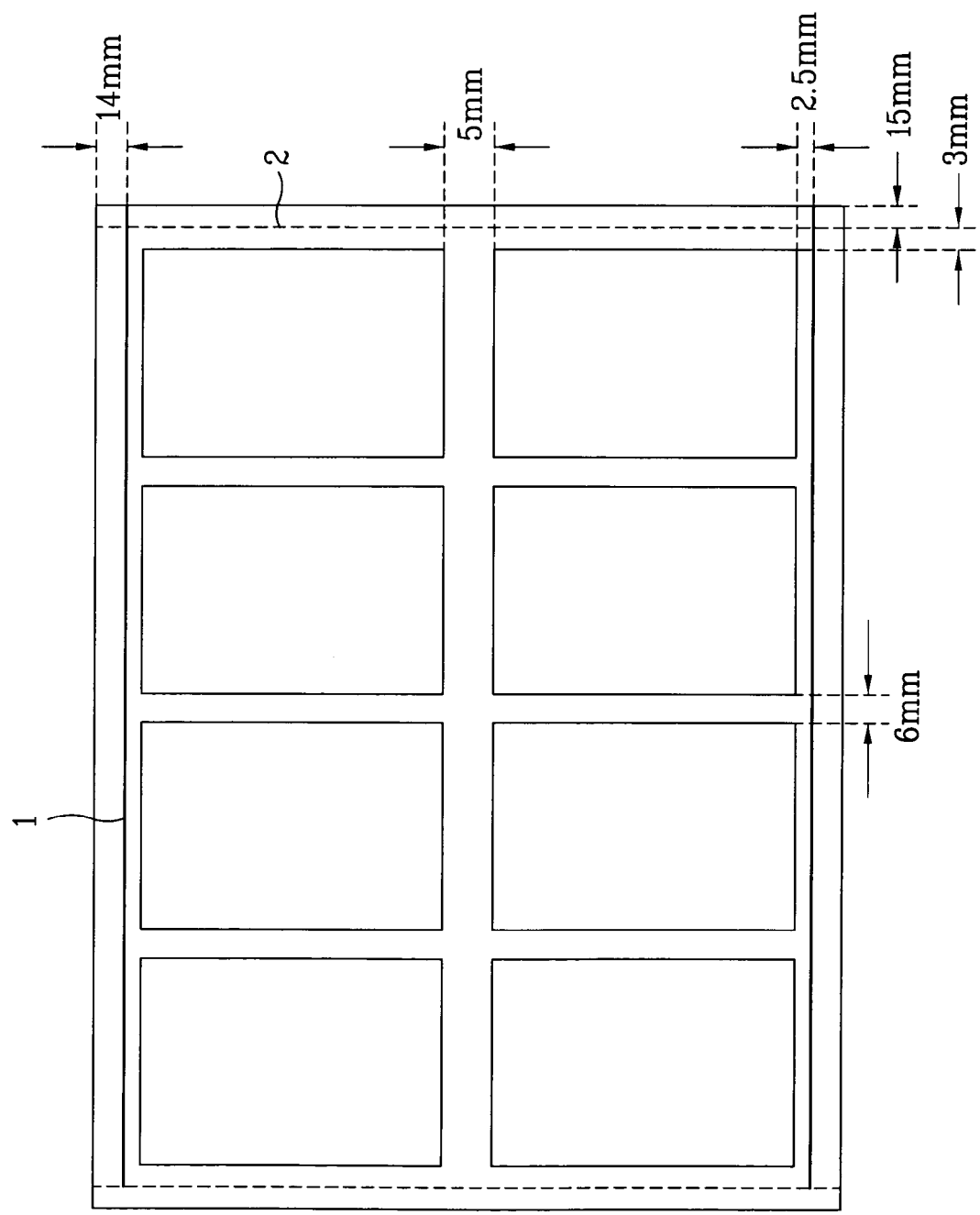

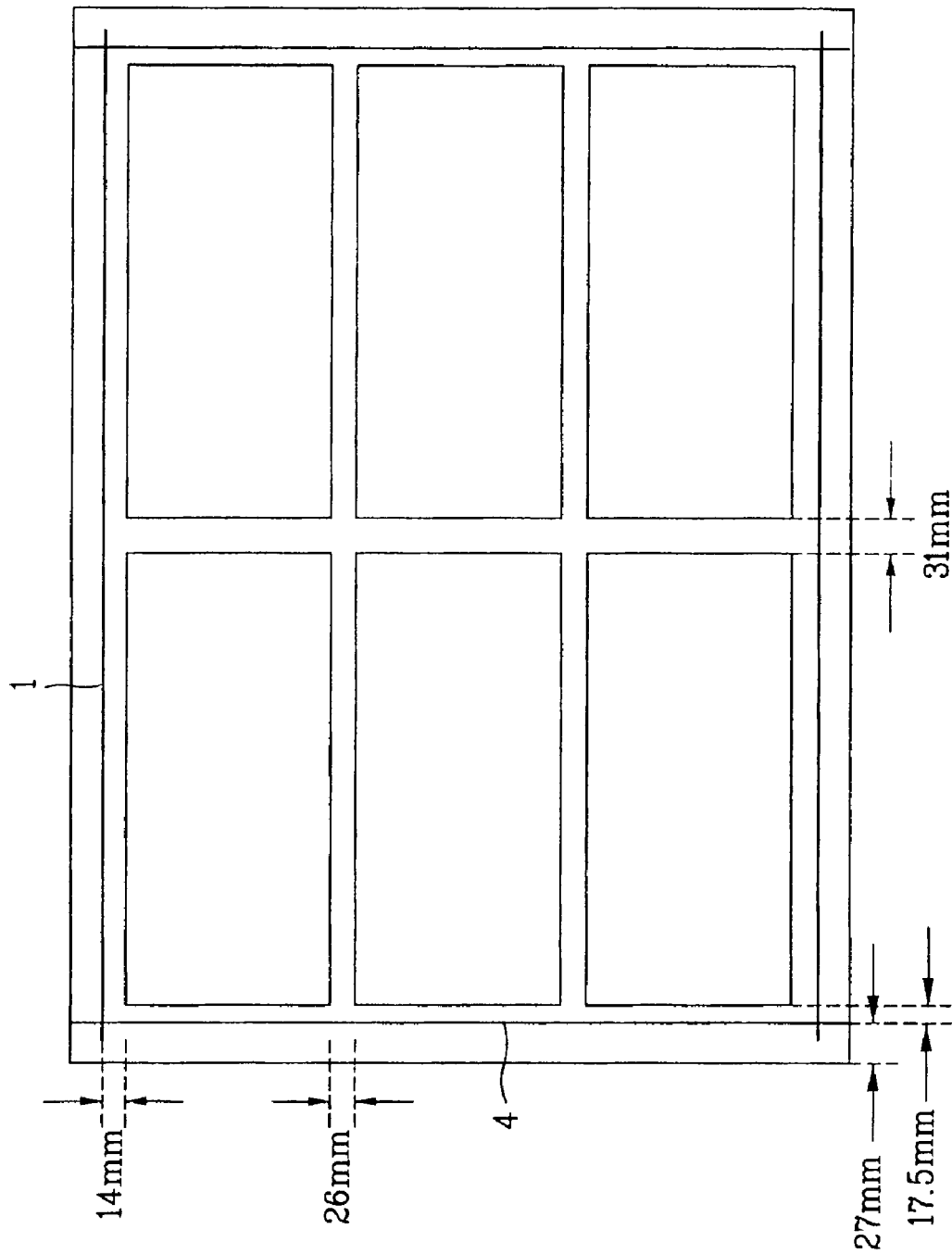

LAYOUT OF LIQUID CRYSTAL DISPLAY PANELS AND SIZE OF MOTHER SUBSTRATE

This application is a Continuation-in-Part of U.S. patent application Ser. No. 10/819,350, filed Apr. 7, 2004, now U.S. Pat. No. 7,414,695, which claims the benefit of the Korean Patent Application No. 2003-0021759 filed on Apr. 7, 2003, hereby incorporated by reference for all purposes as if fully set forth herein. This application also incorporates by reference Korean Patent Application Nos. P2005-116039 filed on Nov. 30, 2005 and P2006-32025 filed on Apr. 7, 2006.

BACKGROUND OF THE INVENTION

1. Field of the Invention

The present invention relates to a liquid crystal display (LCD) device, and more particularly, to a layout of liquid crystal display (LCD) panels and a size of a mother substrate to maximize the substrate efficiency.

2. Discussion of the Related Art

With the growth of the information society, demands for various display devices has increased. Accordingly, many efforts have been made to research and develop various flat display devices, for example, a liquid crystal display (LCD) device, a plasma display panel (PDP), an electroluminescent display (ELD) and a vacuum fluorescent display (VFD), and some species of the flat display devices are already applied to displays of various equipments.

Among the various flat display devices, the LCD device has been most widely used due to the advantageous characteristics of compact size, thin profile, and low power consumption, whereby the LCD device substitutes for a Cathode Ray Tube (CRT). In addition to the mobile type LCD devices such as a display for a notebook computer, the LCD devices have been developed for computer monitors and televisions to receive and display broadcasting signals. Especially, as the LCD devices are used for the televisions, it is trending toward various and large sizes in the LCD devices.

In general, the LCD device includes an LCD panel for displaying an image and a driver for supplying a driving signal to the LCD panel. In addition, the LCD panel includes first and second substrates bonded to each other, and a liquid crystal layer formed between the first and second substrates.

The first substrate (referred to as a TFT array substrate) includes a plurality of gate lines arranged along a first direction at fixed intervals, a plurality of data lines arranged along a second direction perpendicular to the first direction at fixed intervals, a plurality of pixel electrodes arranged in a matrix-type configuration within pixel regions defined by the gate and data lines, and a plurality of thin film transistors transmit signals from the data lines to the pixel electrodes in accordance with signals supplied to the gate lines.

The second substrate (referred to as a color filter array substrate) includes a black matrix layer that prevents a light leakage from portions of the first substrate except at the pixel regions, an R/G/B color filter layer for displaying various colors, and a common electrode for producing an image. In an IPS mode LCD device, the common electrode is formed on the first substrate, and an overcoat layer is formed on the second substrate.

When manufacturing the LCD devices, a plurality of LCD panels are formed on one mother substrate. That is, a plurality of LCD panel areas are designed in a first mother substrate, wherein each LCD panel area includes a thin film transistor array. Also, a plurality of LCD panel areas are designed in a second mother substrate, wherein each LCD panel area includes a color filter array. Then, a sealant is formed in the periphery of each LCD panel area formed on any one of the first and second mother substrates. Thereafter, the first and second mother substrates are bonded to each other, and the bonded substrates are cut into the unit LCD panel areas, thereby manufacturing the LCD devices.

The method for manufacturing the LCD device is classified into a liquid crystal injection method and a liquid crystal dispensing method.

In the liquid crystal injection method, the two substrates are bonded to each other, and then the bonded substrates are cut into the unit LCD panel areas. Thereafter, liquid crystal is injected to each LCD panel. Meanwhile, if applying the liquid crystal dispensing method, liquid crystal is appropriately dispensed on each LCD panel area of the first or second mother substrate, and then the first and second mother substrates are bonded to each other. Thereafter, the bonded substrates are cut into the unit LCD panels.

However, the liquid crystal injection method requires a long time for injection of liquid crystal, and spends a lot of liquid crystal. Accordingly, the large-sized LCD device generally uses the liquid crystal dispensing method. A method for manufacturing the LCD device according to the liquid crystal dispensing method will be explained as follows.

FIG. 1 is a block diagram of a method for manufacturing an LCD device according to the related art.

First, a plurality of LCD panel areas are designed in first and second mother substrates. Then, a thin film transistor array including a gate line, a data line, a thin film transistor, and a pixel region is formed in each LCD panel area of the first mother substrate (S11), and a first alignment layer is formed on an entire surface of the first mother substrate, and a rubbing treatment is performed thereto (S12). Then, a color filter array including a black matrix layer, a color filter layer, and a common electrode is formed in each LCD panel area of the second mother substrate (S15), and a second alignment layer is formed on an entire surface of the second mother substrate, and a rubbing treatment is performed thereto (S16).

In an IPS mode LCD device, a thin film transistor array including a gate line, a data line, a thin film transistor, a pixel region, and a common electrode is formed in each LCD panel area of the first mother substrate, and a color filter array including a black matrix layer, a color filter layer, and an overcoat layer is formed in each LCD panel area of the second mother substrate.

Then, the first and second mother substrates are cleaned (S13, S17). The cleaned first mother substrate is loaded into a liquid crystal dispenser (LC dispenser), and liquid crystal is dispensed on the LCD panel areas of the first mother substrate (S14). Then, the cleaned second mother substrate is loaded into Ag and sealant dispensers, whereby Ag dots are formed on each LCD panel area (S18), and a sealant is formed in the periphery of each LCD panel area (S19).

Thereafter, the first and second mother substrates are loaded into a bonding apparatus, whereby the first and second mother substrates are bonded to each other. Then, the bonded first and second substrates are loaded into a curing apparatus, whereby the sealant is cured (S20). After that, the bonded first and second mother substrates having the cured sealant are loaded into a cutting apparatus, whereby the substrates are cut into the LCD panels (S21). Then, the cut LCD panels are polished, and then is finally tested (S22). Although not shown, a driving circuit, a polarizing film, and a backlight are provided to each LCD panel, thereby completing the LCD device.

On manufacturing the LCD panels, the efficiency of mother substrate depends on the arrangement of LCD panels having the various sizes (models) on the mother substrate.

Also, since the LCD panel is manufactured by the several steps, the size of the mother substrate is limited due to the size in each apparatus for manufacturing the LCD panel.

Accordingly, after selecting the main model of the LCD panel, the layout is designed based on the arrangement of the main models on the mother substrate. According to the design of layout, the optimal size of the mother substrate is determined.

However, the efficient size of mother substrate, which can improves the efficiency of mother substrate in consideration of the layout for arranging the LCD panels, has not been proposed. Also, if arranging the plurality of LCD panels of the same size (model) on one mother substrate, the efficiency of mother substrate is lowered. This problem becomes more serious as the size of LCD panel becomes larger.

SUMMARY OF THE INVENTION

Accordingly, the present invention is directed to a layout and a size of a mother substrate in an LCD panel, which substantially obviates one or more problems due to limitations and disadvantages of the related art.

An object of the present invention is to provide a layout of LCD panels to improve the efficiency in arrangement of the LCD panels, and a size of the mother substrate to maximize the substrate efficiency.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a layout of LCD panels comprises a mother substrate; a dummy region of 15 mm or less in a periphery of the mother substrate; and six LCD panels of the 26-inch model in a matrix of 2×3 on the mother substrate excluding the dummy region with a margin corresponding to 2~4% of a length of the LCD panel.

In another aspect of the present invention, a substrate size comprises a mother substrate having a size (M) which satisfies M=(45.299L+43.805)~(50.333L+48.673)×(51.509L+63.636)~(57.232L+70.707) when arranging eight LCD panels of the same size, wherein 'L' is an inch-value of the LCD panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 8A to 8I are layouts illustrating the respective models on the mother substrate having a size of 1100×1250 mm², according to the first embodiment of the present invention;

DETAILED DESCRIPTION OF THE INVENTION

Figure 1:
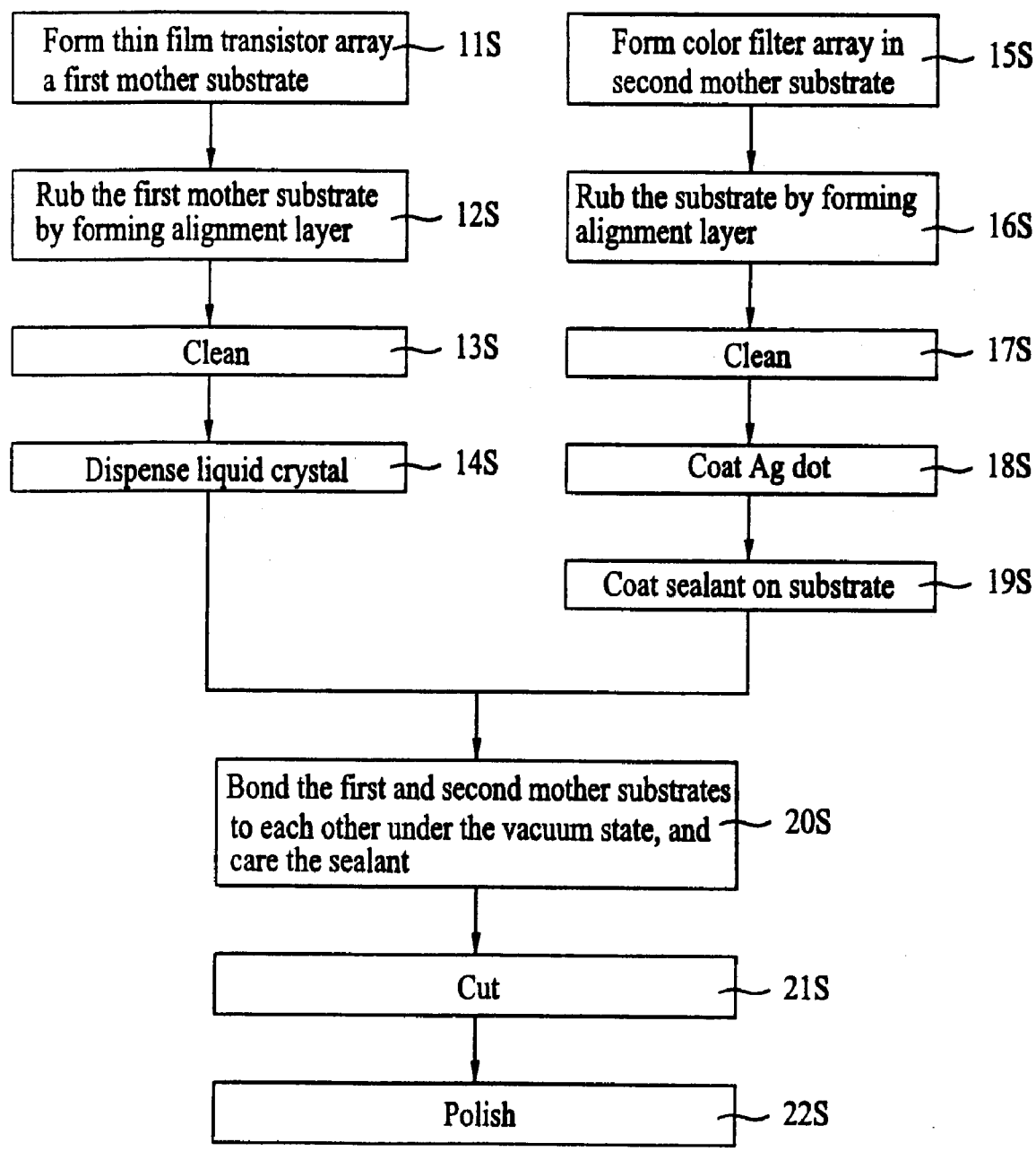
FIG. 1 is a block diagram of a method for manufacturing an LCD device according to the related art.

Reference will now be made in detail to embodiments of the present invention, examples of which are illustrated in the accompanying drawings. Wherever possible, the same reference numbers will be used throughout the drawings to refer to the same or like parts.

Hereinafter, a layout of an LCD panel and a size of the mother substrate according to the present invention will be described with reference to the accompanying drawings.

First, when designing a layout for arranging LCD panels of respective models on a mother substrate, it is necessary to design the layout with a predetermined interval from an edge of the mother substrate (dummy region, process key center, or exposure process region) and to secure a margin of each LCD panel, to thereby perform a uniformity in steps of deposition, exposure and etching, and to thereby obtain a peripheral exposure region.

That is, the size of the mother substrate is estimated with the dummy region of 15 mm or less, and the length in each LCD panel including the margin of 0.3~4% (the interval between the LCD panels, the interval between the dummy region and the LCD panel, and the interval between the process key center and the exposure process region).

Under the conditions of the process according to the present invention, the margin of 20-inch or less LCD panels is about 2~4%, the margin of the 30-inch LCD panels is about 1~4%, and the margin of 50-inch LCD panel is about 0.3~4%. That is, as the LCD panel has the large size, the size of the mother substrate increases, whereby the LCD panel can be manufactured under the low margin of 0.3%.

According as the major or minor axis of the LCD panel corresponds to the major axis of the mother substrate, the efficiency of mother substrate is variable. To improve the efficiency of mother substrate, it is necessary to take the alignment relating the axes of the LCD panel and mother substrate into consideration.

In addition, a sealant for bonding two substrates to each other may have effects on the efficiency of mother substrate, which will be explained as follows.

First, a black matrix layer of chrome (Cr), which is a heavy metal harmful to humans is formed on a substrate except pixel regions to prevent light leakage. In an IPS mode LCD device, which drives liquid crystal with a transverse electric field induced between a pixel electrode and a common electrode, if the black matrix layer is formed of the heavy metal, an electric field between the pixel electrode and the common electrode is distorted, and the black matrix layer of heavy metal is harmful to humans. Instead of a heavy metal, the black matrix layer is formed of carbon black, acryl comprising carbon black, epoxy or polyimide resin.

In the IPS mode LCD device, a color filter array substrate includes the black matrix layer described above, a color filter layer corresponding to each pixel region, and an overcoat layer on an entire surface of the substrate including the black matrix layer and the color filter layer. In a non-display area coated with a sealant, the black matrix layer of resin and the overcoat layer are deposited.

Also, a thin film transistor array substrate is positioned at a predetermined cell gap with the color filter array substrate by spacers formed in a display area. However, in an area having the sealant, the sealant widely spreads due to bonding pressure, whereby the cell gap is changed. Accordingly, it is necessary to additionally provide supporters made of glass fiber or glass balls to the sealant, to thereby prevent the cell gap from being changed.

If the two substrates are bonded to each other such that the sealant having the supporter is formed on the overcoat layer and is overlapped with the black matrix layer, the black matrix layer of resin and the overcoat layer are depressed due to the glass fiber or glass ball included in the sealant by a bonding pressure. As the supporter included in the sealant depresses the black matrix layer of resin and the overcoat layer, the sealant may be deformed.

To prevent the deformation of sealant, it is necessary that the sealant does not overlapped with the black matrix layer. However, if the sealant is not overlapped with the black matrix layer, a dummy region of the LCD device increases in size, thereby causing the decrease in the efficiency of the substrate. To optimize the ratio of supporter included in the sealant, the sealant is overlapped with the black matrix layer, whereby the size of dummy region of the LCD device decreases, to thereby optimize the efficiency of substrate.

That is, the supporter made of glass fibers or glass balls is provided in the sealant at a weight ratio of 1% or less. For example, if the supporter includes glass balls, five-hundred or fewer glass balls are provided in the unit area of 1 mm×1 mm of the sealant. If the supporter includes glass fibers, one-hundred fifty glass fibers are provided in the unit area of 1 mm×1 mm of the sealant. In other words, if the weight ratio of supporter corresponds to about 0.95%~0.005% of the sealant, it is possible to prevent the deformation of sealant even thought the sealant is overlapped with the black matrix layer, thereby improving the efficiency of substrate.

The other element for preventing the deformation of sealant when the sealant is overlapped with the black matrix layer is the thickness of the overcoat layer. That is, if the supporter such as the glass fiber or glass ball is added to the sealant at the weight ratio of 1% or less, and the thickness of the overcoat layer is determined between 1.2 μm and 5 μm, it is possible to prevent the deformation of sealant. That is, if forming the overcoat layer with a thickness between 1.2 μm and 5 μm, it is possible to prevent the black matrix layer from being depressed.

For example, when designing the 20.1-inch LCD panel on the glass substrate having a size of 1870×2200 mm, the dummy region of the LCD panel increases so as not to overlap the sealant with the black matrix layer, making it possible to provide twenty four LCD panels on the substrate at maximum. However, if the sealant is overlapped with the black matrix layer by optimizing the weight ratio of supporter included in the sealant, it is possible to decrease the dummy region of the LCD panel, thereby providing thirty LCD panels on the substrate at maximum. As a result, it is possible to maximize the efficiency of substrate by optimizing the weight ratio of supporter included in the sealant, or by controlling the thickness of the overcoat layer.

When providing eight LCD panels on the mother substrate according to the model of the LCD panel under the above conditions of the dummy region, the margin, the weight ratio of supporter included in the sealant, and the thickness of the overcoat layer, the size of substrate is explained as follows, as realizing the substrate efficiency of 90% or more.

Figures 2, 3:
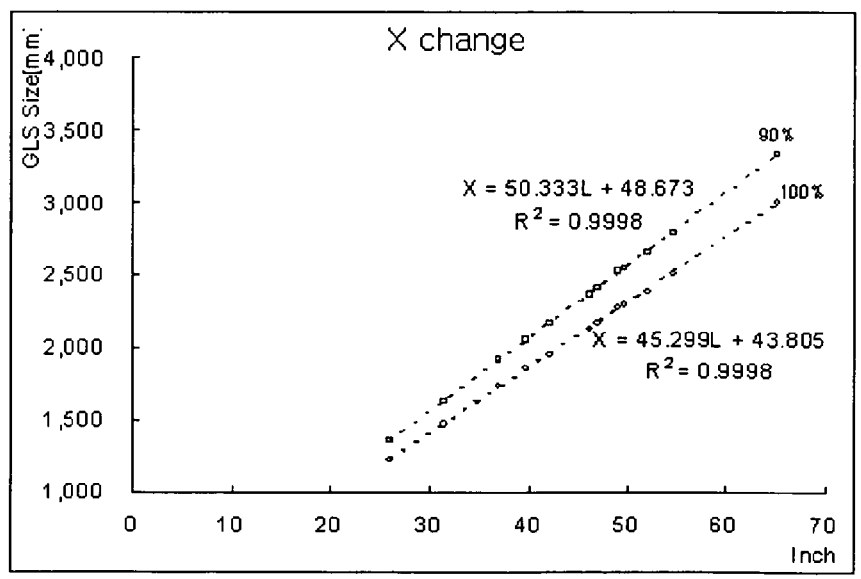
FIG. 2 is a table illustrating a substrate efficiency of 90% and 100% when arranging eight LCD panels on one mother substrate according to a model of an LCD panel according to the present invention.
FIG. 3 is a graph illustrating a length change in the X-axis (minor axis) of mother substrate from the table of FIG. 2.

FIG. 2 is a table illustrating a substrate efficiency of 90% and 100% when arranging eight LCD panels on one mother substrate according to a model of an LCD panel according to the present invention. FIG. 3 is a graph illustrating a length change in the X-axis (minor axis) of mother substrate from the table of FIG. 2.

First, if arranging eight LCD panels of the 23-inch model (23WX, picture ratio of 16:9, IPS mode, diagonal length of 22.95-inch, panel size of 523.7×302.7 mm$^2$) under the above margin conditions, the size of the mother substrate corresponds to 1206×1387 mm$^2$ when the substrate efficiency is 90%, and the size of the mother substrate corresponds to 1085×1248 mm$^2$ when the substrate efficiency is 100%. Specifically, 1085/1206=90% and 1248/1387=90%. Accordingly, if arranging eight LCD panels of a 23-inch model, the size of the mother substrate satisfies 1085~1206×1248~1387 mm$^2$ to achieve the substrate efficiency of 90% or more.

If arranging eight LCD panels of a 26-inch model (26WX, picture ratio of 16:9, IPS mode, diagonal length of the 26-inch, panel size of 590.9×341.5 mm$^2$) under the above margin conditions, the size of the mother substrate corresponds to 1353×1555 mm$^2$ when the substrate efficiency is 90%, and the size of the mother substrate corresponds to 1218×1399 mm$^2$ when the substrate efficiency is 100%. Accordingly, if arranging eight LCD panels of a 26-inch model, the size of the mother substrate satisfies 1218~1353×1399~1555 mm$^2$ to achieve the substrate efficiency of 90% or more.

If arranging eight LCD panels of a 32-inch model (32WX, picture ratio of 16:9, IPS mode, diagonal length of 31.5-inch, panel size of 715.0×413.05 mm$^2$) under the above margin conditions, the size of the mother substrate corresponds to 1630×1873 mm$^2$ when the substrate efficiency is 90%, and the size of the mother substrate corresponds to 1467×1686 mm$^2$ when the substrate efficiency is 100%. Accordingly, if arranging eight LCD panels of a 32-inch model, the size of the mother substrate satisfies 1467~1630×1686~1873 mm² to achieve the substrate efficiency of 90% or more.

If arranging eight LCD panels of a 37-inch model (37WU, picture ratio of 16:9, IPS mode, diagonal length of 37.0-inch, panel size of 846.0×485.2 mm²) under the above margin conditions, the size of the mother substrate corresponds to 1923×2195 mm² when the substrate efficiency is 90%, and the size of the mother substrate corresponds to 1730×1976 mm² when the substrate efficiency is 100%. Accordingly, if arranging eight LCD panels of a 37-inch model, the size of the mother substrate satisfies 1730~1923×1976~2195 mm² to achieve the substrate efficiency of 90% or more.

If arranging eight LCD panels of a 40-inch model (40WU, picture ratio of 16:9, IPS mode, diagonal length of 39.8-inch, panel size of 906.2×521.4 mm²) under the above margin conditions, the size of the mother substrate corresponds to 2057×2356 mm² when the substrate efficiency is 90%, and the size of the mother substrate corresponds to 1851×2121 mm² when the substrate efficiency is 100%. Accordingly, if arranging eight LCD panels of a 40-inch model, the size of the mother substrate satisfies 1851~2057×2121~2356 mm² to achieve the substrate efficiency of 90% or more.

If arranging eight LCD panels of a 42-inch model (42WU, picture ratio of 16:9, IPS mode, diagonal length of the 42-inch, panel size of 956.0×549.0 mm²) under the above margin conditions, the size of the mother substrate corresponds to 2168×2479 mm² when the substrate efficiency is 90%, and the size of the mother substrate corresponds to 1952×2231 mm² when the substrate efficiency is 100%. Accordingly, if arranging eight LCD panels of a 42-inch model, the size of the mother substrate satisfies 1952~2168×2231~2479 mm² to achieve the substrate efficiency of 90% or more.

If arranging eight LCD panels of a 46-inch model (46WU, picture ratio of 16:9, IPS mode, diagonal length of 46.1-inch, panel size of 1043.0×600.5 mm²) under the above margin conditions, the size of the mother substrate corresponds to 2363×2709 mm² when the substrate efficiency is 90%, and the size of the mother substrate corresponds to 2126×2438 mm² when the substrate efficiency is 100%. Accordingly, if arranging eight LCD panels of a 46-inch model, the size of the mother substrate satisfies 2126~2363×2438~2709 mm² to achieve the substrate efficiency of 90% or more.

If arranging eight LCD panels of a 47-inch model (47WU, picture ratio of 16:9, IPS mode, diagonal length of the 47-inch, panel size of 1065×610.5 mm²) under the above margin conditions, the size of the mother substrate corresponds to 2412×2753 mm² when the substrate efficiency is 90%, and the size of the mother substrate corresponds to 2171×2478 mm² when the substrate efficiency is 100%. Accordingly, if arranging eight LCD panels of a 47-inch model, the size of the mother substrate satisfies 2171~2412×2478~2753 mm² to achieve the substrate efficiency of 90% or more.

If arranging eight LCD panels of a 57-inch model (57WU, picture ratio of 16:9, IPS mode, diagonal length of 56.7-inch, panel size of 1276.2×727.2 mm²) under the above margin conditions, the size of the mother substrate corresponds to 2884×3273 mm² when the substrate efficiency is 90%, and the size of the mother substrate corresponds to 2595×2946 mm² when the substrate efficiency is 100%. Accordingly, if arranging eight LCD panels of a 57-inch model, the size of the mother substrate satisfies 2595~2884×2946~3273 mm² to achieve the substrate efficiency of 90% or more.

Referring to FIG. 2, if arranging eight LCD panels of the other model, it is possible to estimate the size of the mother substrate for realization of substrate efficiency of 90% or more.

Figures 4, 5:
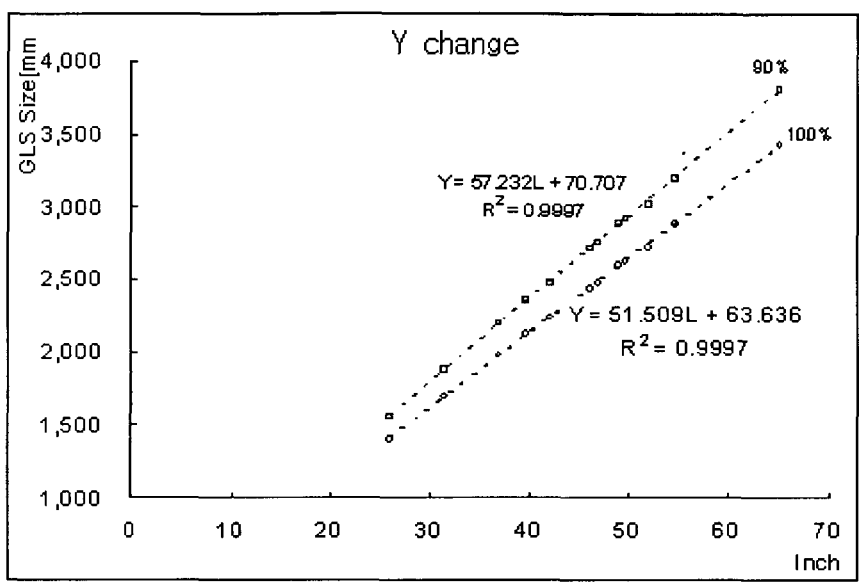
FIG. 4 is a graph illustrating a length change in the Y-axis (major axis) of mother substrate from the table of FIG. 2.
FIG. 5 is a table illustrating a substrate efficiency of 90% and 100% when arranging six LCD panels on one mother substrate according to a model of an LCD panel according to the present invention.

FIG. 3 is a graph illustrating a length change in the X-axis (minor axis) of mother substrate from the table of FIG. 2. FIG. 4 is a graph illustrating a length change in the Y-axis (major axis) of mother substrate from the table of FIG. 2. As illustrated in FIGS. 3 and 4, if showing the substrate efficiency for each size by graph, it is close to a straight line (linear equation, $R^2=0.9998$ or $R^2=0.9997$), which is expressed as follows.

First, the length (X, mm) of the minor axis of the mother substrate can be expressed as the size (virtual diagonal length, inch, L) of each LCD panel.

$$X = 50.333L + 48.673 \qquad \text{[equation 1]}$$

The above [equation 1] illustrates the length (X) of the minor axis when the eight LCD panels of each model are arranged on the mother substrate, and the substrate efficiency is 90%.

$$X = 45.299L + 43.805 \qquad \text{[equation 2]}$$

The above [equation 2] illustrates the length (X) of the minor axis when the eight LCD panels of each model are arranged on the mother substrate, and the substrate efficiency is 100%.

Also, the length (Y, mm) of the major axis of the mother substrate can be expressed as the size (virtual diagonal length, inch, L) of each LCD panel.

$$Y = 57.232L + 70.707 \qquad \text{[equation 3]}$$

The above [equation 3] illustrates the length (Y) of the major axis when the eight LCD panels of each model are arranged on the mother substrate, and the substrate efficiency is 90%.

$$Y = 51.509L + 63.636 \qquad \text{[equation 4]}$$

The above [equation 4] illustrates the length (Y) of the major axis when the eight LCD panels of each model are arranged on the mother substrate, and the substrate efficiency is 100%.

Based on the above [equation 1], [equation 2], [equation 3] and [equation 4], when the eight LCD panels for each model are arranged on the mother substrate, and the substrate efficiency is 90% or more, the size (M) of mother substrate is expressed as the following [equation 5].

$$M = (45.299L + 43.805) \sim (50.333L + 48.673) \times (51.509L + 63.636) \sim (57.232L + 70.707) \qquad \text{[equation 5]}$$

For example, in the 26-inch model LCD panel, the virtual diagonal length (L) is 26 inch. If applying the virtual diagonal length (L) of 26 inch to the above [equation 5], the size (M) of mother substrate is 1221.579~1357.331×1404.976~1558.739. This value is very similar to the value from the table of FIG. 2.

When providing six LCD panels on the mother substrate according to the model of the LCD panel under the above conditions of the dummy region, the margin, the weight ratio of supporter included in the sealant, and the thickness of the overcoat layer, the size of substrate is explained as follows, as realizing the substrate efficiency of 90% or more.

Figure 6:
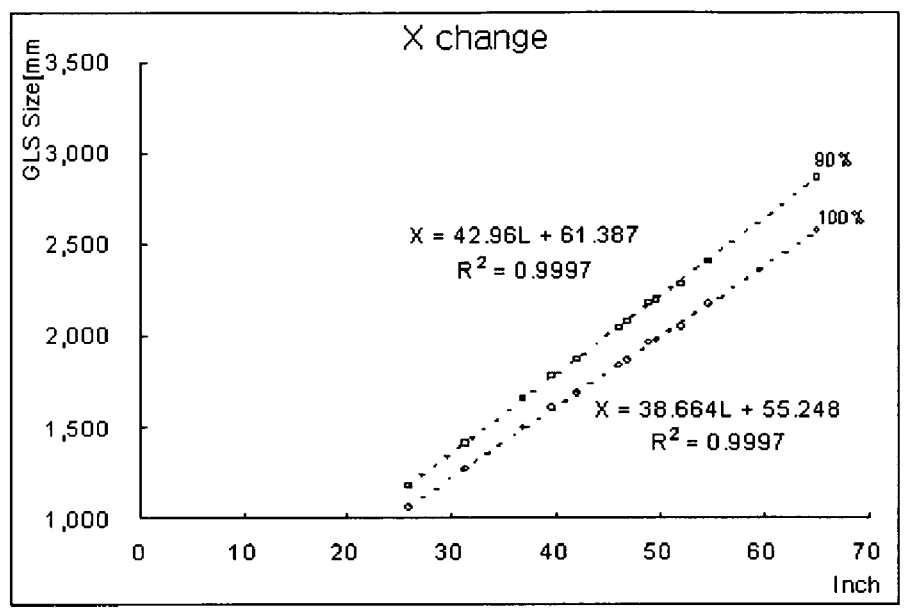
FIG. 6 is a graph illustrating a length change in the X-axis (minor axis) of mother substrate from the table of FIG. 5.
Figure 7:
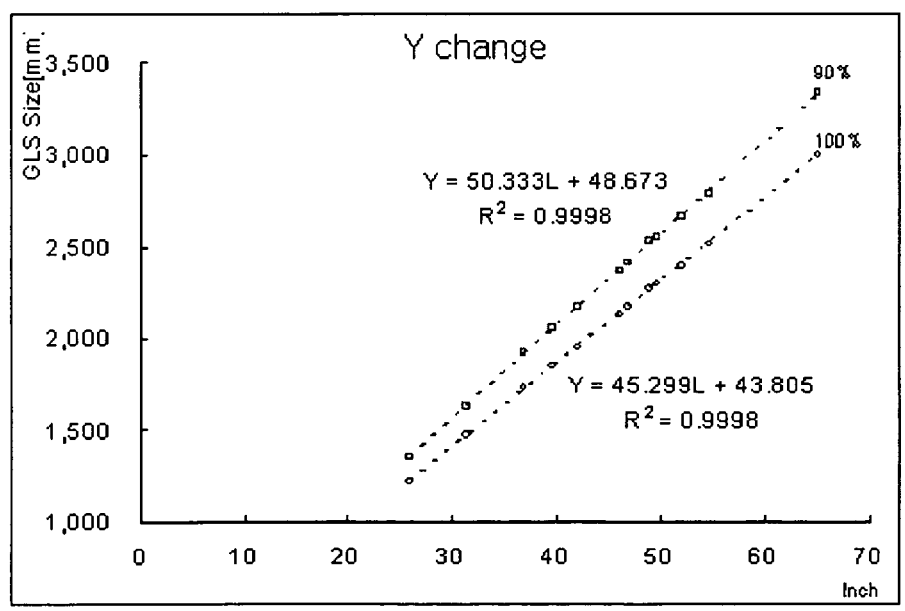
FIG. 7 is a graph illustrating a length change in the Y-axis (major axis) of mother substrate from the table of FIG. 5.

FIG. 5 is a table illustrating a substrate efficiency of 90% and 100% when arranging six LCD panels on one mother substrate according to a model of an LCD panel according to the present invention. FIG. 6 is a graph illustrating a length change in the X-axis (minor axis) of mother substrate from the table of FIG. 5. FIG. 7 is a graph illustrating a length change in the Y-axis (major axis) of mother substrate from the table of FIG. 5.

First, if arranging six LCD panels of the 23-inch model, the size of the mother substrate satisfies 994~1049×1085~1206 mm² to achieve the substrate efficiency of 90% or more.

If arranging six LCD panels of a 26-inch model (26WX, picture ratio of 16:9, IPS mode, diagonal length of the 26-inch, panel size of 590.9×341.5 mm²) under the above margin conditions, the size of the mother substrate corresponds to 1175×1353 mm² when the substrate efficiency is 90%, and the size of the mother substrate corresponds to 1058×1218 mm² when the substrate efficiency is 100%. Accordingly, if arranging six LCD panels of a 26-inch model, the size of the mother substrate satisfies 1058~1175×1218~1353 mm² to achieve the substrate efficiency of 90% or more.

If arranging six LCD panels of a 32-inch model (32WX, picture ratio of 16:9, IPS mode, diagonal length of 31.5-inch, panel size of 715.0×413.05 mm²) under the above margin conditions, the size of the mother substrate corresponds to 1415×1630 mm² when the substrate efficiency is 90%, and the size of the mother substrate corresponds to 1273×1467 mm² when the substrate efficiency is 100%. Accordingly, if arranging six LCD panels of a 32-inch model, the size of the mother substrate satisfies 1273~1415×1467~1630 mm² to achieve the substrate efficiency of 90% or more.

If arranging six LCD panels of a 37-inch model (37WU, picture ratio of 16:9, IPS mode, diagonal length of 37.0-inch, panel size of 846.0×485.2 mm²) under the above margin conditions, the size of the mother substrate corresponds to 1656×1923 mm² when the substrate efficiency is 90%, and the size of the mother substrate corresponds to 1490×1730 mm² when the substrate efficiency is 100%. Accordingly, if arranging six LCD panels of a 37-inch model, the size of the mother substrate satisfies 1490~1656×1730~1923 mm² to achieve the substrate efficiency of 90% or more.

If arranging six LCD panels of a 40-inch model (40WU, picture ratio of 16:9, IPS mode, diagonal length of 39.8-inch, panel size of 906.2×521.4 mm²) under the above margin conditions, the size of the mother substrate corresponds to 1777×2057 mm² when the substrate efficiency is 90%, and the size of the mother substrate corresponds to 1599×1851 mm² when the substrate efficiency is 100%. Accordingly, if arranging six LCD panels of a 40-inch model, the size of the mother substrate satisfies 1599~1777×1851~2057 mm² to achieve the substrate efficiency of 90% or more.

If arranging six LCD panels of a 42-inch model (42WU, picture ratio of 16:9, IPS mode, diagonal length of the 42-inch, panel size of 956.0×549.0 mm²) under the above margin conditions, the size of the mother substrate corresponds to 1869×2168 mm² when the substrate efficiency is 90%, and the size of the mother substrate corresponds to 1682×1952 mm² when the substrate efficiency is 100%. Accordingly, if arranging six LCD panels of a 42-inch model, the size of the mother substrate satisfies 1682~1869×1952~2168 mm² to achieve the substrate efficiency of 90% or more.

If arranging six LCD panels of a 46-inch model (46WU, picture ratio of 16:9, IPS mode, diagonal length of 46.1-inch, panel size of 1043.0×600.5 mm²) under the above margin conditions, the size of the mother substrate corresponds to 2042×2363 mm² when the substrate efficiency is 90%, and the size of the mother substrate corresponds to 1838×2126 mm² when the substrate efficiency is 100%. Accordingly, if arranging six LCD panels of a 46-inch model, the size of the mother substrate satisfies 1838~2042×2126~2363 mm² to achieve the substrate efficiency of 90% or more.

If arranging six LCD panels of a 47-inch model (47WU, picture ratio of 16:9, IPS mode, diagonal length of the 47-inch, panel size of 1065.0×610.5 mm²) under the above margin conditions, the size of the mother substrate corresponds to 2075×2412 mm² when the substrate efficiency is 90%, and the size of the mother substrate corresponds to 1868×2171 mm² when the substrate efficiency is 100%. Accordingly, if arranging six LCD panels of a 47-inch model, the size of the mother substrate satisfies 1868~2075×2171~2412 mm² to achieve the substrate efficiency of 90% or more.

If arranging six LCD panels of a 49-inch model[1] (49WU, picture ratio of 16:9, IPS mode, diagonal length of 49-inch, panel size of 1115.6×640.9 mm²) under the above margin conditions, the size of the mother substrate corresponds to 2177×2525 mm² when the substrate efficiency is 90%, and the size of the mother substrate corresponds to 1959×2272 mm² when the substrate efficiency is 100%. Accordingly, if arranging six LCD panels having 49-inch model, the size of the mother substrate satisfies 1959~2177×2272~2525 mm² to achieve the substrate efficiency of 90% or more.

If arranging six LCD panels of a 50-inch model (50WU, picture ratio of 16:9, IPS mode, diagonal length of 49.7-inch, panel size of 1127.5×646.5 mm²) under the above margin conditions, the size of the mother substrate corresponds to 2196×2551 mm² when the substrate efficiency is 90%, and the size of the mother substrate corresponds to 1976×2296 mm² when the substrate efficiency is 100%. Accordingly, if arranging six LCD panels of a 50-inch model, the size of the mother substrate satisfies 1976~2196×2296~2551 mm² to achieve the substrate efficiency of 90% or more.

If arranging six LCD panels of a 52-inch model (52WU, picture ratio of 16:9, IPS mode, diagonal length of the 52-inch, panel size of 1174.5×670.5 mm²) under the above margin conditions, the size of the mother substrate corresponds to 2276×2656 mm² when the substrate efficiency is 90%, and the size of the mother substrate corresponds to 2048×2391 mm² when the substrate efficiency is 100%. Accordingly, if arranging six LCD panels having 52-inch model, the size of the mother substrate satisfies 2048~2276×2391~2656 mm² to achieve the substrate efficiency of 90% or more.

If arranging six LCD panels of a 55-inch model (55WU, picture ratio of 16:9, IPS mode, diagonal length of 54.6-inch, panel size of 1233.0×710.0 mm²) under the above margin conditions, the size of the mother substrate corresponds to 2408×2787 mm² when the substrate efficiency is 90%, and the size of the mother substrate corresponds to 2167×2508 mm² when the substrate efficiency is 100%. Accordingly, if arranging six LCD panels of a 55-inch model, the size of the mother substrate satisfies 2167~2408×2508~2787 mm² to achieve the substrate efficiency of 90% or more.

If arranging six LCD panels of a 57-inch model (57WU, picture ratio of 16:9, IPS mode, diagonal length of 56.7-inch, panel size of 1276.2×727.2 mm²) under the above margin conditions, the size of the mother substrate corresponds to 2465×2884 mm² when the substrate efficiency is 90%, and the size of the mother substrate corresponds to 2219×2595 mm² when the substrate efficiency is 100%. Accordingly, if arranging six LCD panels of a 57-inch model, the size of the mother substrate satisfies 2219~2465×2595~2884 mm² to achieve the substrate efficiency of 90% or more.

If arranging six LCD panels of a 65-inch model (65WU, picture ratio of 16:9, IPS mode, diagonal length of 65.0-inch, panel size of 1476.0×846.0 mm²) under the above margin conditions, the size of the mother substrate corresponds to 2863×3330 mm² when the substrate efficiency is 90%, and the size of the mother substrate corresponds to 2576×2997 mm² when the substrate efficiency is 100%. Accordingly, if arranging six LCD panels having 65-inch model, the size of the mother substrate satisfies 2576~2863×2997~3330 mm² to achieve the substrate efficiency of 90% or more.

Referring to FIG. 6, if arranging six LCD panels of another model, it is possible to estimate the size of the mother substrate for realization of substrate efficiency of 90% or more.

FIG. 6 is a graph illustrating a length change in the X-axis (minor axis) of mother substrate from the table of FIG. 5. FIG. 7 is a graph illustrating a length change in the Y-axis (major axis) of mother substrate from the table of FIG. 5.

As illustrated in FIGS. 6 and 7, if showing the substrate efficiency for each size by graph, it is close to a straight line (linear equation, $R^2=0.9998$ or $R^2=0.9997$), which is expressed as follows.

First, the length (X, mm) of the minor axis of the mother substrate can be expressed as the size (virtual diagonal length, inch, L) of each LCD panel.

$$X=42.96L+61.387 \quad \text{[equation 6]}$$

The above [equation 6] illustrates the length (X) of the minor axis when the six LCD panels of each model are arranged on the mother substrate, and the substrate efficiency is 90%.

$$X=38.664L+55.248 \quad \text{[equation 7]}$$

The above [equation 7] illustrates the length (X) of the minor axis when the six LCD panels of each model are arranged on the mother substrate, and the substrate efficiency is 100%.

Also, the length (Y, mm) of the major axis of the mother substrate can be expressed as the size (virtual diagonal length, inch, L) of each LCD panel.

$$Y=50.333L+48.673 \quad \text{[equation 8]}$$

The above [equation 8] illustrates the length (Y) of the major axis when the six LCD panels of each model are arranged on the mother substrate, and the substrate efficiency is 90%.

$$Y=45.299L+43.805 \quad \text{[equation 9]}$$

The above [equation 9] illustrates the length (Y) of the major axis when the six LCD panels of each model are arranged on the mother substrate, and the substrate efficiency is 100%.

Based on the above [equation 6], [equation 7], [equation 8] and [equation 9], when the six LCD panels for each model are arranged on the mother substrate, and the substrate efficiency is 90% or more, the size (M) of mother substrate is expressed as the following [equation 10].

$$M=(38.664L+55.248)\sim(42.96L+61.387)\times(45.299L+43.805)\sim(50.333L+48.673) \quad \text{[equation 10]}$$

For example, in the model of LCD panel of the 52-inch wide, the virtual diagonal length (L) is 52 inch. If applying the virtual diagonal length (L) of 52 inch to the above [equation 10], the size (M) of mother substrate is 2065.776~2295.307× 2399.353~2665.989. This value is very similar to the value from the table of FIG. 5.

In FIGS. 2 to 7, the model mode of IPS or TN is explained. However, it is not limited to these modes. For example, without regard to the model mode of VA, OCB, ECB or FLCD, it is possible to estimate the optimal size of the mother substrate corresponding to the inch of LCD panel. In addition to the above-mentioned picture ratios, various picture ratios of 16:10, 4:3, 5:4, etc. can be used.

As described above, arranging the six LCD panels of the 26-inch model has a similar size mother substrate as arranging the eight LCD panels of the 23-inch model. That is, the size of the mother substrate satisfies 1085~1206×1248~1387 mm² when arranging the eight LCD panels of the 23-inch model for realization of substrate efficiency of 90% or more, and the size of the mother substrate satisfies 1058~1175× 1218~1353 mm² when arranging the six LCD panels of the 26-inch model for realization of substrate efficiency of 90% or more. In the above conditions relating the size of mother substrate, the optimal size of the mother substrate is 1100× 1250 mm².

The layout of the cases for arranging the eight LCD panels of the 23-inch model on the mother substrate (1100×1250 mm²) and arranging the six LCD panels of the 26-inch model on the mother substrate (1100×1250 mm²) will be explained as follows. FIGS. 8A to 8I are layouts illustrating the respective models on the mother substrate having a size of 1100× 1250 mm², according to the first embodiment of the present invention.

Figure 8A:
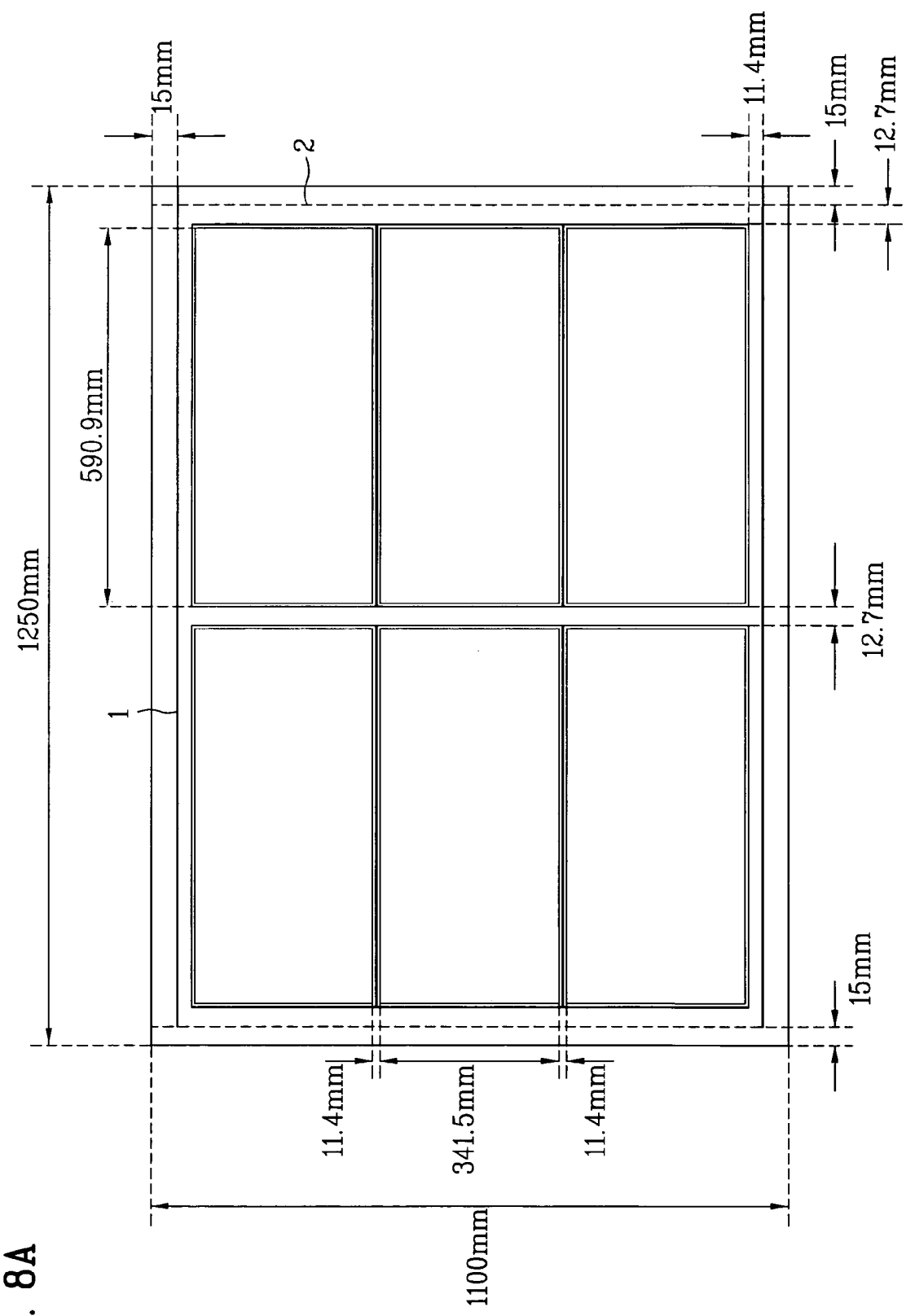

FIG. 8A illustrates the layout of arranging six LCD panels (2 column×3 row) of the 26-inch model (26WX, picture ratio of 16:9, IPS mode, virtual diagonal length of the 26-inch, panel size of 590.9×341.5 mm²) on the mother substrate having a size of 1100×1250 mm². That is, the dummy region is 15 mm, and the margin is 2~4% of the length of LCD panel. The process key center (1) is provided at the interval of 15 mm from the edge of the mother substrate in the direction of major axis, and the dummy region (2) is provided at the interval of 15 mm from the edge of the mother substrate in the direction of minor axis. The six LCD panels of the 26-inch model are arranged in a matrix (2 column×3 row) in the margin of 11.4 mm from the process key center (1), and in the margin of 12.7 mm from the dummy region (2), wherein the margin between each column is 12.7 mm, and the margin between each row is 11.4 mm.

In FIG. 8A, the six LCD panels of the 26-inch model are arranged in the matrix type (2 column×3 row), and the major axis of the LCD panel corresponds to the major axis of the mother substrate. Also, the margin value is not limited to the above description, which can be controllable within ±30%. According to the above arrangement of LCD panels on the mother substrate, it is possible To achieve substrate efficiency of 90% or more.

Figure 8B:
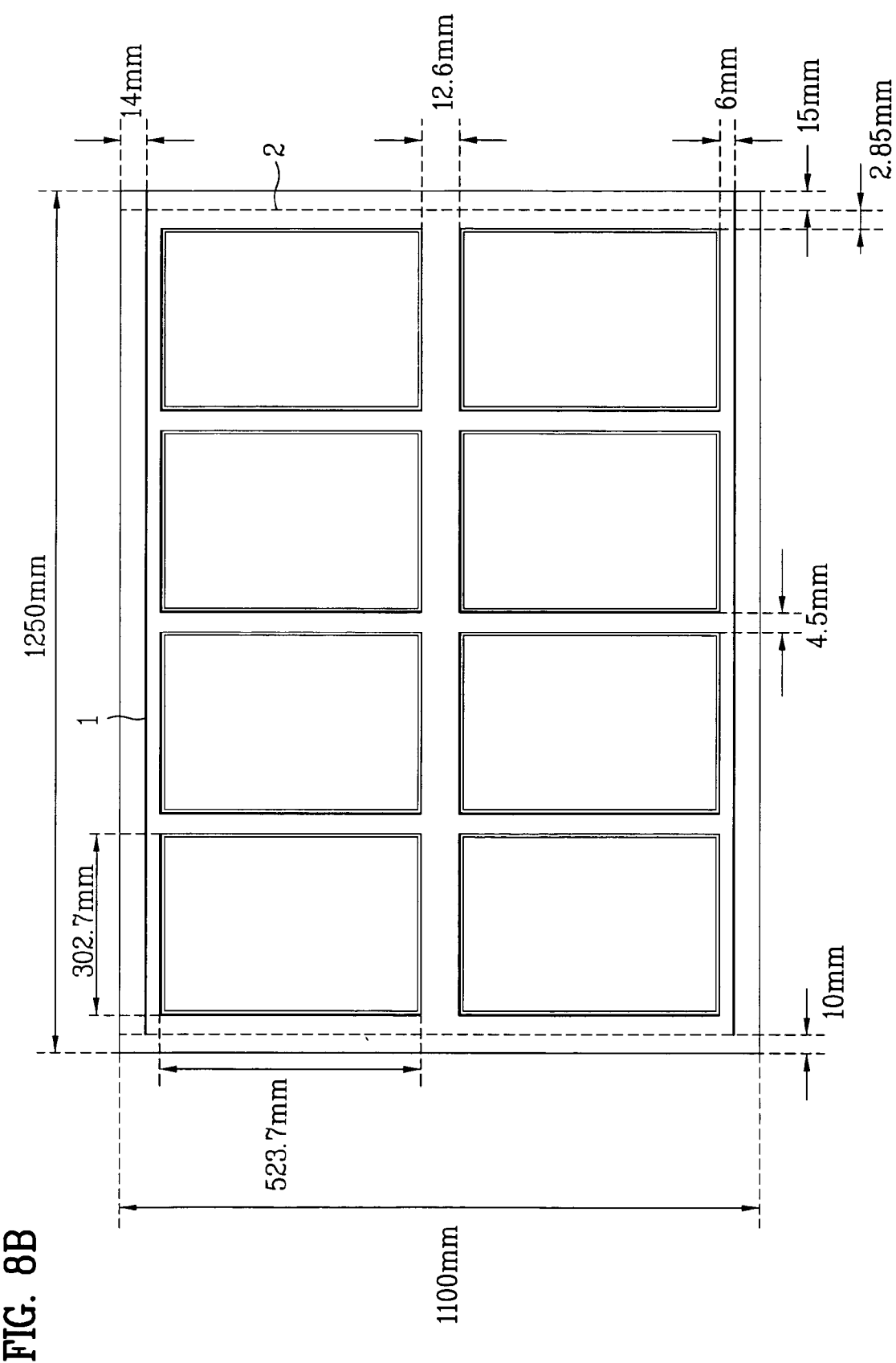

FIG. 8B illustrates the layout of arranging eight LCD panels (4 column×2 row) of the 23-inch model (23WX, picture ratio of 16:9, IPS mode, virtual diagonal length of 22.95-inch, panel size of 523.7×302.7 mm²) on the mother substrate having a size of 1100×1250 mm². That is, the dummy region is 10 mm, and the margin is 1% of the length of LCD panel. The process key center (1) is provided at the interval of 14 mm from the edge of the mother substrate in the direction of major axis, and the dummy region (2) is provided at the interval of 10 mm from the edge of the mother substrate in the direction of minor axis. The eight LCD panels of the 23-inch model are arranged in a matrix (4 column×2 row) in the margin of 6 mm from the process key center (1), and in the margin of 2.85 mm from the dummy region (2), wherein the margin between each column is 4.5 mm, and the margin between each row is 12.6 mm.

In FIG. 8B, the eight LCD panels of the 23-inch model are arranged in the matrix type (4 column×2 row), and the major axis of the LCD panel corresponds to the minor axis of the mother substrate. Also, the margin value is not limited to the above description, which can be controllable within ±30%. According to the above arrangement of LCD panels on the mother substrate, it is possible To achieve substrate efficiency of 90% or more.

Figure 8C:
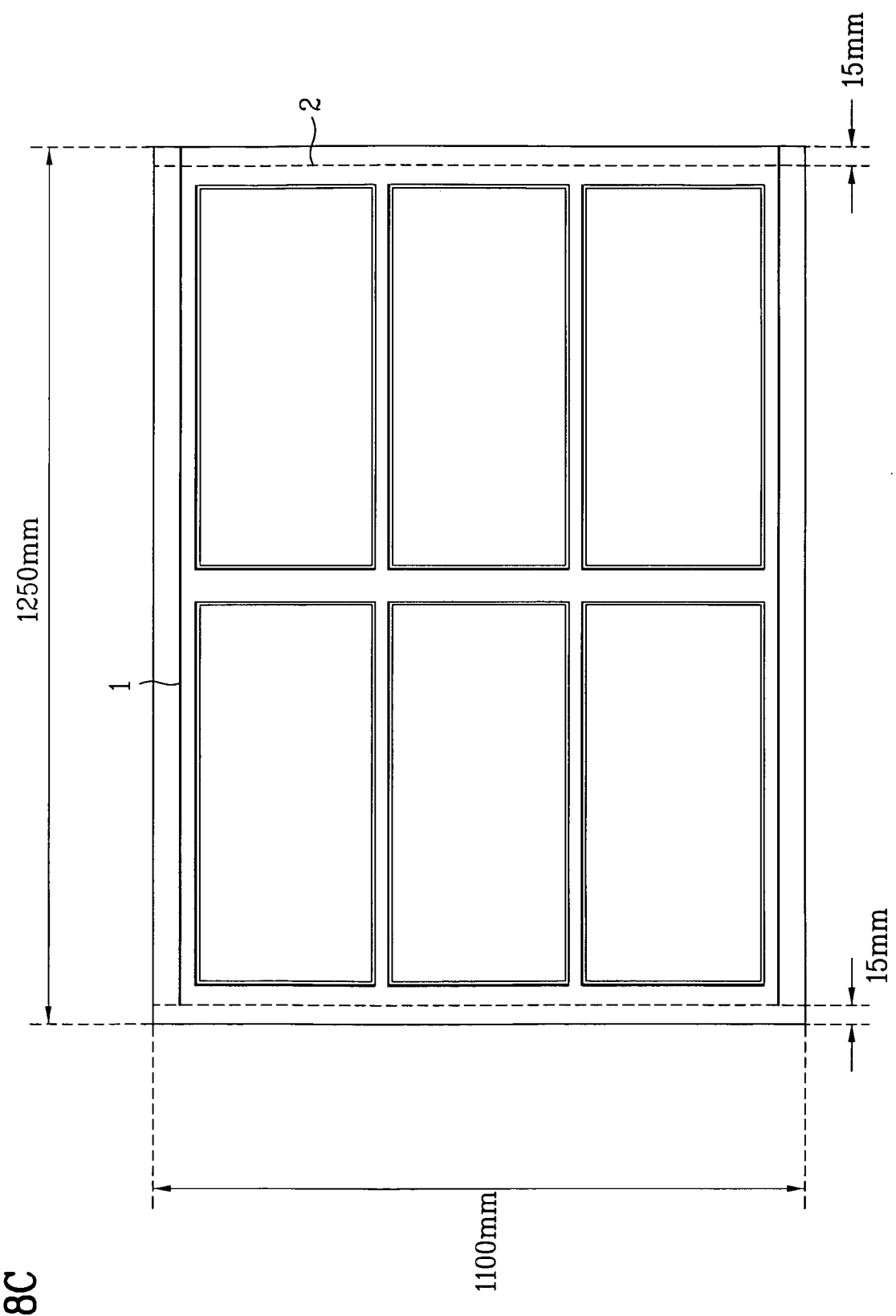

FIG. 8C illustrates the layout of arranging six LCD panels (2 column×3 row) of the 24-inch model (24WU, picture ratio of 16:9, IPS mode, virtual diagonal length of 23.93-inch, panel size of 529×336 mm²) on the mother substrate having a size of 1100×1250 mm². That is, the six LCD panels of the 24-inch model are arranged in a matrix (2 column×3 row) in the similar margin above mentioned, wherein the major axis of the LCD panel corresponds to the major axis of the mother substrate.

Figure 8D:
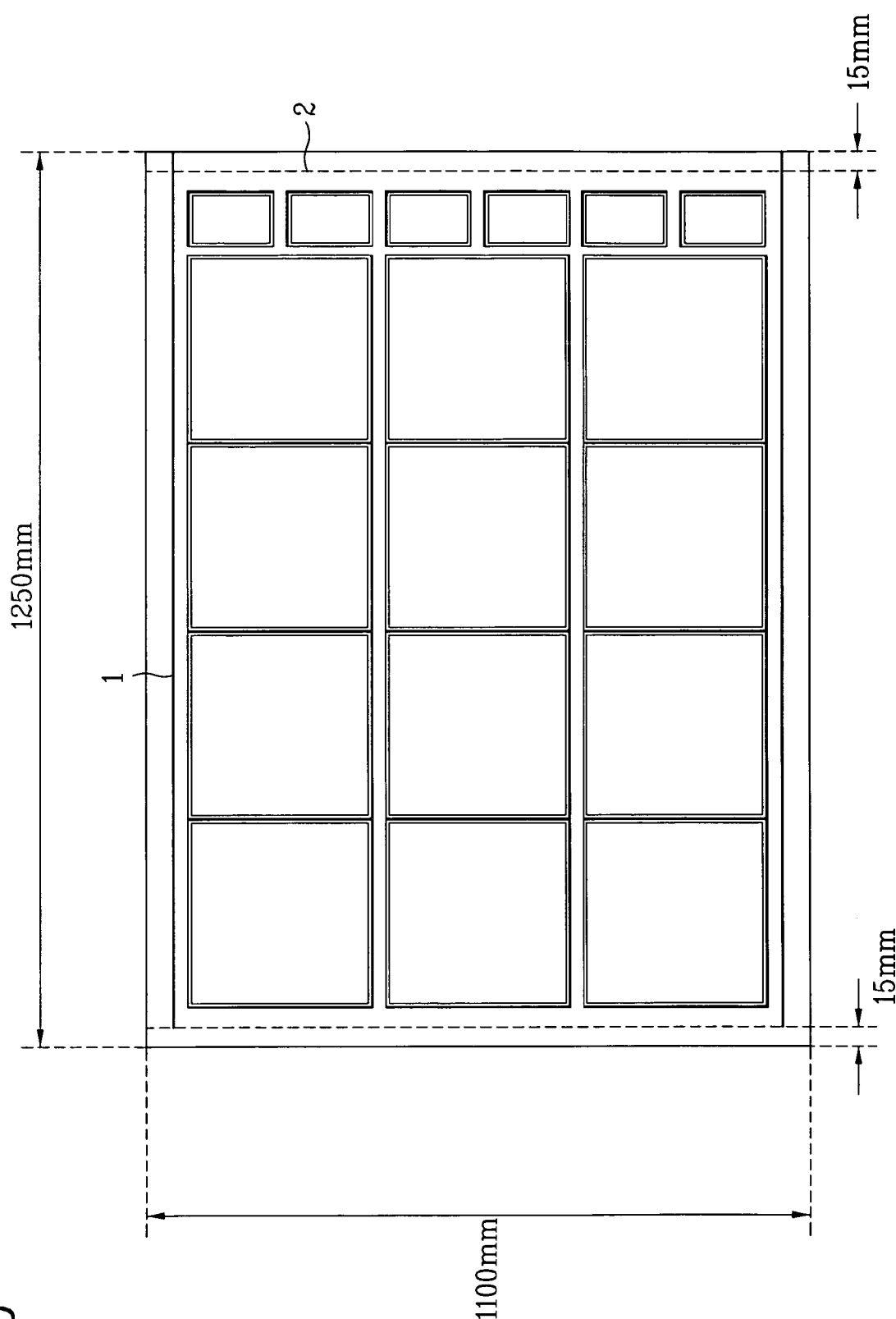

FIG. 8D illustrates the layout of arranging twelve LCD panels (4 column×3 row) of the 17-inch model (17SX, picture ratio of 5:4, TN mode, virtual diagonal length of 17.04-inch, panel size of 347×278.9 mm$^2$) on the mother substrate having a size of 1100×1250 mm$^2$, and arranging six LCD panels of 7-inch wide mode (7X, picture ratio of 16:9, TN mode, panel size of 162.7×90.2 mm$^2$) on the mother substrate. If arranging only the twelve LCD panels of the 17-inch wide mode, the substrate efficiency is below 90%. However, according as the six LCD panels of 7-inch wide mode are additionally formed on the mother substrate, it is possible To achieve substrate efficiency of 90% or more. That is, the twelve LCD panels of the 17-inch wide mode are arranged as the matrix (4 column×3 row) in the similar margin above mentioned, and the six LCD panels of 7-inch wide mode are arranged as one column, wherein the major axis of the LCD panel corresponds to the minor axis of the mother substrate.

FIG. 8E illustrates the layout of arranging fifteen LCD panels (5 column×3 row) of the 15-inch model (15X, picture ratio of 3:4, TN mode, virtual diagonal length of 14.97-inch, panel size of 312.2×235.6 mm$^2$) on the mother substrate having a size of 1100×1250 mm$^2$. That is, the fifteen LCD panels of the 15-inch model are arranged in a matrix (5 column×3 row) in the similar margin above mentioned, wherein the major axis of the LCD panel corresponds to the minor axis of the mother substrate.

Figure 8F:
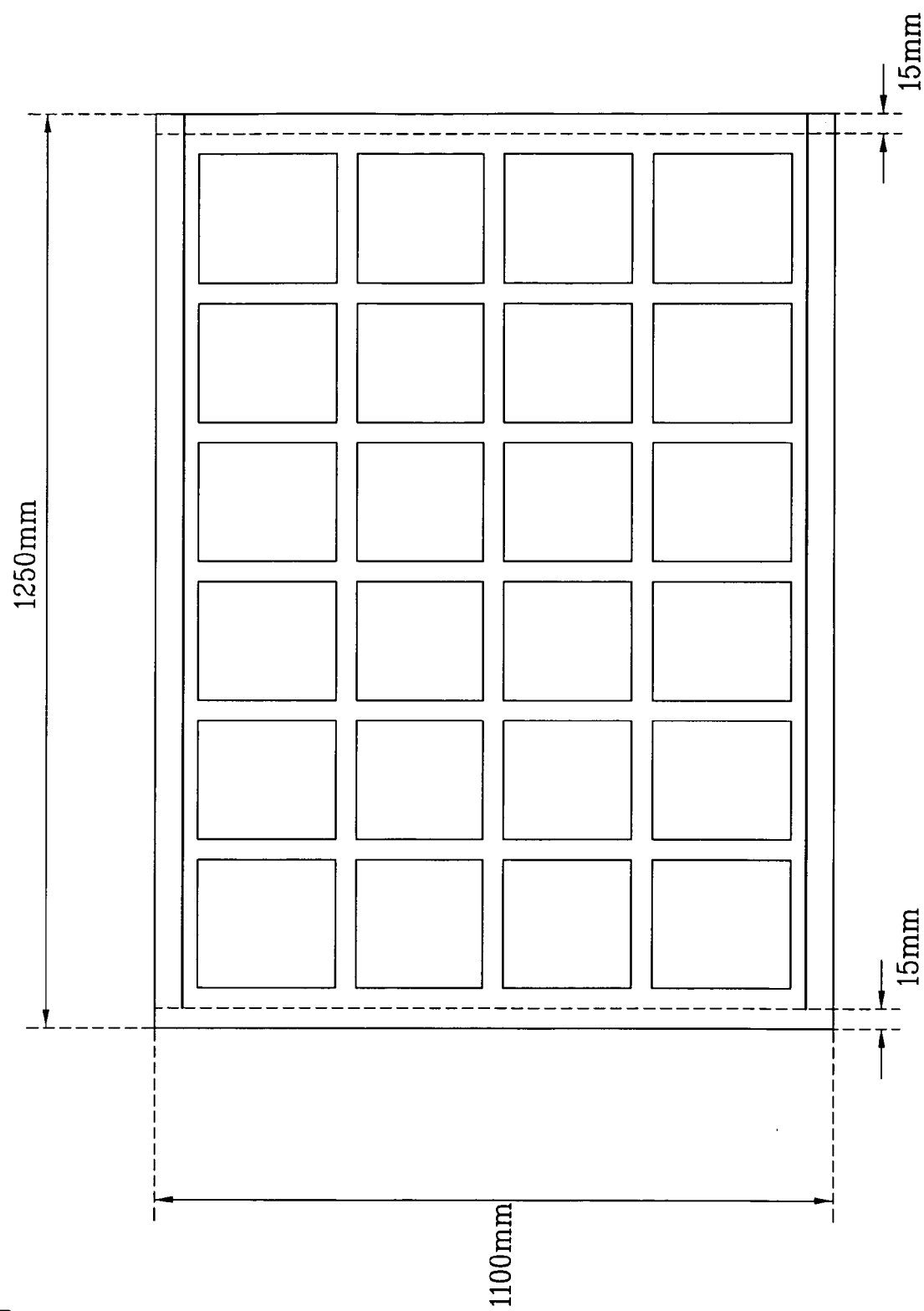

FIG. 8F illustrates the layout of arranging twenty four LCD panels (6 column×4 row) of the 12.1-inch model for notebook computers (12.1XGA, picture ratio of 3:4, TN mode, panel size of 254.5×192.6 mm$^2$) on the mother substrate having a size of 1100×1250 mm$^2$. That is, the twenty four LCD panels of the 12.1-inch model are arranged in a matrix (6 column×4 row) in the similar margin above mentioned, wherein the major axis of the LCD panel corresponds to the minor axis of the mother substrate.

Figure 8G:
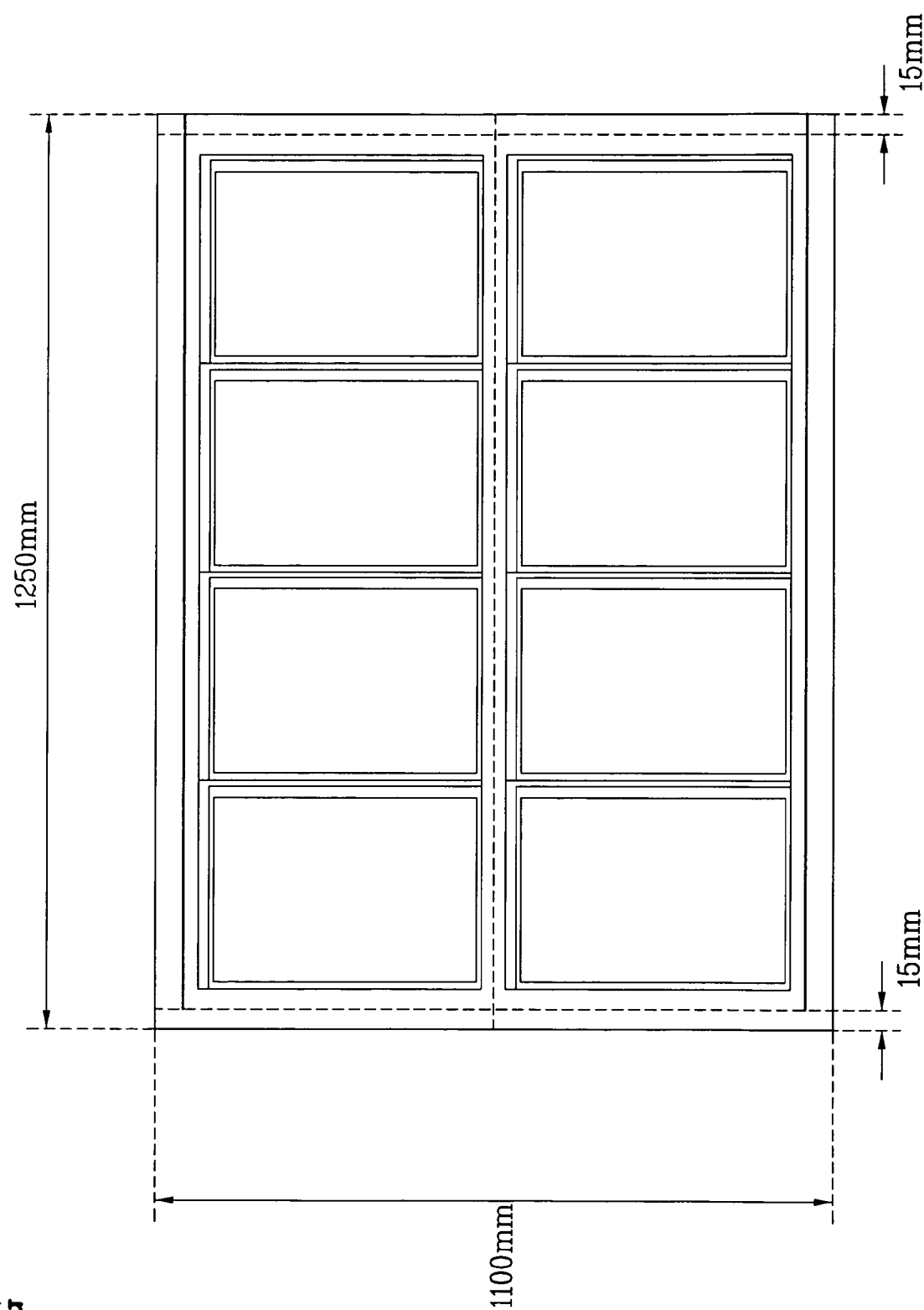

FIG. 8G illustrates the layout of arranging eight LCD panels (4 column×2 row) of the 22-inch model (22WSX) for monitors on the mother substrate having a size of 1100×1250 mm$^2$. That is, the eight LCD panels of the 22-inch model are arranged in a matrix (4 column×2 row) in the similar margin above mentioned, wherein the major axis of the LCD panel corresponds to the minor axis of the mother substrate.

Figure 8H:
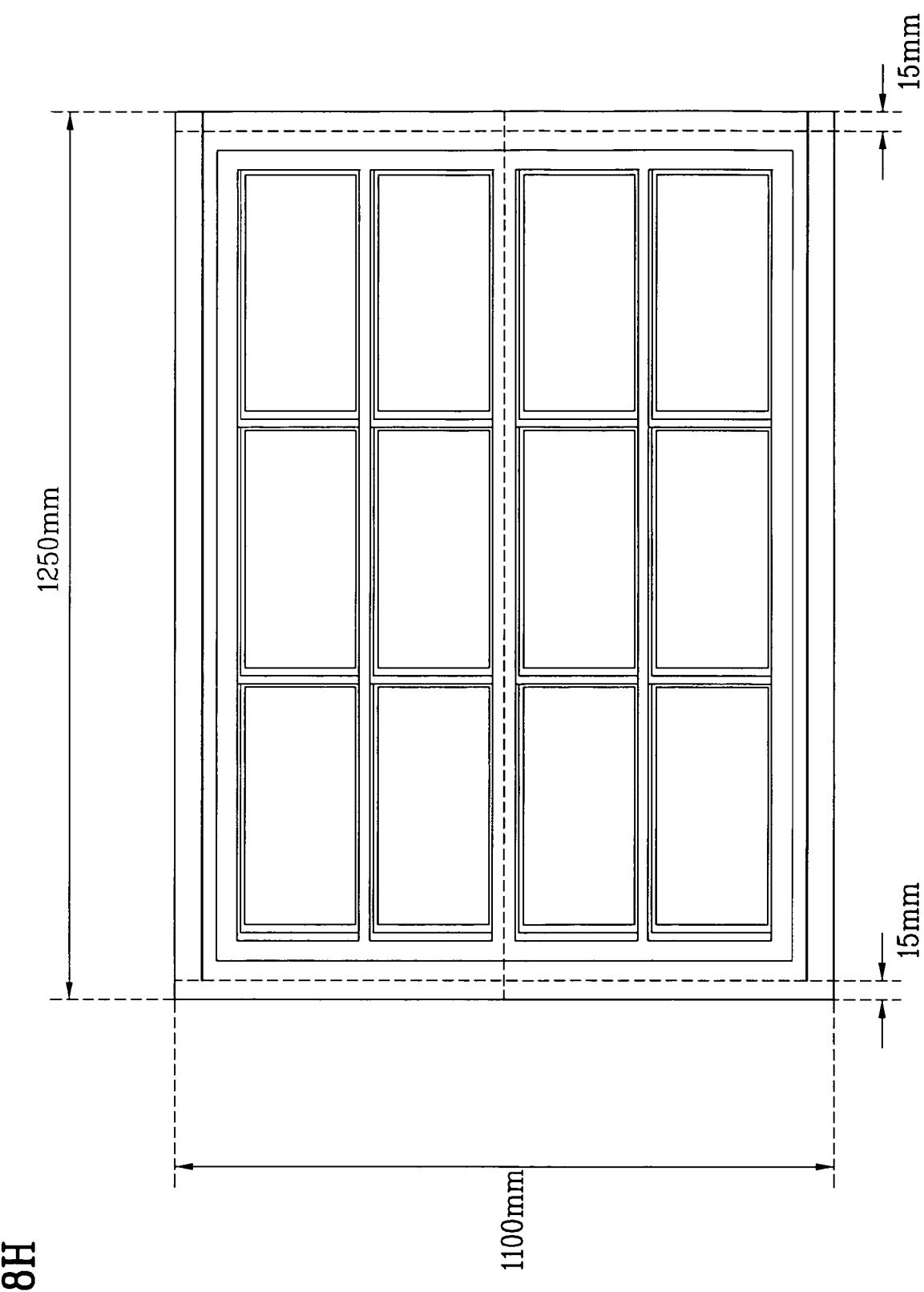

FIG. 8H illustrates the layout of arranging twelve LCD panels (4 column×3 row) of the 18-inch model for monitors (18WX, picture ratio of 16:10, TN mode) on the mother substrate having a size of 1100×1250 mm$^2$. That is, the twelve LCD panels of the 18-inch model are arranged in a matrix (4 column×3 row) in the similar margin above mentioned, wherein the major axis of the LCD panel corresponds to the major axis of the mother substrate.

Figure 8I:
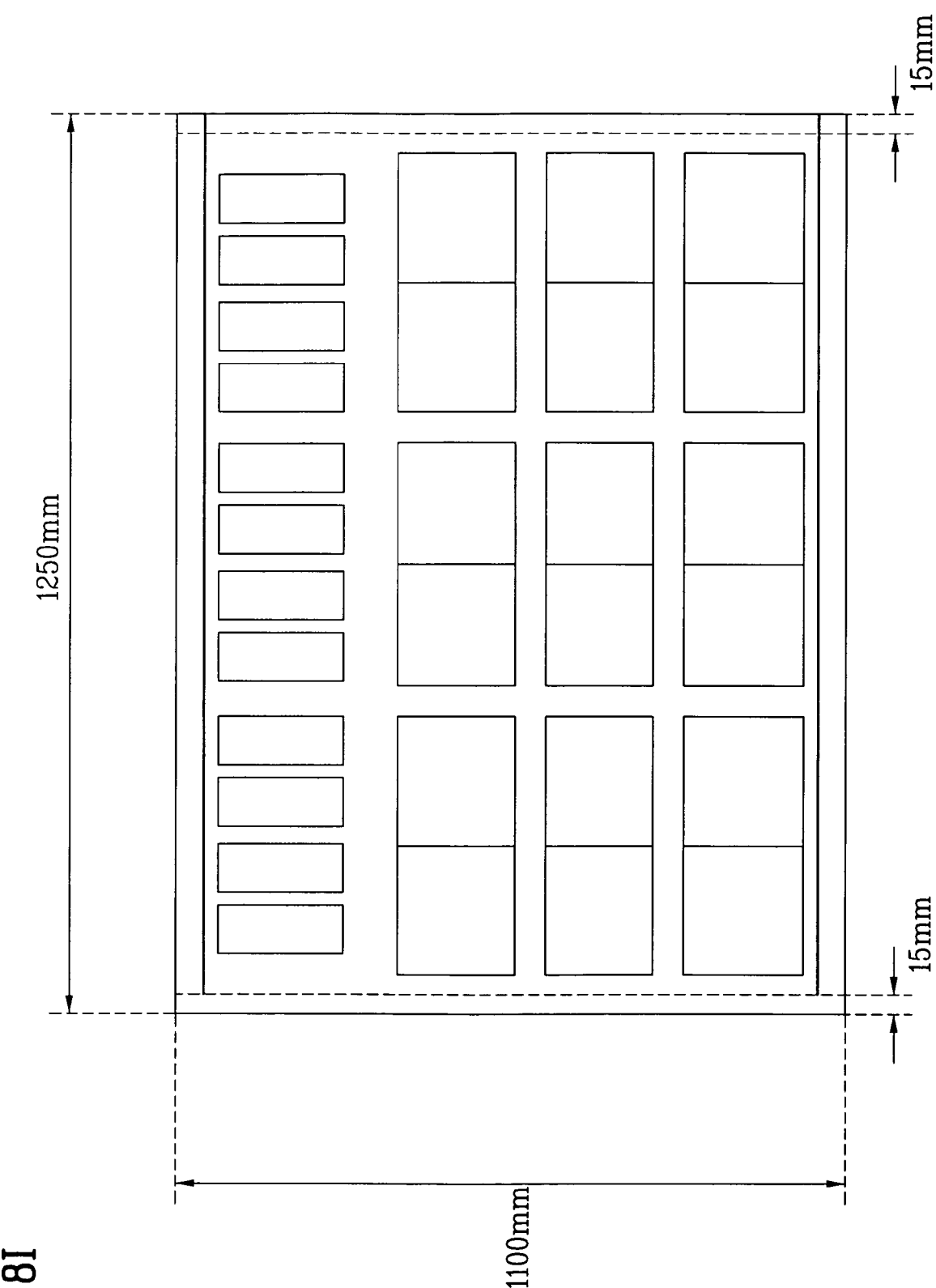

FIG. 8I illustrates the layout of arranging eighteen LCD panels (6 column×3 row) of the 14.1-inch model (14.1W, picture ratio of 16:10, TN mode, virtual diagonal length of 14.08-inch, panel size of 311.74×197.44 mm$^2$) on the mother substrate having a size of 1100×1250 mm$^2$, and arranging twelve LCD panels of the 4-inch model (picture ratio of 3:4, TN mode, panel size of 91.6×71.2 mm$^2$) on the mother substrate. That is, the eighteen LCD panels of the 14.1-inch model are arranged in a matrix (6 column×3 row) in the similar margin above mentioned, wherein the major axis of the LCD panel corresponds to the minor axis of the mother substrate. In addition, the twelve LCD panels of the 4-inch model are arranged on the mother substrate along one row. In this case, the LCD panels of the 14.1-inch model are arranged at the small interval.

In FIGS. 2 to 4, if arranging the eight LCD panels of the 26-inch model (26WX, picture ratio of 16:9, IPS mode, virtual diagonal length of 26.0-inch, panel size of 590.9×341.5 mm$^2$), the size of the mother substrate satisfies 1218~1353× 1399~1555 mm$^2$ for realization of substrate efficiency of 90% or more. The optimal size of the mother substrate corresponds to 1300×1500 mm$^2$.

Figure 9:
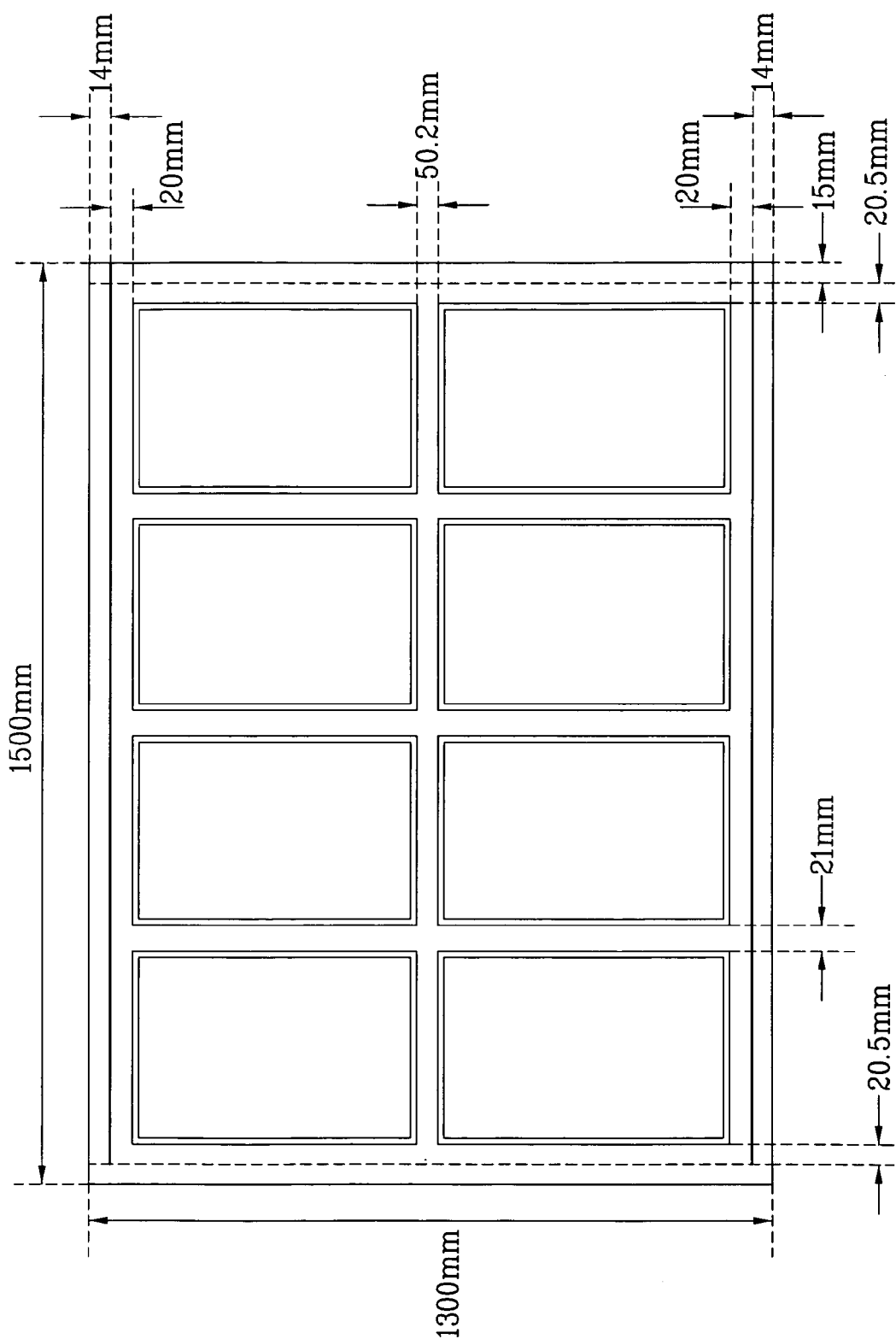
FIG. 9 is a layout of arranging eight 26-inch models on the mother substrate having a size of 1300×1500 mm², according to the second embodiment of the present invention.

FIG. 9 is a layout of arranging eight 26-inch models on the mother substrate having a size of 1300×1500 mm$^2$, according to the second embodiment of the present invention.

That is, as illustrated in FIG. 9, the dummy region is 15 mm, and the margin is 0.3~5% of the length of LCD panel. The process key center (1) is provided at the interval of 14 mm from the edge of the mother substrate in the direction of major axis, and the dummy region (2) is provided at the interval of 15 mm from the edge of the mother substrate in the direction of minor axis. The eight LCD panels of the 26-inch model are arranged in a matrix (4 column×2 row) in the margin of 20 mm from the process key center (1), and in the margin of 20.5 mm from the dummy region (2), wherein the margin between each column is 21 mm, and the margin between each row is 50.2 mm. In FIG. 9, the LCD panels of the 26-inch model are arranged in a matrix (4 column×2 row), and the major axis of the LCD panel corresponds to the minor axis of the mother substrate.

As explained above, arranging the eight LCD panels of the 32-inch model has a similar size mother substrate as arranging the six LCD panels of the 37-inch model. To achieve substrate efficiency of 90% or more, the size of the mother substrate satisfies 1467~1630×1686~1873 mm$^2$ when arranging the eight LCD panels of the 32-inch wide mode, and the size of the mother substrate satisfies 1490~1656× 1730~1923 mm$^2$ when arranging the six LCD panels of the 37-inch model.

In the above conditions relating the size of mother substrate, the optimal size of the mother substrate is 1500×1850 mm$^2$.

The layout of the cases for arranging the eight LCD panels of the 32-inch model on the mother substrate (1500×1850 mm$^2$) and arranging the six LCD panels of the 37-inch model on the mother substrate (1500×1850 mm$^2$) will be explained as follows. FIGS. 10A to 10J are layouts illustrating the respective models on the mother substrate having a size of 1500×1850 mm$^2$, according to the third embodiment of the present invention.

Figure 10A:
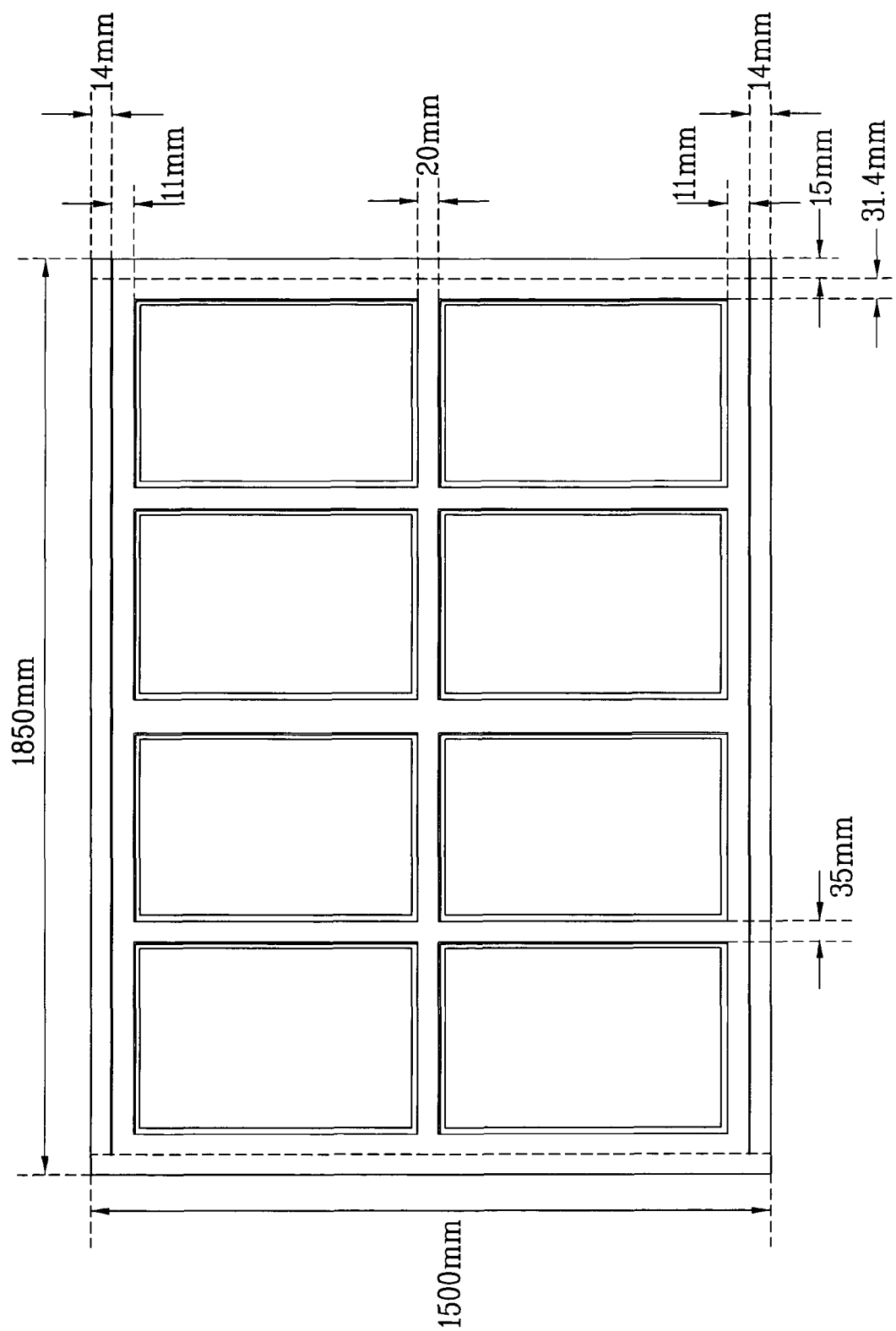
FIGS. 10A to 10J are layouts illustrating the respective models on the mother substrate having a size of 1500×1850 mm², according to the third embodiment of the present invention.

FIG. 10A illustrates the layout of arranging eight LCD panels (4 column×2 row) of the 32-inch model (32WX, picture ratio of 16:9, IPS mode, virtual diagonal length of 31.5-inch, panel size of 715.0×413.05 mm$^2$) on the mother substrate having a size of 1500×1850 mm$^2$. That is, the dummy region is 15 mm, and the margin is 0.3~5% of the length of LCD panel. The process key center (1) is provided at the interval of 14 mm from the edge of the mother substrate in the direction of major axis, and the dummy region (2) is provided at the interval of 15 mm from the edge of the mother substrate in the direction of minor axis. The eight LCD panels of the 32-inch model are arranged in a matrix (4 column×2 row) in the margin of 11 mm from the process key center (1), and in the margin of 31.4 mm from the dummy region (2), wherein the margin between each column is 35 mm, and the margin between each row is 20 mm. In FIG. 10A, the eight LCD panels of the 32-inch model are arranged in the matrix type (4 column×2 row), and the major axis of the LCD panel corresponds to the minor axis of the mother substrate.

Figure 10B:
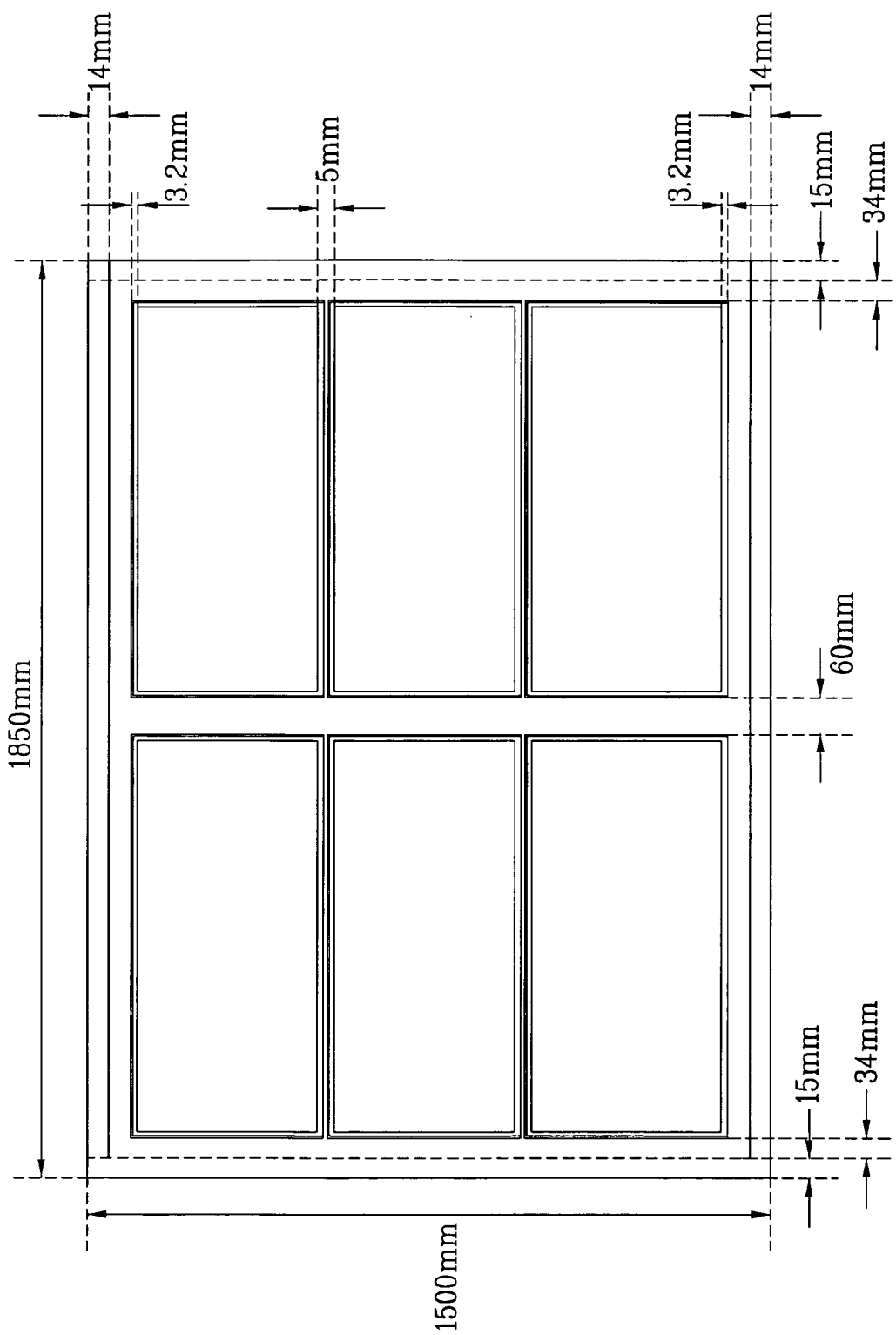

FIG. 10B illustrates the layout of arranging six LCD panels (2 column×3 row) of the 37-inch model (37WU, picture ratio of 16:9, IPS mode, virtual diagonal length of 37.0-inch, panel size of 846.0×485.2 mm$^2$) on the mother substrate having a size of 1500×1850 mm$^2$. That is, the dummy region is 15 mm, and the margin is 0.3~5% of the length of LCD panel. The process key center (1) is provided at the interval of 14 mm from the edge of the mother substrate in the direction of major axis, and the dummy region (2) is provided at the interval of 15 mm from the edge of the mother substrate in the direction of minor axis. The six LCD panels of the 37-inch model are arranged in a matrix (2 column×3 row) in the margin of 3.2 mm from the process key center (1), and in the margin of 34 mm from the dummy region (2), wherein the margin between each column is 60 mm, and the margin between each row is 5 mm. In FIG. 10B, the six LCD panels of the 37-inch model are arranged in the matrix type (2 column×3 row), and the major axis of the LCD panel corresponds to the major axis of the mother substrate.

Figure 10C:
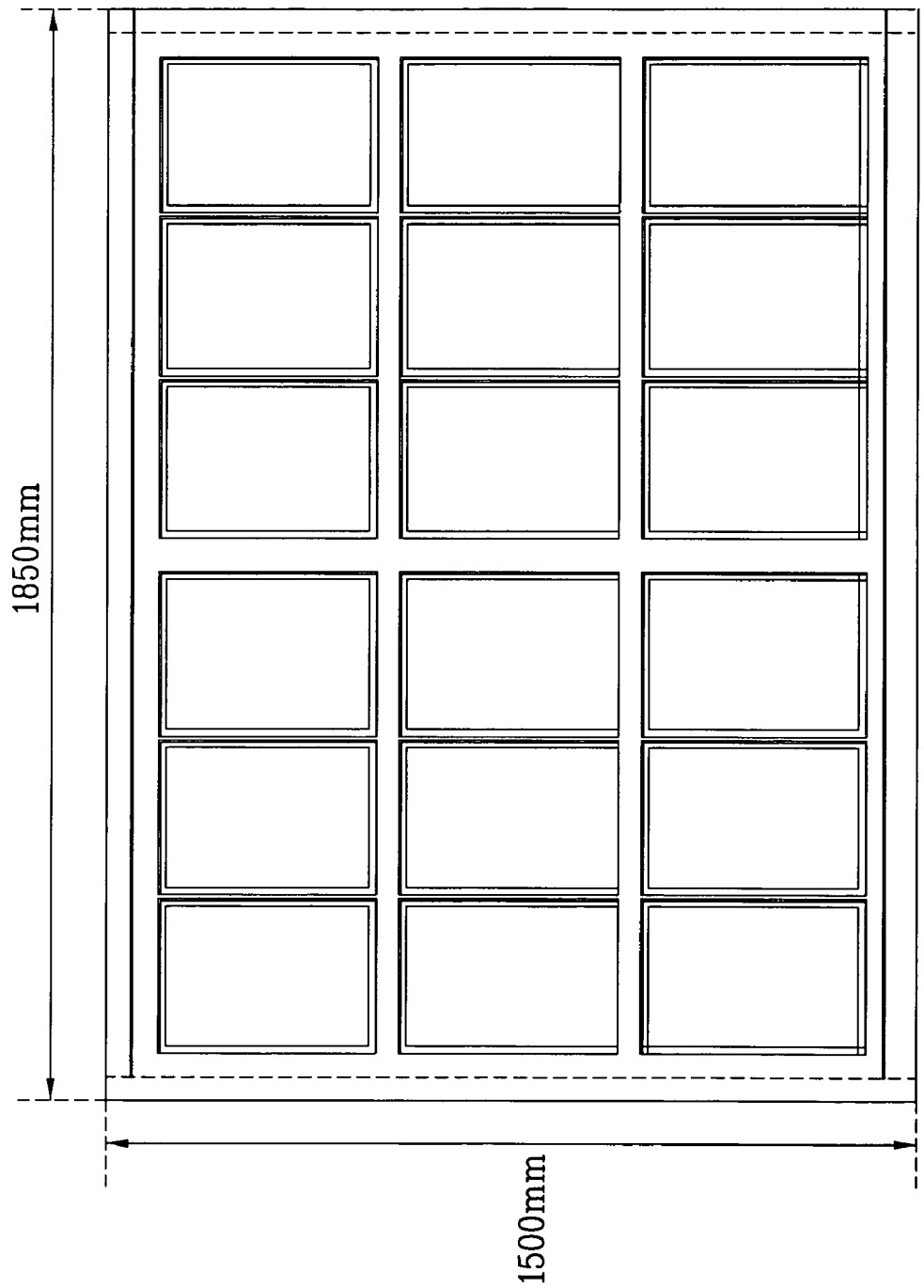

FIG. 10C illustrates the layout of arranging eighteen LCD panels (6 column×3 row) of the 20.1-inch model for monitors (20.1WSX, picture ratio of 16:9, IPS mode) on the mother substrate having a size of 1500×1850 mm$^2$. That is, the eighteen LCD panels of the 20.1-inch model are arranged in a matrix (6 column×3 row) in the similar margin above mentioned, wherein the major axis of the LCD panel corresponds to the minor axis of the mother substrate.

Figure 10D:
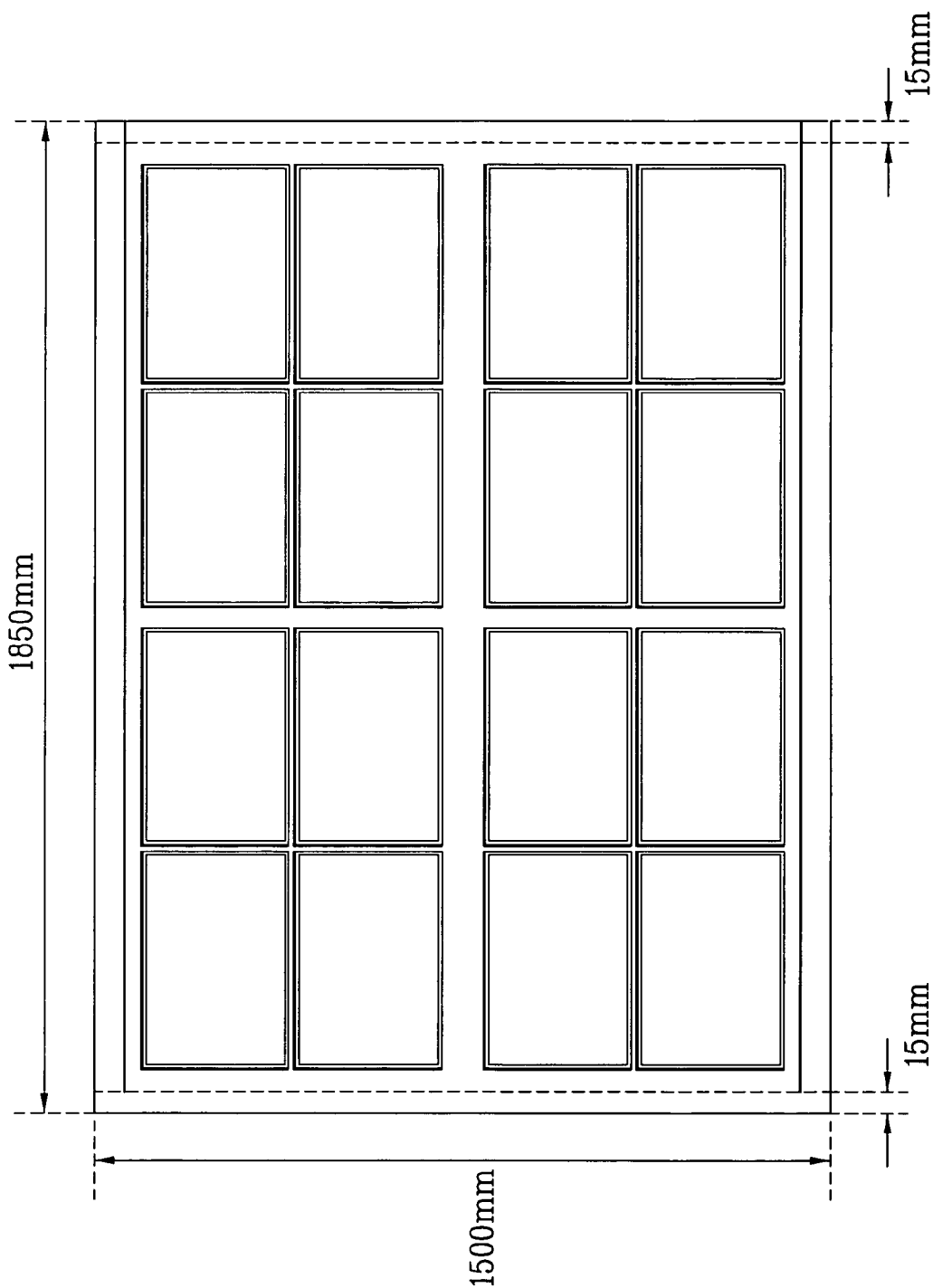

FIG. 10D illustrates the layout of arranging sixteen LCD panels (4 column×4 row) of the 20.1-inch model for monitors (20.1X, picture ratio of 3:4, IPS mode, virtual diagonal length of 20.08-inch, panel size of 422.5×317.5 mm$^2$) on the mother substrate having a size of 1500×1850 mm$^2$. That is, the sixteen LCD panels of the 20.1-inch model are arranged in a matrix (4 column×4 row) in the similar margin above mentioned, wherein the major axis of the LCD panel corresponds to the major axis of the mother substrate.

Figure 10E:
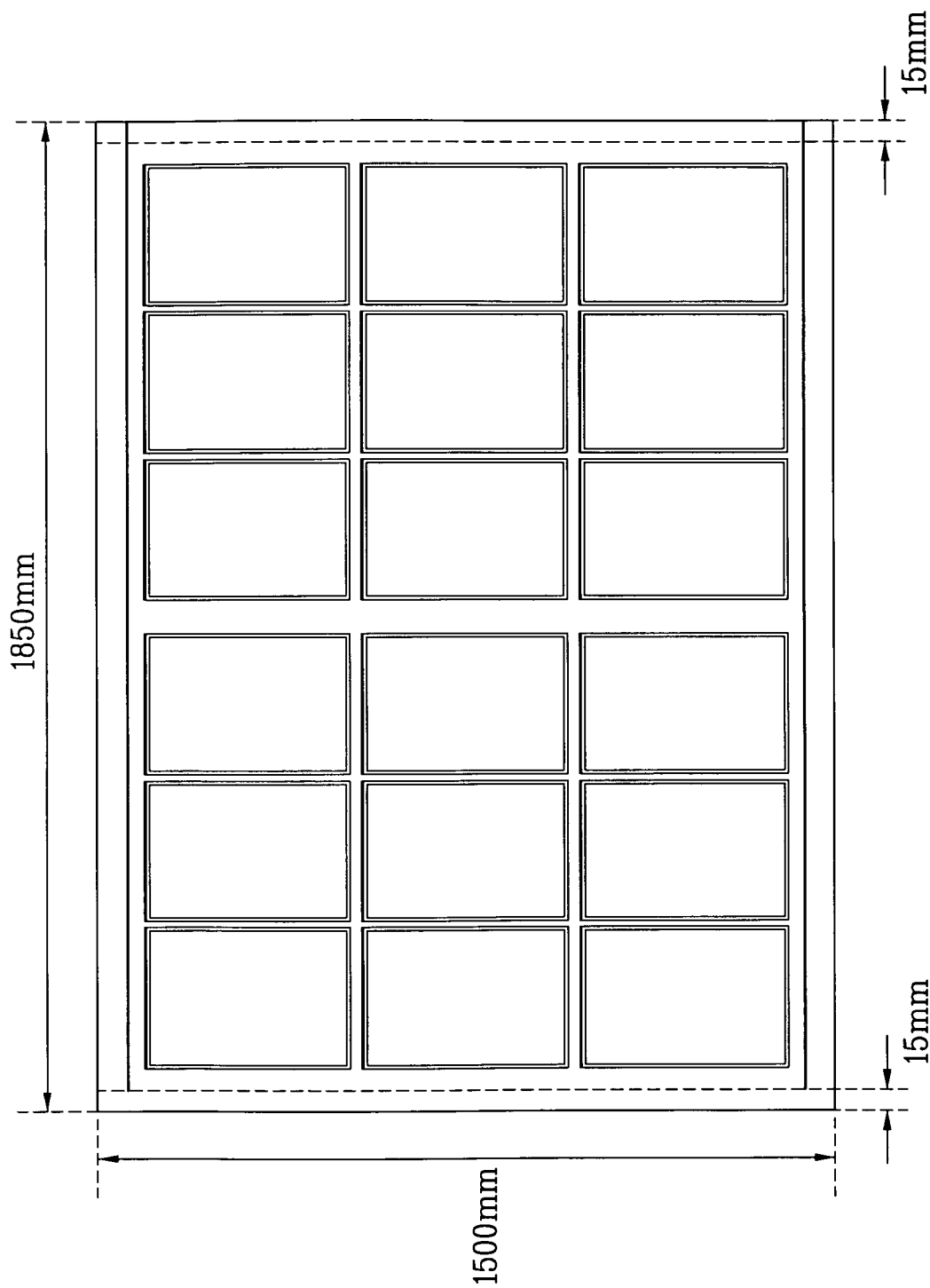

FIG. 10E illustrates the layout of arranging eighteen LCD panels (6 column×3 row) of the 17-inch model (17SX, picture ratio of 5:4, TN mode, virtual diagonal length of 17.04-inch, panel size of 347×278.9 mm$^2$) on the mother substrate having a size of 1500×1850 mm$^2$. That is, the eighteen LCD panels of the 17-inch model are arranged in a matrix (6 column×3 row) in the similar margin above mentioned, wherein the major axis of the LCD panel corresponds to the minor axis of the mother substrate.

Figure 10F:
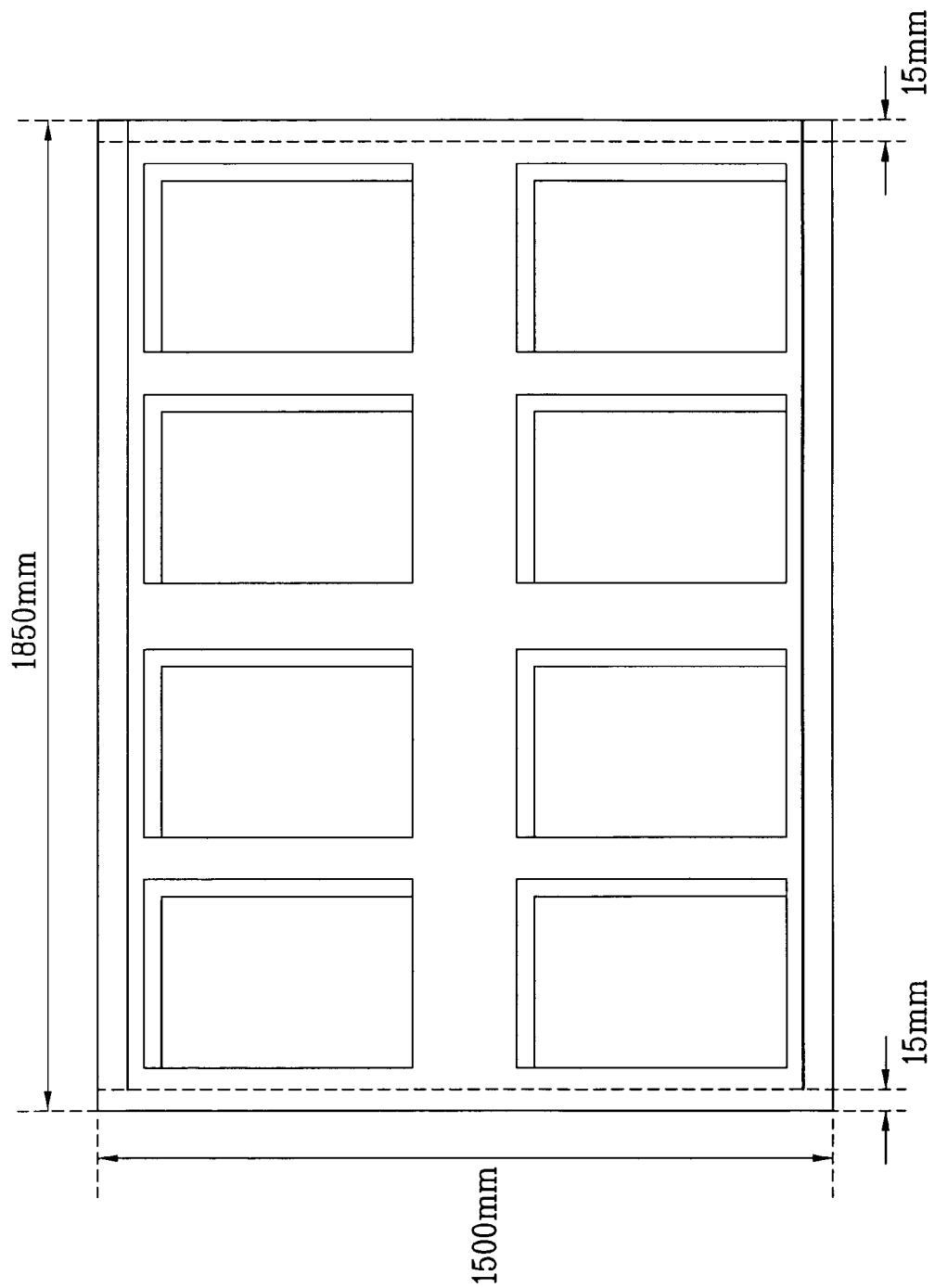

FIG. 10F illustrates the layout of arranging eight LCD panels (4 column×2 row) of the 30-inch model (30WQX, picture ratio of 16:10, IPS mode, virtual diagonal length of 29.95-inch, panel size of 661×419 mm$^2$) on the mother substrate having a size of 1500×1850 mm$^2$. That is, the eight LCD panels of the 30-inch model are arranged in a matrix (4 column×2 row) in the similar margin above mentioned, wherein the major axis of the LCD panel corresponds to the minor axis of the mother substrate.

Figure 10G:
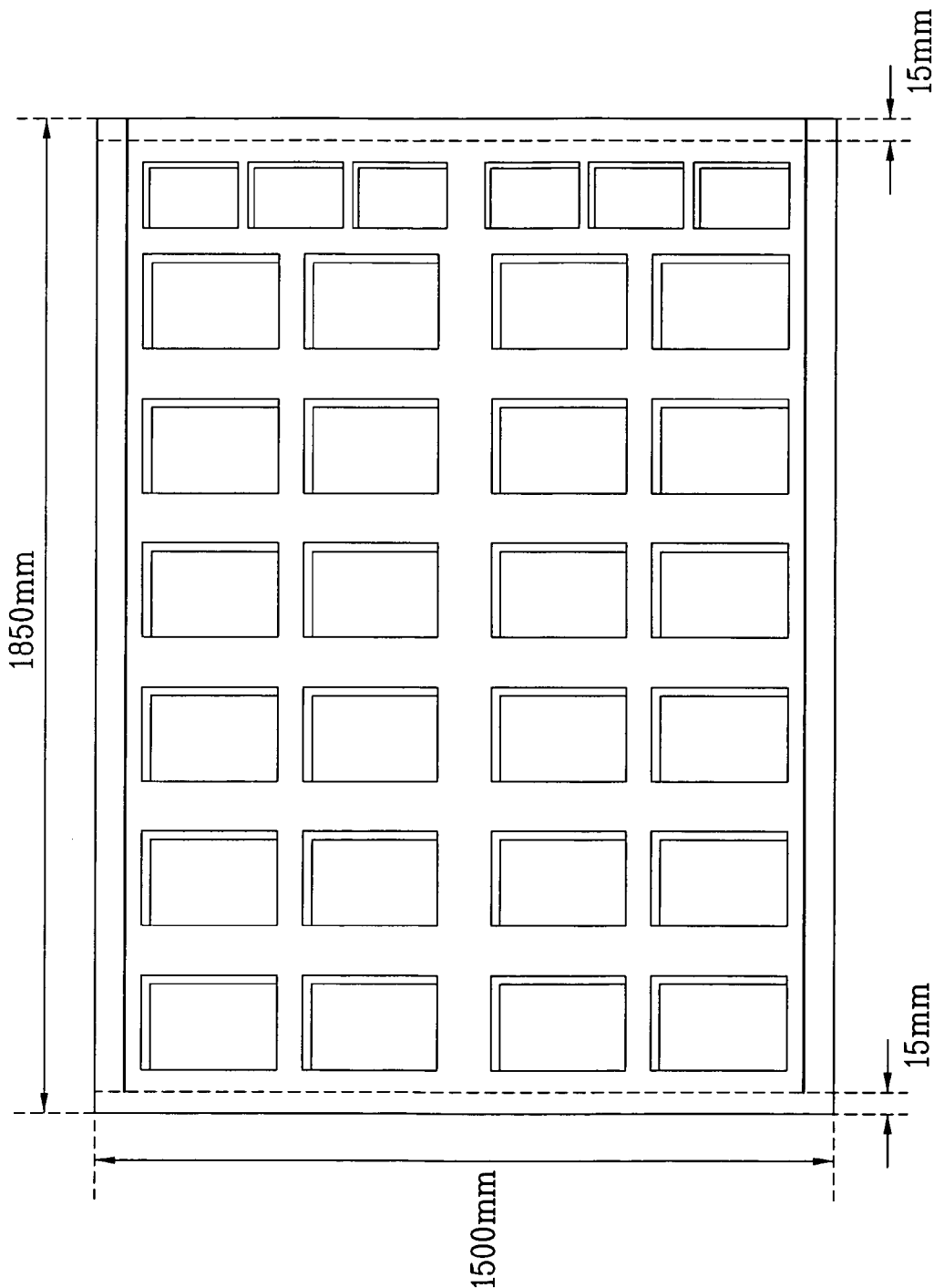

FIG. 10G illustrates the layout of arranging twenty four LCD panels (6 column×4 row) of the 17-inch model (17SX, picture ratio of 5:4, TN mode, virtual diagonal length of 17.04-inch, panel size of 347×278.9 mm$^2$) on the mother substrate having a size of 1500×1850 mm$^2$, and arranging six LCD panels of 8-inch model (8W, picture ratio of 16:9, IPS mode, panel size of 191.6×115.2 mm$^2$) on the mother substrate. That is, the twenty four LCD panels of the 17-inch model are arranged in a matrix (6 column×4 row) in the similar margin above mentioned, wherein the major axis of the LCD panel corresponds to the minor axis of the mother substrate. In addition, the six LCD panels of 8-inch model are arranged as one row.

Figure 10H:
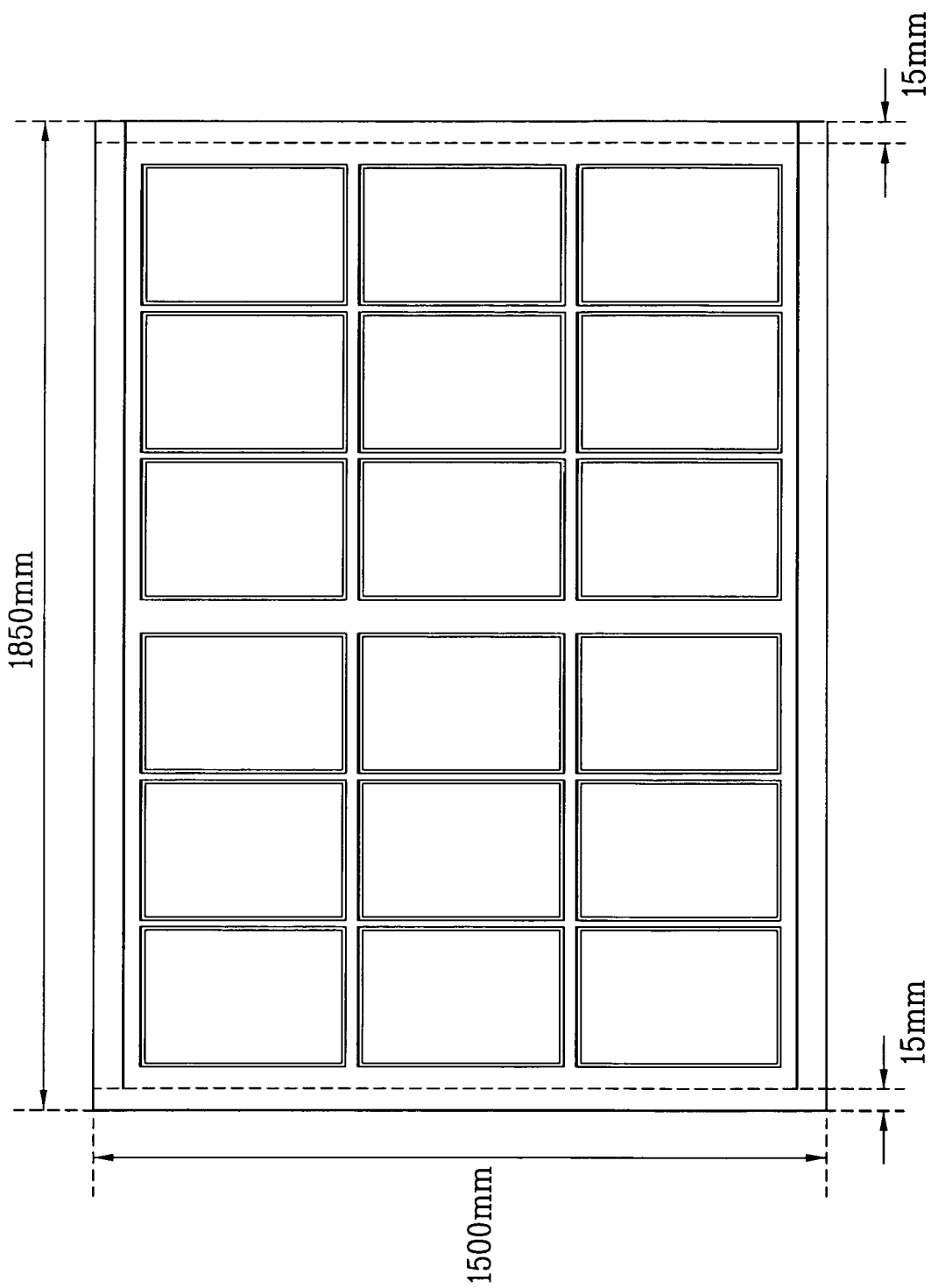

FIG. 10H illustrates the layout of arranging eighteen LCD panels (6 column×3 row) of 20-inch model (20WSX, picture ratio of 16:9, TN mode, panel size of 452.584×258.832 mm$^2$) on the mother substrate having a size of 1500×1850 mm$^2$. That is, the eighteen LCD panels of the 20-inch model are arranged in a matrix (6 column×3 row) in the similar margin above mentioned, wherein the major axis of the LCD panel corresponds to the minor axis of the mother substrate.

Figure 10I:
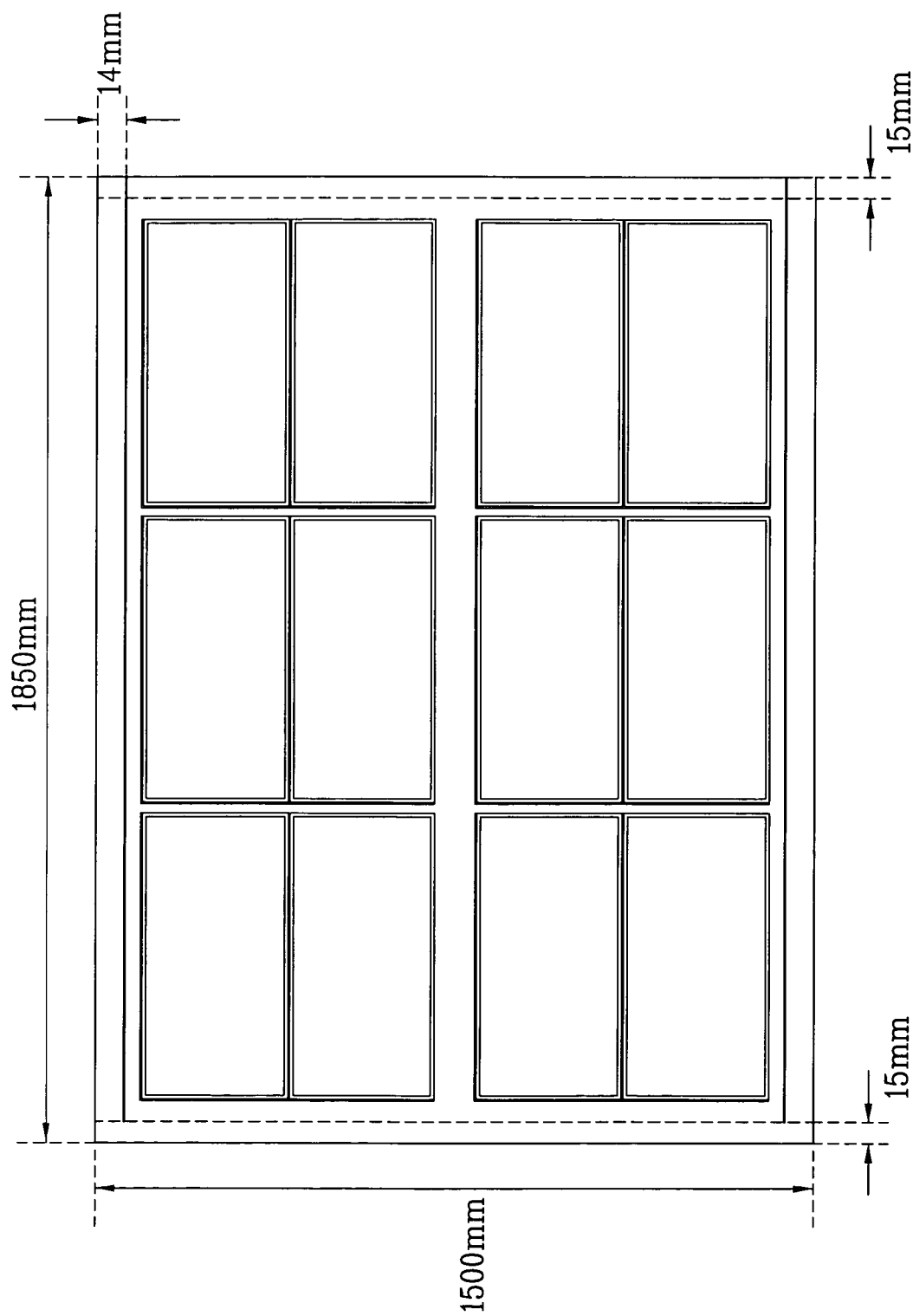

FIG. 10I illustrates the layout of arranging twelve LCD panels (4 column×3 row) of the 26-inch model (26WX, picture ratio of 16:9, IPS mode, virtual diagonal length of 26.0-inch, panel size of 590.9×341.5 mm$^2$) on the mother substrate having a size of 1500×1850 mm$^2$. That is, the twelve LCD panels of the 26-inch model are arranged in a matrix (4 column×3 row) in the similar margin above mentioned, wherein the major axis of the LCD panel corresponds to the major axis of the mother substrate.

Figure 10J:
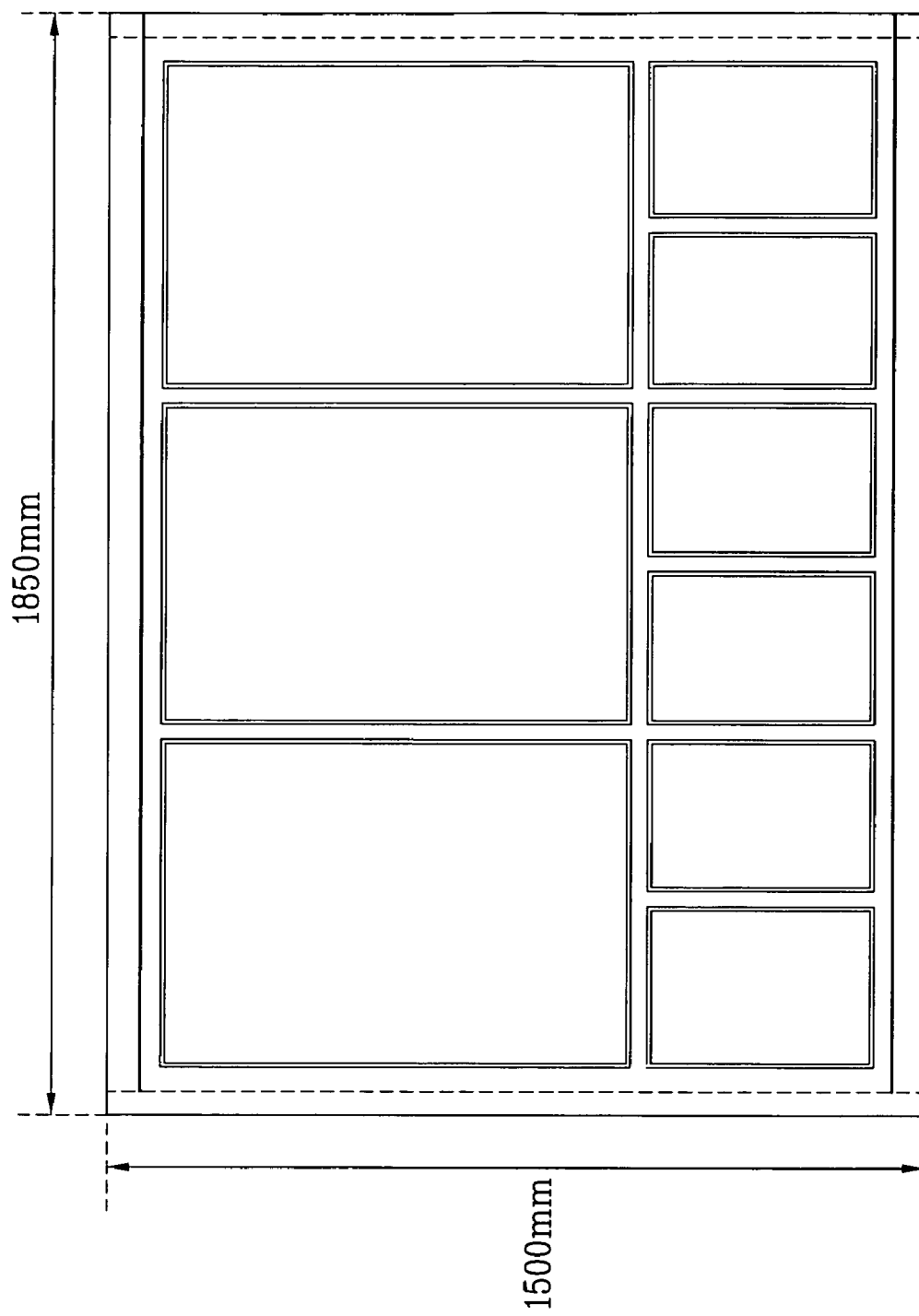

FIG. 10J illustrates the layout of arranging three LCD panels (3 column×1 row) of the 42-inch model (42WU, picture ratio of 16:9, IPS mode, virtual diagonal length of the 42-inch, panel size of 956.0×549.0 mm$^2$) on the mother substrate having a size of 1500×1850 mm$^2$, and arranging six LCD panels (6 column×1 row) of the 20.1-inch model (20.1WSX, picture ratio of 16:9, IPS mode) on the mother substrate. That is, the three LCD panels of the 42-inch model are arranged in a matrix (3 column×1 row) in the similar margin above mentioned, wherein the major axis of the LCD panel corresponds to the minor axis of the mother substrate. In addition, the six LCD panels of the 20.1-inch model are arranged as one row on the mother substrate.

In addition, arranging the eight LCD panels of the 42-inch model has a similar size mother substrate as arranging the six LCD panels of the 47-inch model. To achieve substrate efficiency of 90% or more, the size of the mother substrate satisfies 1952~2168×2231~2479 mm$^2$ when arranging the eight LCD panels of the 42-inch model, and the size of the mother substrate satisfies 1868~2075×2171~2412 mm$^2$ when arranging the six LCD panels of the 47-inch model. Under these conditions, the optimal size of the mother substrate satisfying the above two cases is 1950×2250 mm$^2$.

The layout of cases for arranging eight LCD panels of the 42-inch model on the mother substrate (1950×2250 mm$^2$) and arranging six LCD panels of the 47-inch model on the mother substrate (1950×2250 mm$^2$) will be explained as follows. FIGS. 11A to 11S are layouts illustrating the respective models on the mother substrate having a size of 1950×2250 mm$^2$, according to the fourth embodiment of the present invention.

FIG. 11A illustrates the layout of arranging eight LCD panels (4 column×2 row) of the 42-inch model (42WU, picture ratio of 16:9, IPS mode, virtual diagonal length of 42-inch, panel size of 956.0×549.0 mm$^2$) on the mother substrate having a size of 1950×2250 mm$^2$. That is, the process key center (1) is provided at the interval of 14 mm from the edge of the mother substrate in the direction of major axis, and the dummy region (2) is provided at the interval of 15 mm from the edge of the mother substrate in the direction of minor axis. The eight LCD panels of the 42-inch model are arranged in a matrix (4 column×2 row) in the margin of 2.5 mm from the process key center (1), and in the margin of 3 mm from the dummy region (2), wherein the margin between each column is 6 mm, and the margin between each row is 5 mm. In FIG. 11A, the eight LCD panels of the 42-inch model are arranged in the matrix type (4 column×2 row), and the major axis of the LCD panel corresponds to the minor axis of the mother substrate. Also, the margin value is not limited to the above description, which can be controllable within ±30%.

FIG. 11B illustrates the layout of arranging six LCD panels (2 column×3 row) of the 47-inch model (47WU, picture ratio of 16:9, IPS mode, virtual diagonal length of 46.96-inch, panel size of 1065×614 mm$^2$) on the mother substrate having a size of 1950×2250 mm$^2$. That is, the process key center (1) is provided at the interval of 14 mm from the edge of the mother substrate in the direction of major axis, and the peripheral exposure region (4) is provided at the interval of 27 mm from the edge of the mother substrate in the direction of minor axis. The six LCD panels of the 47-inch model are arranged in a matrix (2 column×3 row) in the margin of 14 mm from the process key center (1), and in the margin of 17.5 mm from the peripheral exposure region (4), wherein the margin between each column is 31 mm, and the margin between each row is 26 mm. In FIG. 11B, the six LCD panels of the 47-inch model are arranged in the matrix type (2 column×3 row), and the major axis of the LCD panel corresponds to the major axis of the mother substrate. Also, the margin value is not limited to the above description, which can be controllable within ±30%.

Figure 11C:
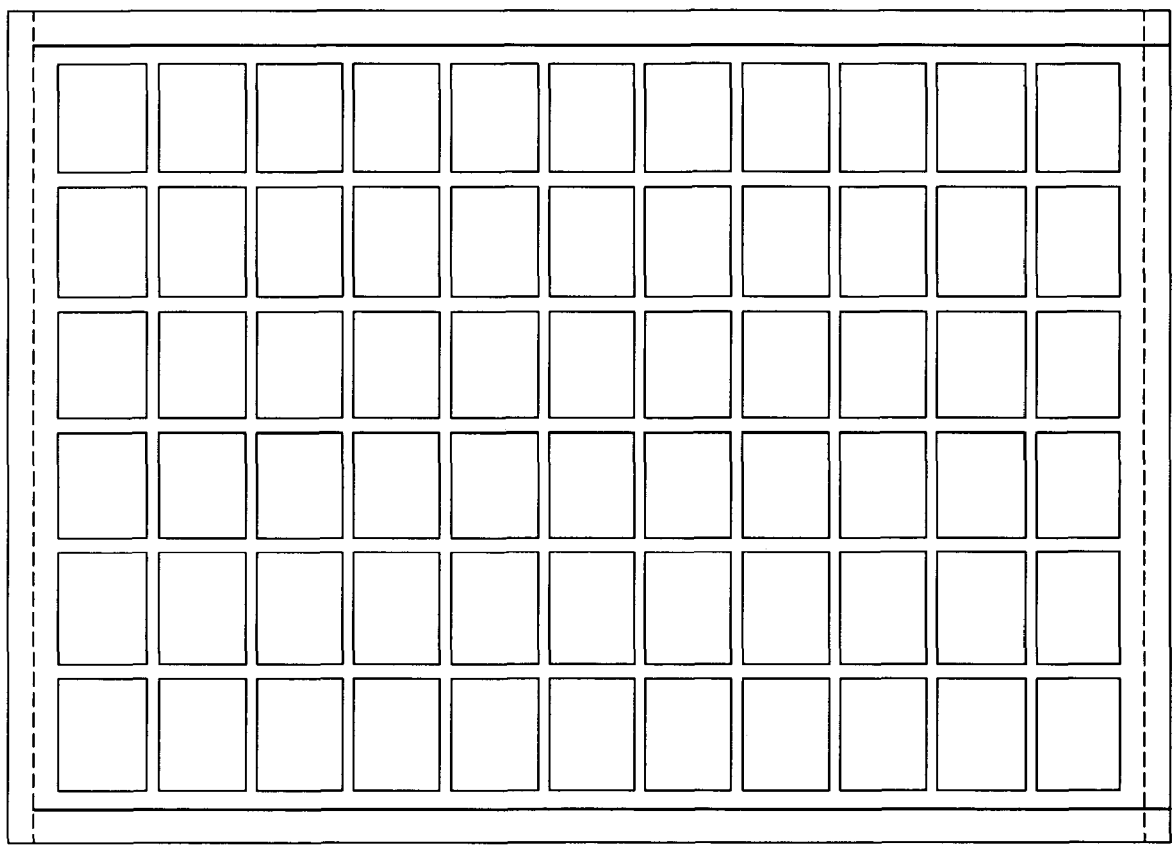
FIGS. 11A to 11S are layouts illustrating the respective models on the mother substrate having a size of 1950×2250 mm², according to the fourth embodiment of the present invention.

FIG. 11C illustrates the layout of arranging sixty six LCD panels (11 column×6 row) of the 14.1-inch model on the mother substrate having a size of 1950×2250 mm$^2$. That is, the sixty six LCD panels of the 14.1-inch model are arranged in a matrix (11 column×6 row) on the mother substrate, and the major axis of the LCD panel corresponds to the minor axis of the mother substrate.

Figure 11D:
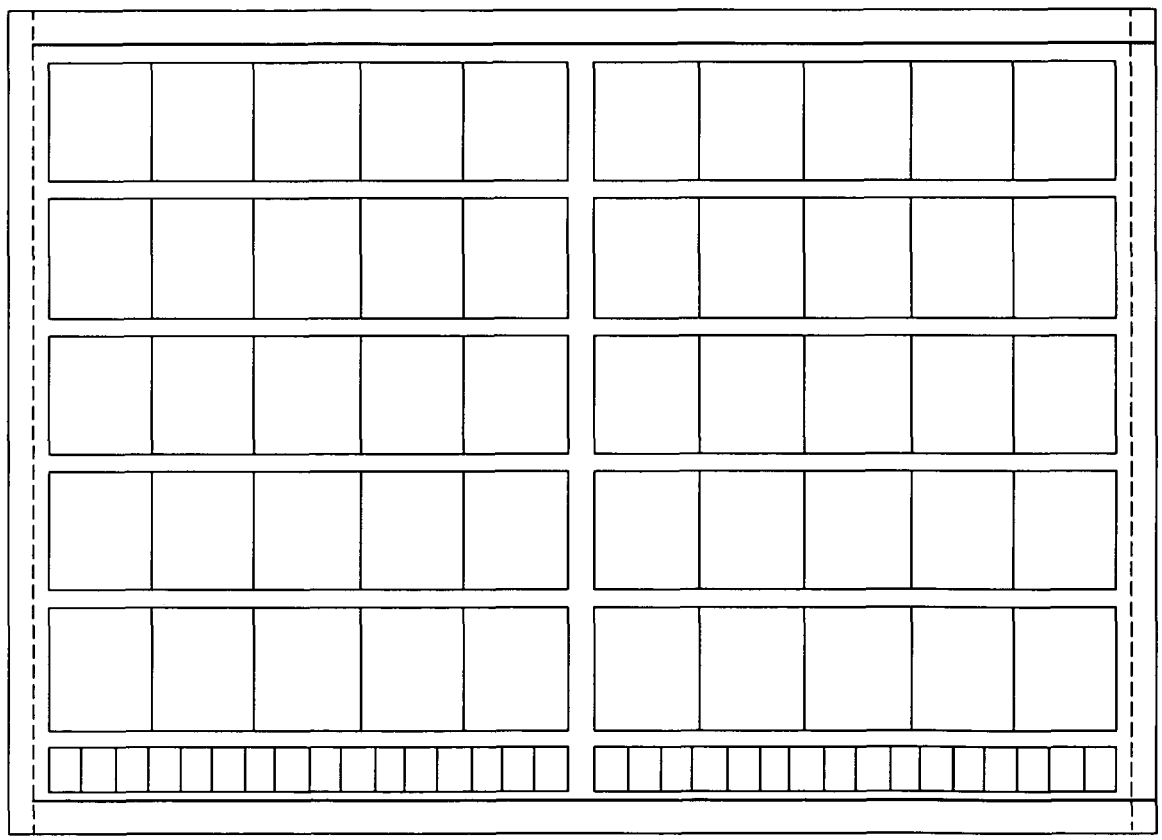

FIG. 11D illustrates the layout of arranging fifty LCD panels (10 column×5 row) of 15.4-inch model (15.4W, picture ratio of 16:10, TN mode, virtual diagonal length of 15.38-inch, panel size of 339.8×215 mm$^2$) on the mother substrate having a size of 1950×2250 mm$^2$, and arranging thirty two LCD panels of the 4-inch model as one row on the mother substrate. That is, the fifty LCD panels of 15.4-inch model are arranged in a matrix (10 column×5 row) in the similar margin mentioned above, and the thirty two LCD panels of the 4-inch model are arranged as one row, wherein the major axis of the LCD panel corresponds to the minor axis of the mother substrate.

Figure 11E:
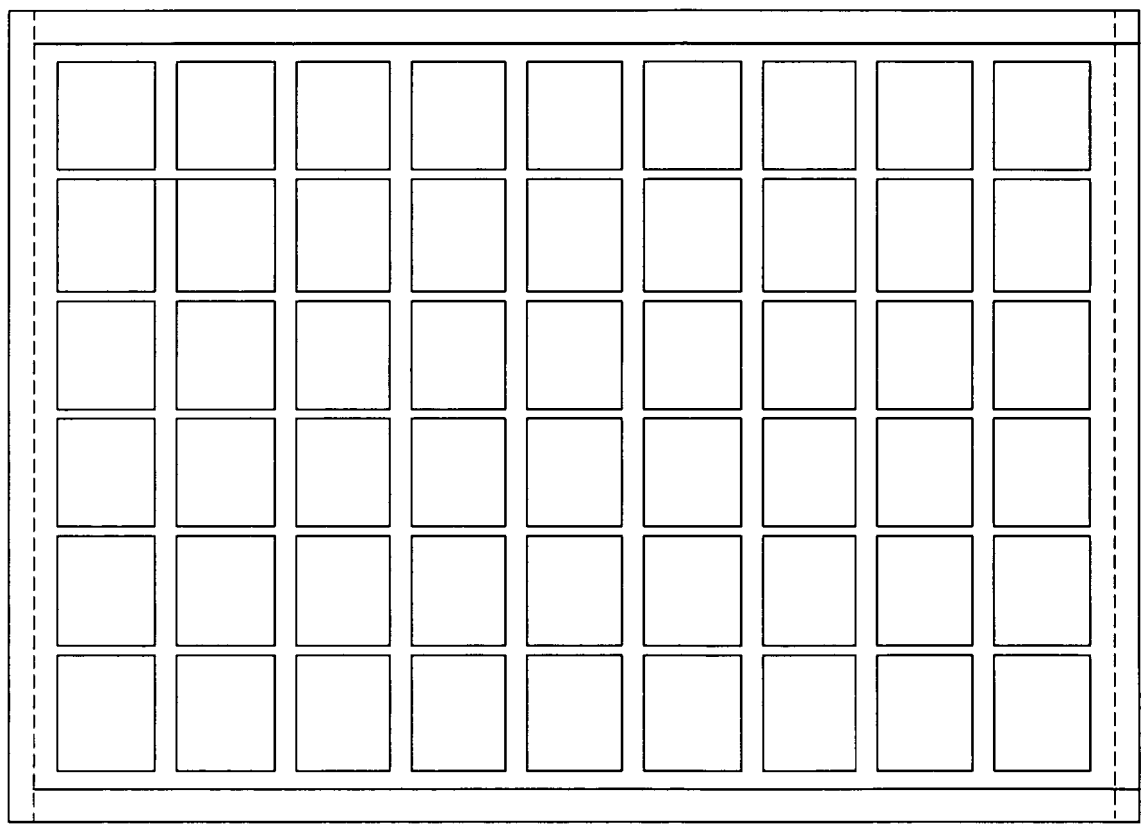

FIG. 11E illustrates the layout of arranging fifty four LCD panels (9 column×6 row) of the 15-inch model on the mother substrate having a size of 1950×2250 mm$^2$. That is, the fifty four LCD panels of the 15-inch model are arranged in a matrix (9 column×6 row) in the similar margin mentioned above, wherein the major axis of the LCD panel corresponds to the minor axis of the mother substrate.

Figure 11F:
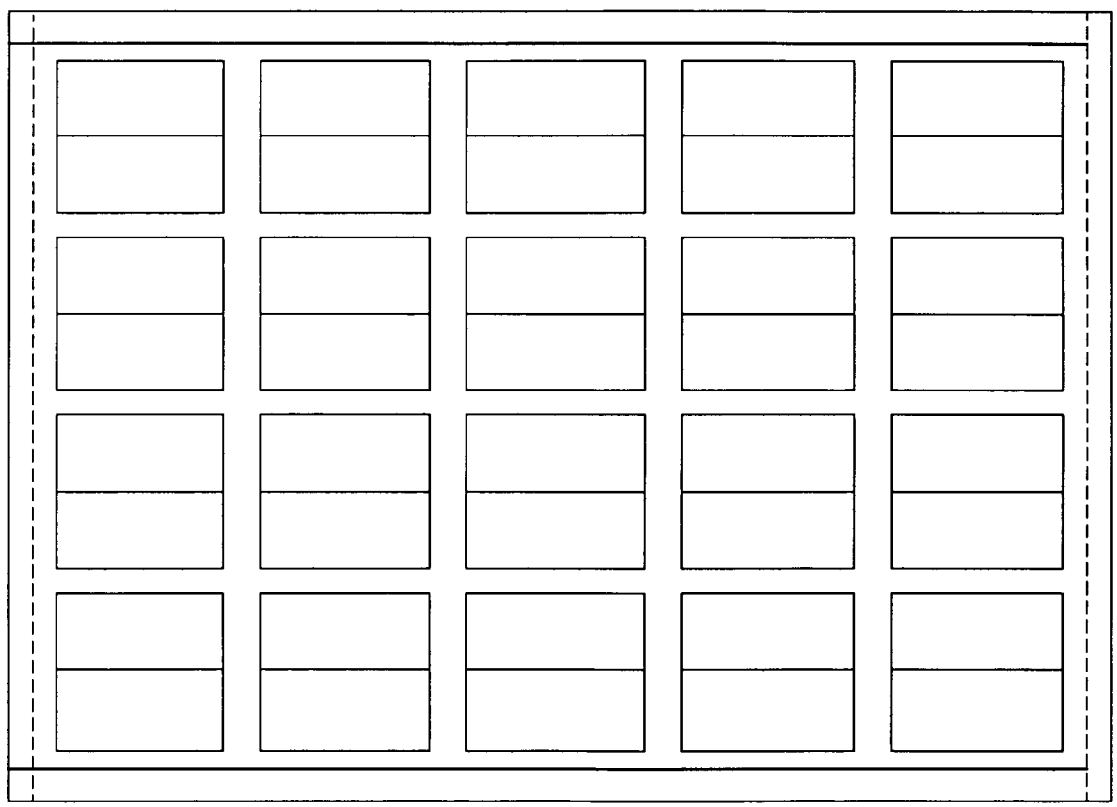

FIG. 11F illustrates the layout of arranging forty LCD panels (5 column×8 row) of the 17-inch model (picture ratio of 15:9) on the mother substrate having a size of 1950×2250 mm$^2$. That is, the forty LCD panels of the 17-inch model are arranged in a matrix (5 column×8 row) in the similar margin mentioned above, wherein the major axis of the LCD panel corresponds to the major axis of the mother substrate.

Figure 11G:
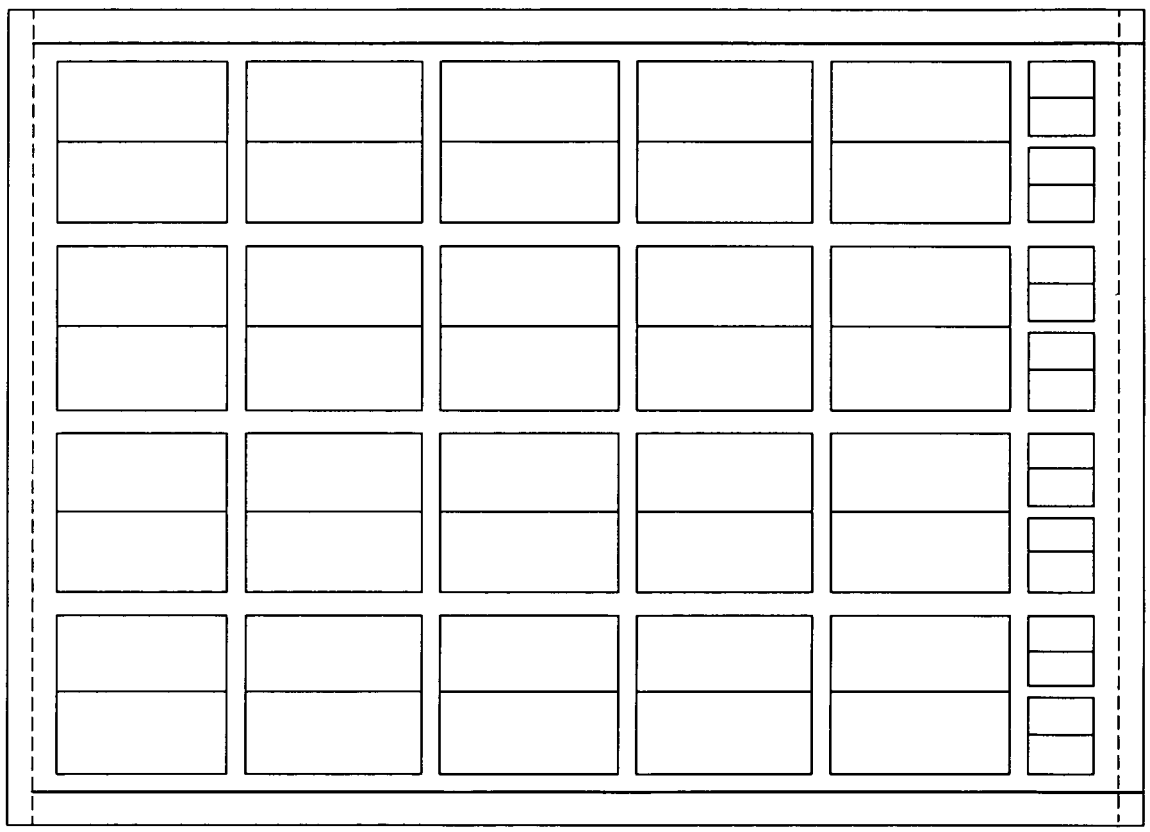

FIG. 11G illustrates the layout of arranging forty LCD panels (5 column×8 row) of the 17-inch model (picture ratio of 15:9) on the mother substrate having a size of 1950×2250 mm$^2$, and arranging sixteen LCD panels of 8-inch model as one column on the mother substrate. That is, the forty LCD panels of the 17-inch model are arranged in a matrix (5 column×8 row) in the similar margin mentioned above, and the sixteen LCD panels of 8-inch model are arranged as one column, wherein the major axis of the LCD panel corresponds to the major axis of the mother substrate.

Figure 11H:
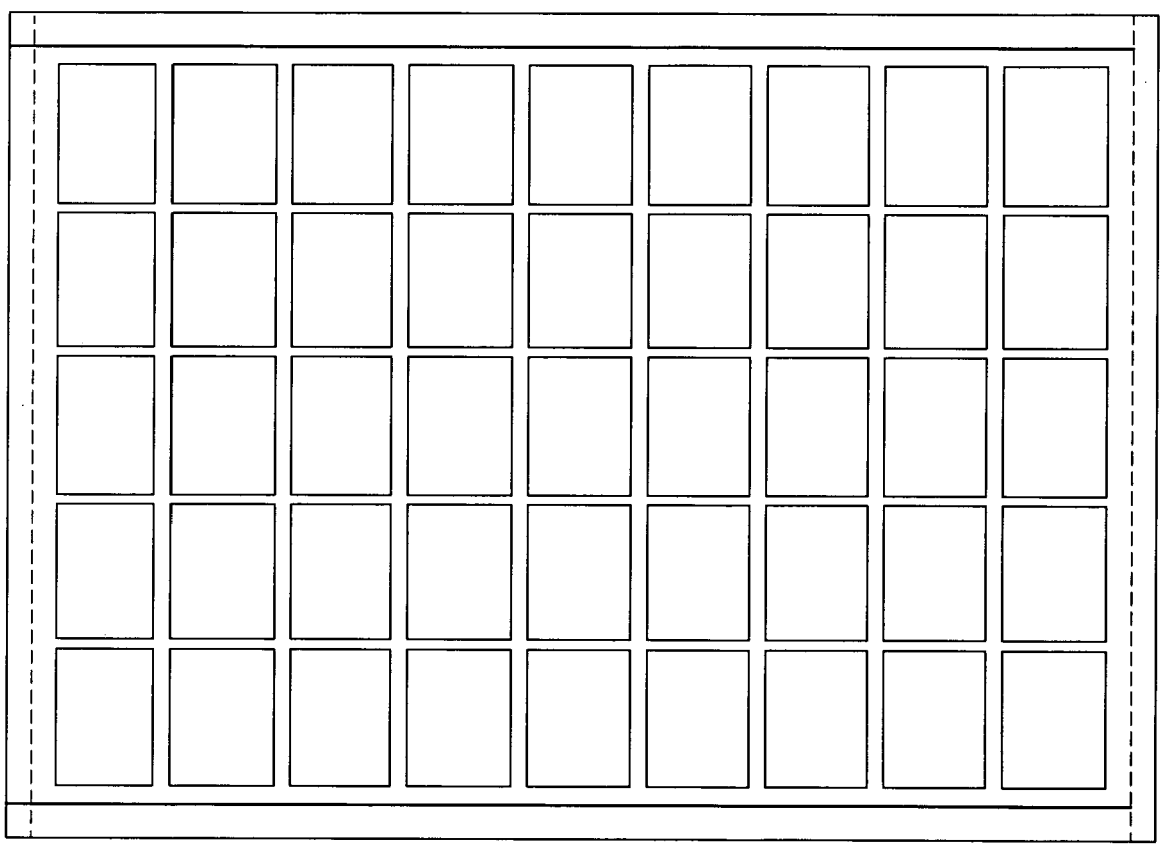

FIG. 11H illustrates the layout of arranging forty five LCD panels (9 column×5 row) of the 17-inch model (picture ratio of 15:10) on the mother substrate having a size of 1950×2250 mm$^2$. That is, the forty five LCD panels of the 17-inch model are arranged in a matrix (9 column×5 row) in the similar margin mentioned above, wherein the major axis of the LCD panel corresponds to the minor axis of the mother substrate.

Figure 11I:
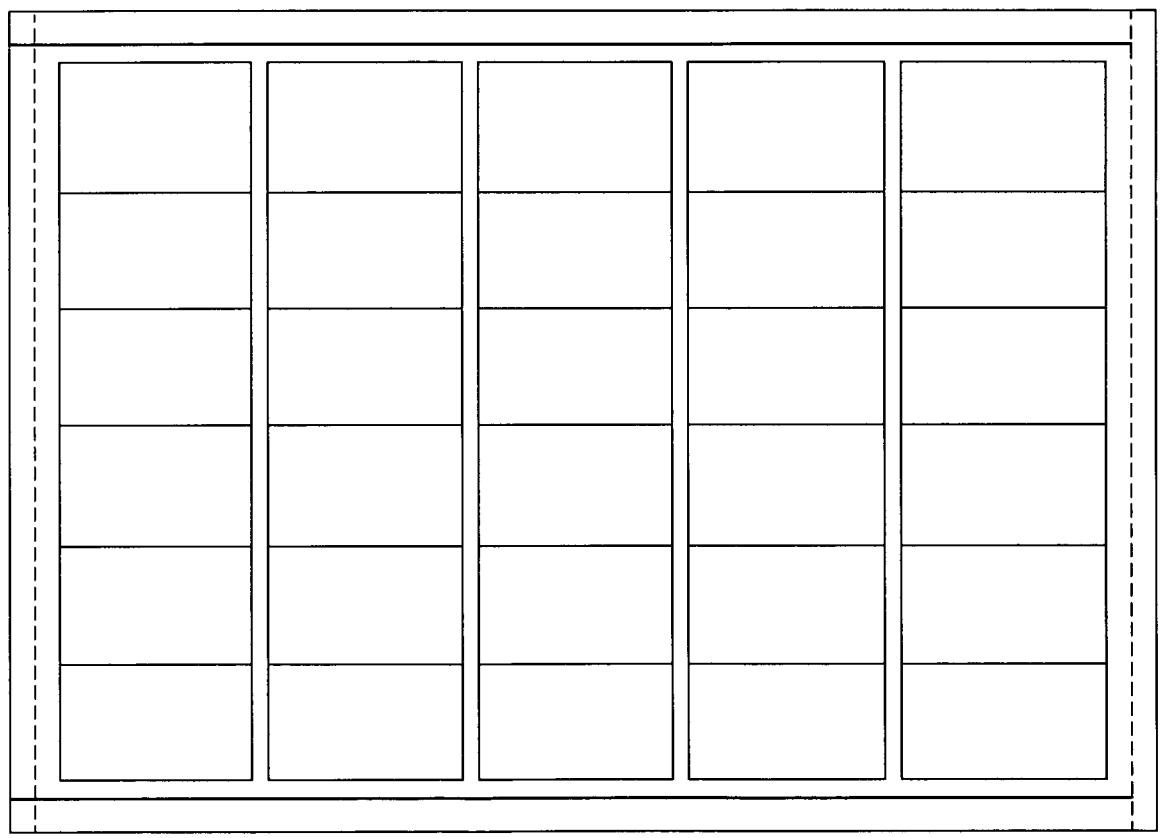

FIG. 11I illustrates the layout of arranging thirty LCD panels (5 column×6 row) of the 20.1-inch model (picture ratio of 3:4) on the mother substrate having a size of 1950×2250 mm$^2$. That is, the thirty LCD panels of the 20.1-inch model are arranged in a matrix (5 column×6 row) in the similar margin mentioned above, wherein the major axis of the LCD panel corresponds to the major axis of the mother substrate.

Figure 11J:
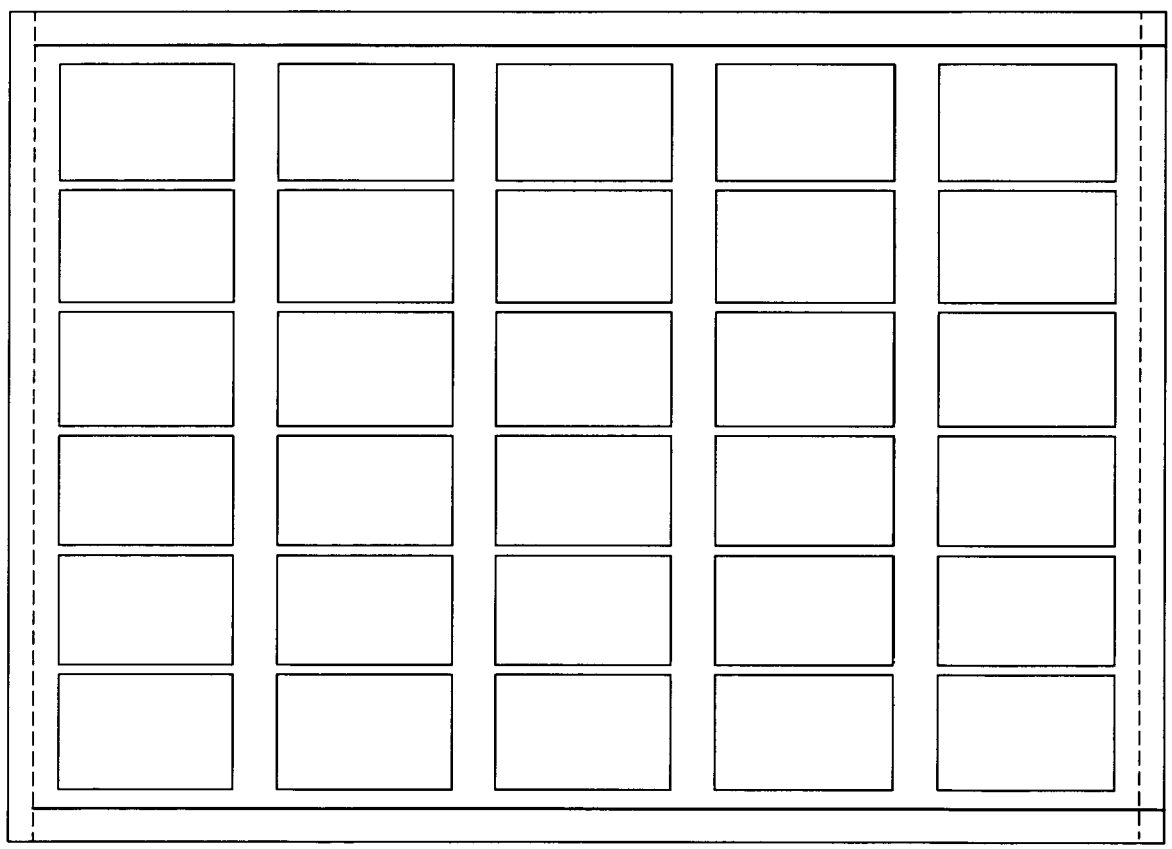

FIG. 11J illustrates the layout of arranging thirty LCD panels (5 column×6 row) of the 19-inch model (19.0SX, picture ratio of 5:4, TN mode, virtual diagonal length of 18.97-inch, panel size of 387×312 mm$^2$) on the mother substrate having a size of 1950×2250 mm$^2$. That is, the thirty LCD panels of the 19-inch model are arranged in a matrix (5 column×6 row) in the similar margin mentioned above, wherein the major axis of the LCD panel corresponds to the major axis of the mother substrate.

Figure 11K:
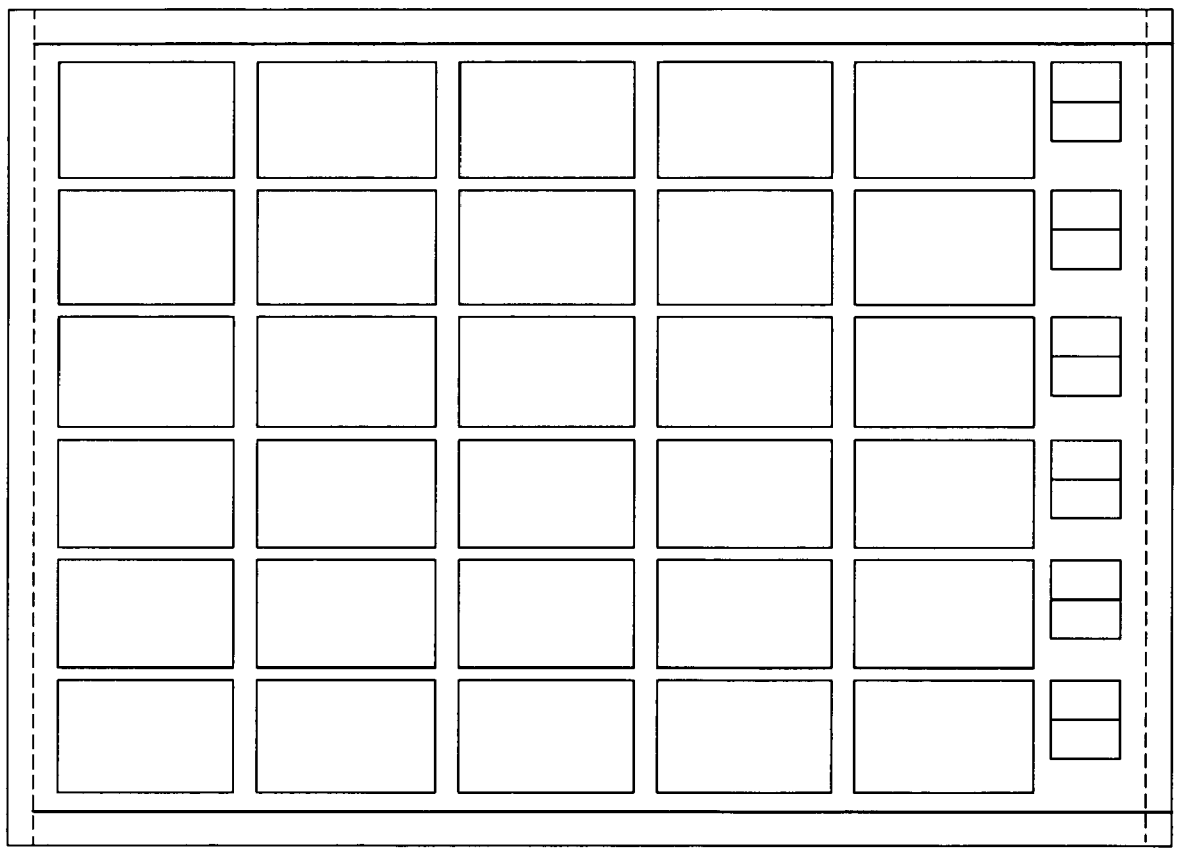

FIG. 11K illustrates the layout of arranging thirty LCD panels (5 column×6 row) of the 19-inch model (19.0SX, picture ratio of 5:4, TN mode, virtual diagonal length of 18.97-inch, panel size of 387×312 mm$^2$) on the mother substrate having a size of 1950×2250 mm$^2$, and arranging twelve LCD panels of 8-inch model on the mother substrate. That is, the thirty LCD panels of the 19-inch model are arranged in a matrix (5 column×6 row) in the similar margin mentioned above, and the twelve LCD panels of 8-inch model are arranged as one column on the mother substrate, wherein the major axis of the LCD panel corresponds to the major axis of the mother substrate.

Figure 11L:
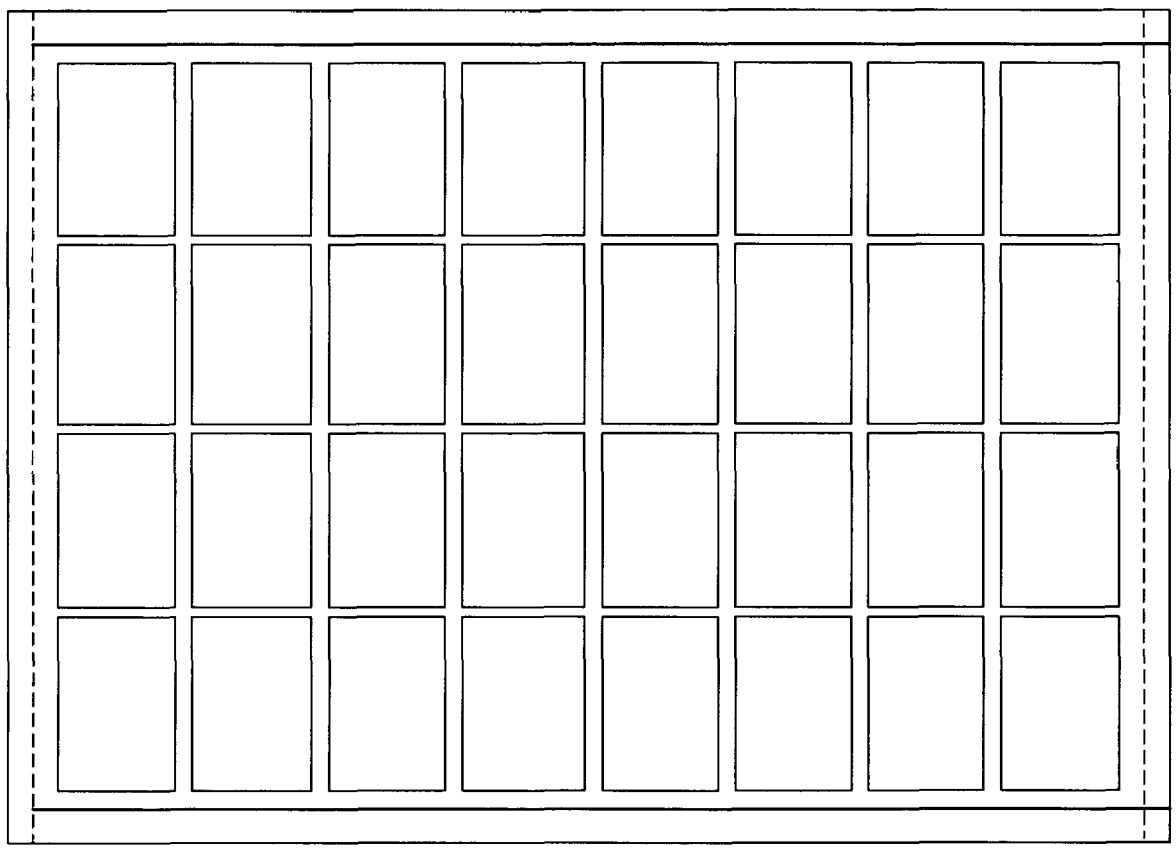

FIG. 11L illustrates the layout of arranging thirty two LCD panels (8 column×4 row) of 20-inch model on the mother substrate having a size of 1950×2250 mm$^2$. That is, the thirty two LCD panels of the 20-inch model are arranged in a matrix (8 column×4 row) in the similar margin mentioned above, wherein the major axis of the LCD panel corresponds to the minor axis of the mother substrate.

Figure 11M:
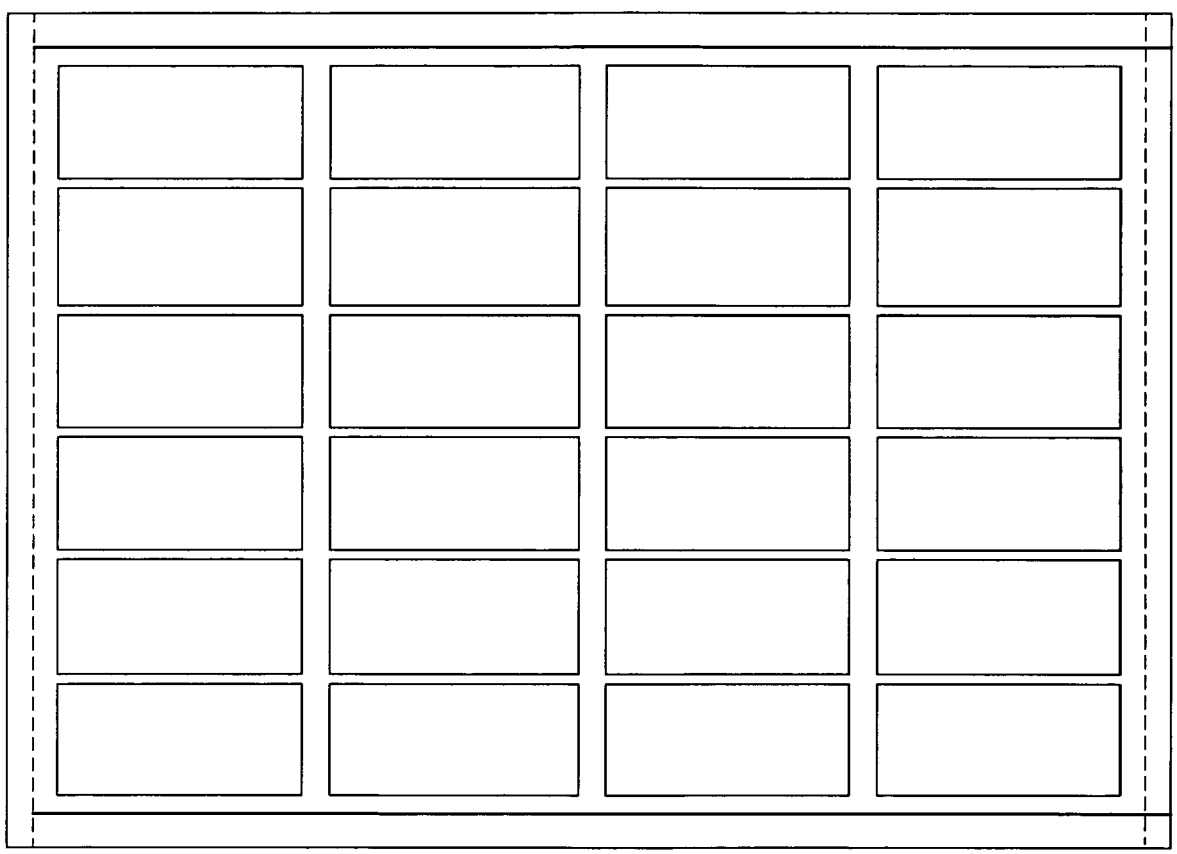

FIG. 11M illustrates the layout of arranging twenty four LCD panels (4 column×6 row) of the 23-inch model (picture ratio of 16:9) on the mother substrate having a size of 1950×2250 mm$^2$. That is, the twenty four LCD panels of the 23-inch model are arranged in a matrix (4 column×6 row) in the similar margin mentioned above, wherein the major axis of the LCD panel corresponds to the major axis of the mother substrate.

Figure 11N:
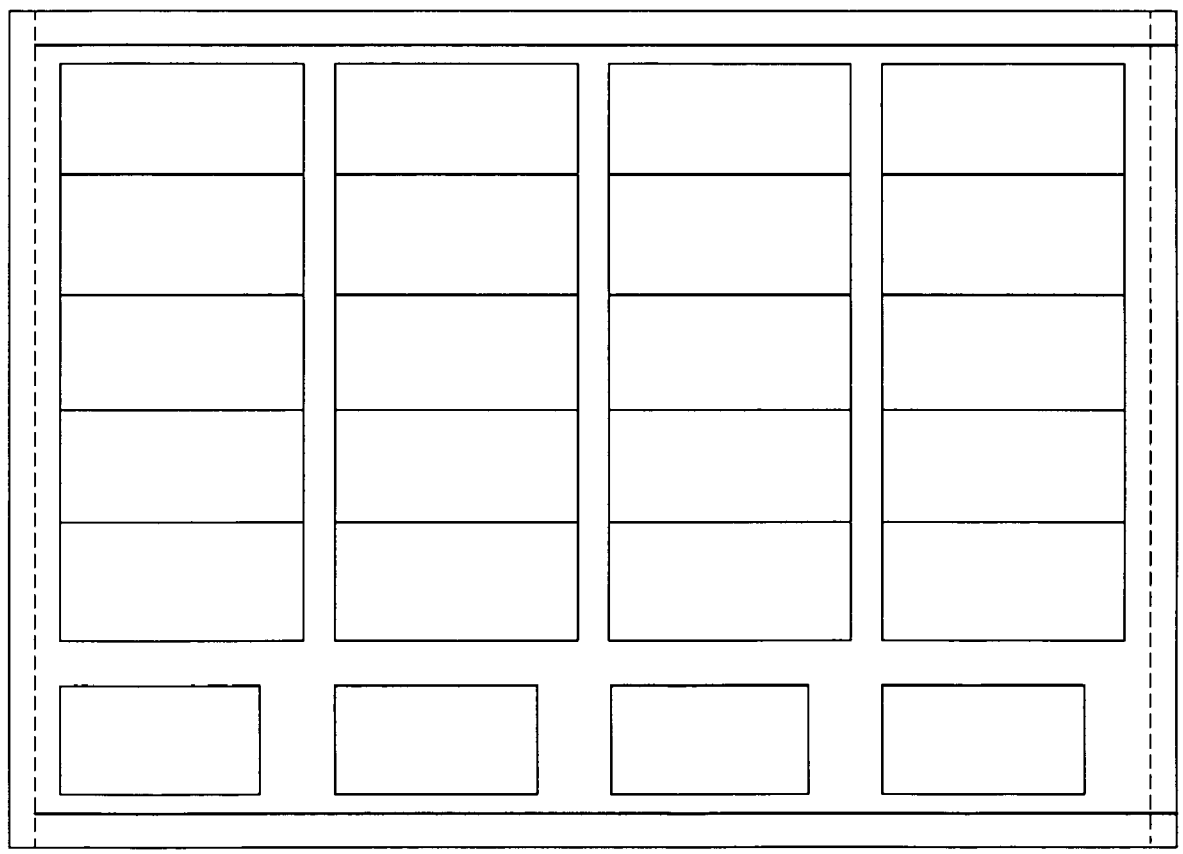
Figure 110:
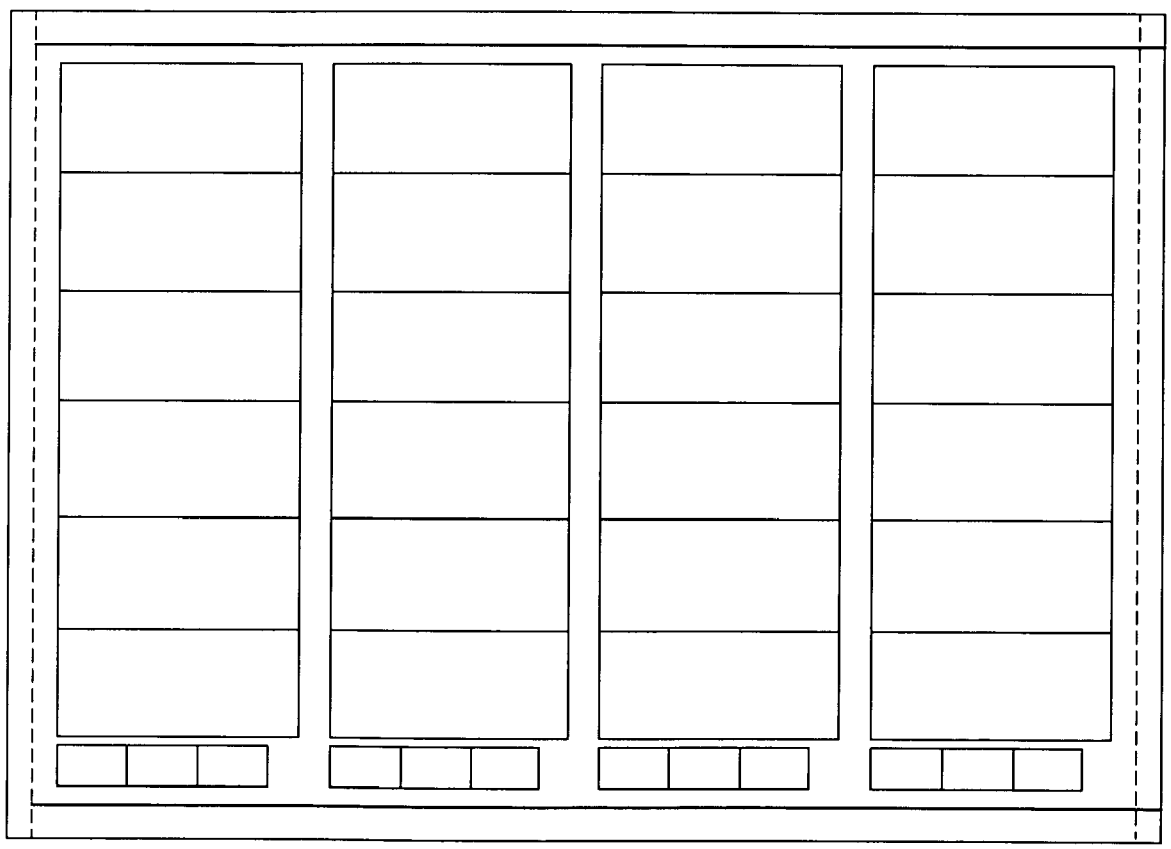

FIG. 11N illustrates the layout of arranging twenty LCD panels (4 column×5 row) of the 23-inch model (picture ratio of 16:9) on the mother substrate having a size of 1950×2250 mm$^2$, and arranging four LCD panels of the 20.1-inch model (picture ratio of 16:10) as one row on the mother substrate. That is, the twenty LCD panels of the 23-inch model are arranged in a matrix (4 column×5 row) in the similar margin mentioned above, and the four LCD panels of the 20.1-inch model are arranged as one row on the mother substrate, wherein the major axis of the LCD panel corresponds to the major axis of the mother substrate.

FIG. 11O illustrates the layout of arranging twenty four LCD panels (4 column×6 row) of the 23-inch model (picture ratio of 16:9) on the mother substrate having a size of 1950×2250 mm$^2$, and arranging twelve LCD panels of the 6.5-inch model (6.5W, picture ratio of 16:9, IPS mode, panel size of 158×93.3 mm$^2$) as one row on the mother substrate. That is, the twenty four LCD panels of the 23-inch model are arranged in a matrix (4 column×6 row) in the similar margin mentioned above, and the twelve LCD panels of the 6.5-inch model are arranged as one row on the mother substrate, wherein the major axis of the LCD panel corresponds to the major axis of the mother substrate.

Figure 11P:
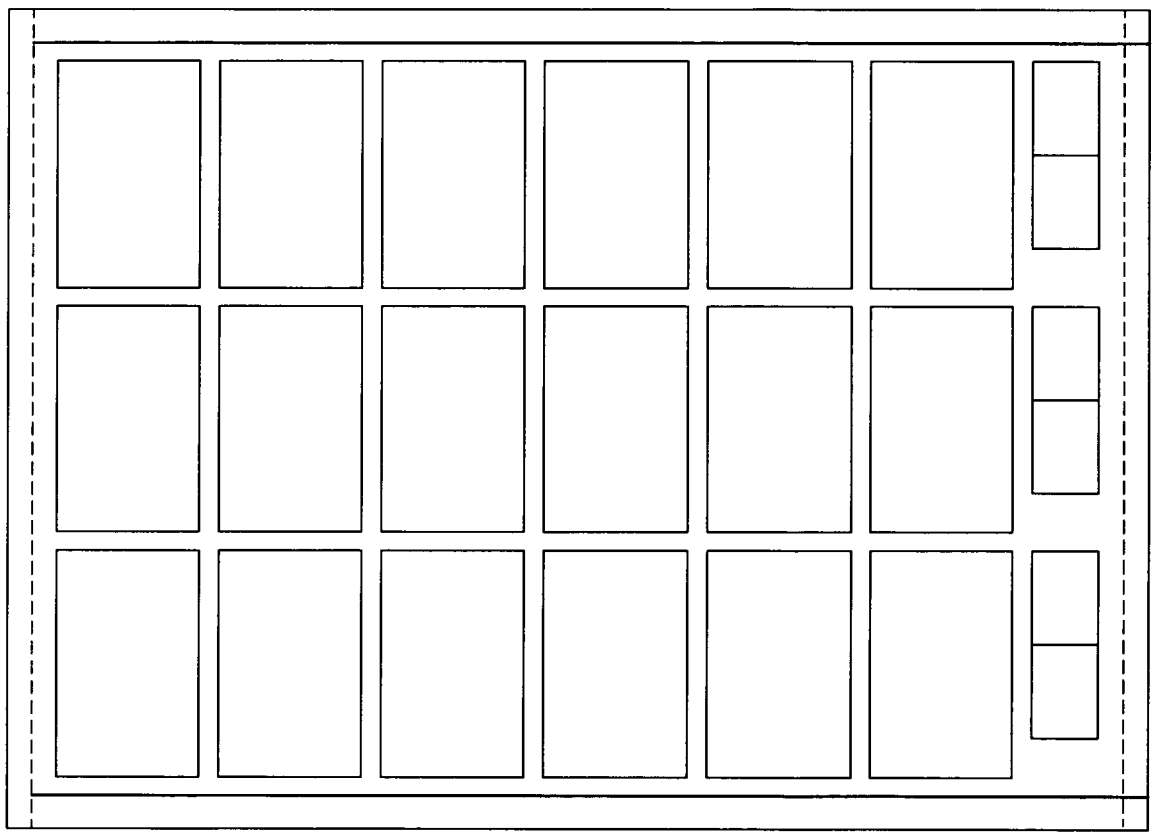

FIG. 11P illustrates the layout of arranging eighteen LCD panels (6 column×3 row) of the 26-inch model (26WU, picture ratio of 16:9, IPS mode, virtual diagonal length of the 26-inch, panel size of 590.9×341.5 mm$^2$) on the mother substrate having a size of 1950×2250 mm$^2$, and arranging six LCD panels of 10-inch model (10W, picture ratio of 15:9, IPS mode, panel size of 233.8×145.7 mm$^2$) as one column on the mother substrate. That is, the eighteen LCD panels of the 26-inch model are arranged in a matrix (6 column×3 row) in the similar margin mentioned above, and the six LCD panels of 10-inch model are arranged as one column on the mother substrate, wherein the major axis of the LCD panel corresponds to the minor axis of the mother substrate.

Figure 11Q:
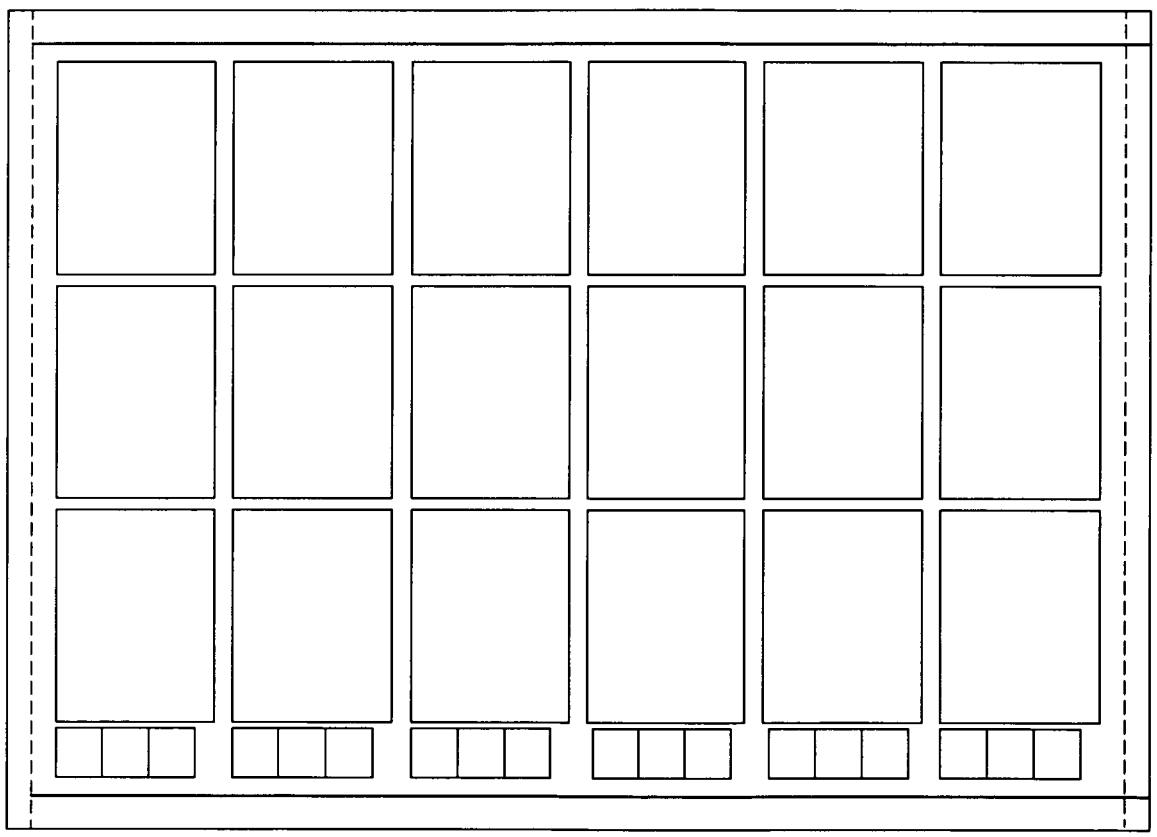

FIG. 11Q illustrates the layout of arranging eighteen LCD panels (6 column×3 row) of the 26-inch model (picture ratio of 16:10) on the mother substrate having a size of 1950×2250 mm$^2$, and arranging eighteen LCD panels of the 6.5-inch model as one row on the mother substrate. That is, the eighteen LCD panels of the 26-inch model are arranged in a matrix (6 column×3 row) in the similar margin mentioned above, and the eighteen LCD panels of the 6.5-inch model are arranged as one row on the mother substrate, wherein the major axis of the LCD panel corresponds to the minor axis of the mother substrate.

Figure 11R:
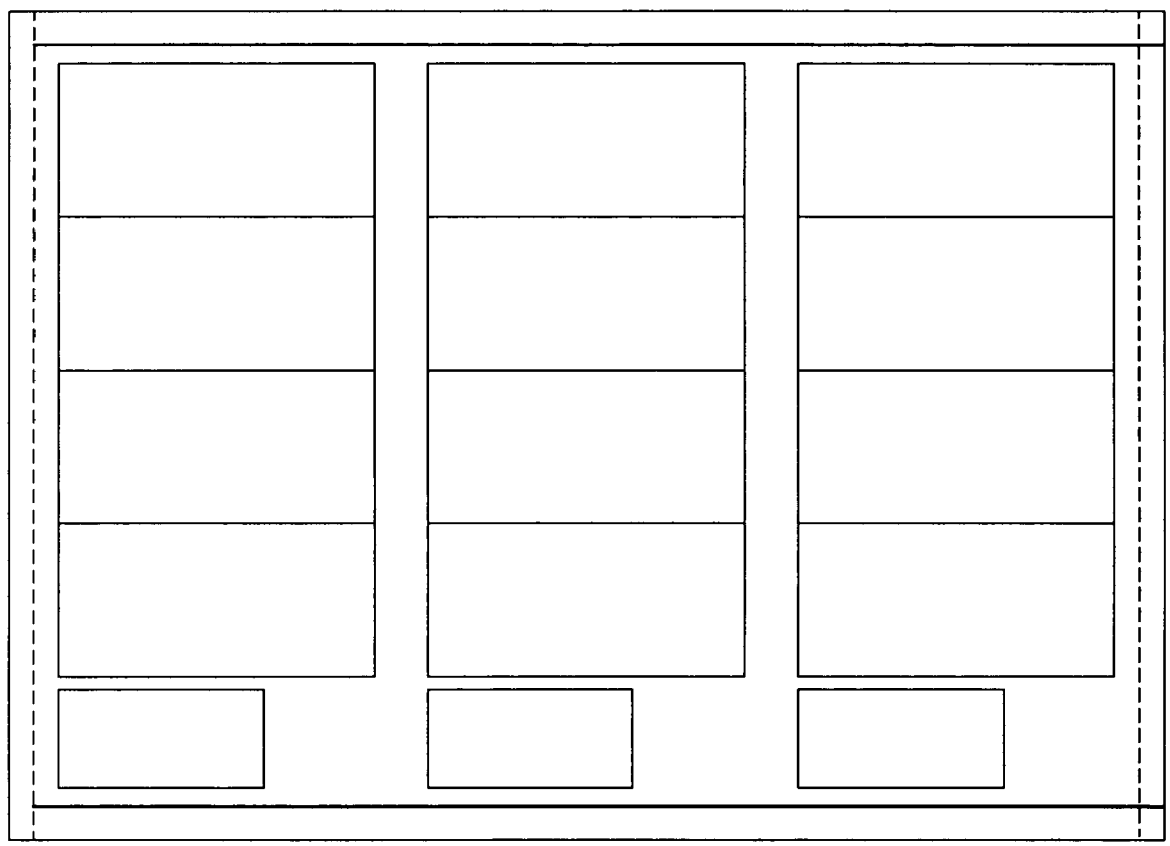
Figure 11S:
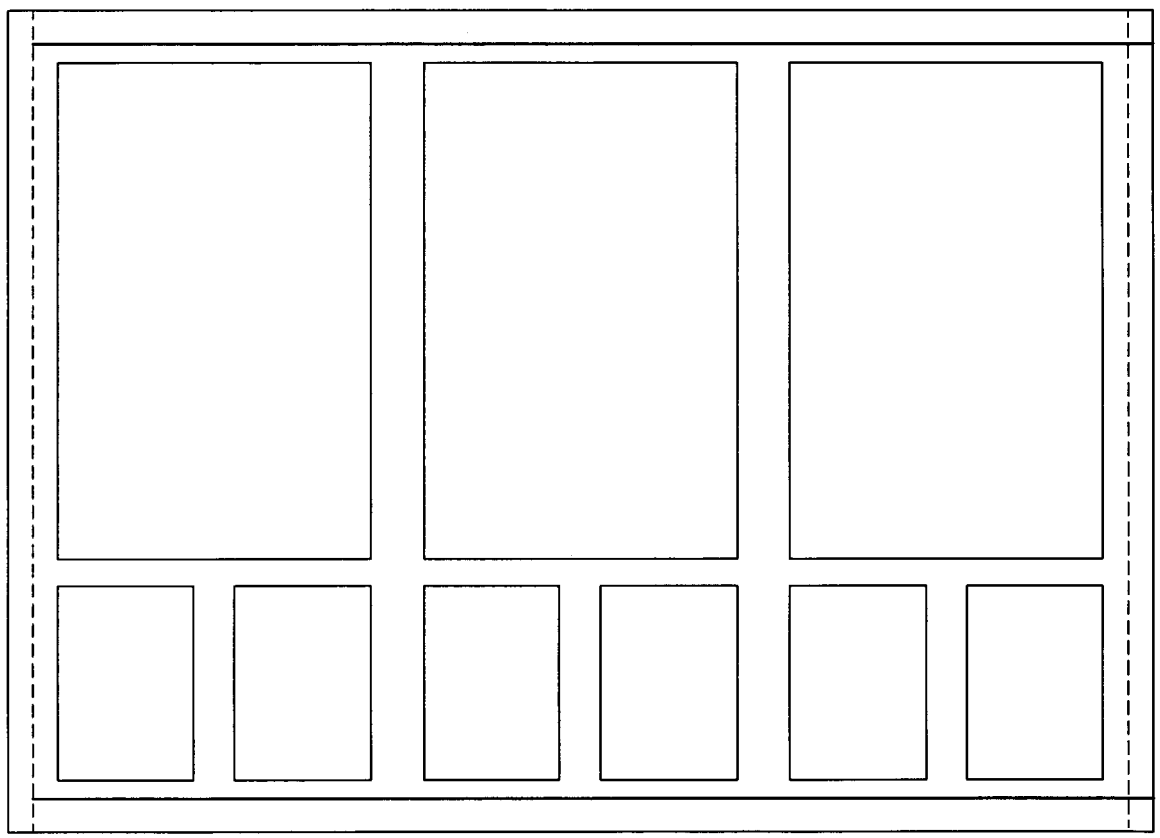

FIG. 11R illustrates the layout of arranging twelve LCD panels (3 column×4 row) of the 32-inch model (picture ratio of 16:9) on the mother substrate having a size of 1950×2250 mm$^2$, and arranging three LCD panels of the 17-inch model (picture ratio of 15:9, IPS mode, virtual diagonal length of 17.10-inch, panel size of 384.68×235.688 mm$^2$) as one row on the mother substrate. That is, the twelve LCD panels of the 32-inch model are arranged in a matrix (3 column×4 row) in the similar margin mentioned above, and the three LCD panels of the 17-inch model are arranged as one row on the mother substrate, wherein the major axis of the LCD panel corresponds to the major axis of the mother substrate.

FIG. 11S illustrates the layout of arranging three LCD panels (3 column×1 row) of the 55-inch model on the mother substrate having a size of 1950×2250 mm$^2$, and arranging six LCD panels of the 26-inch model (picture ratio of 16:9) as one row on the mother substrate. That is, the three LCD panels of the 55-inch model are arranged in a matrix (3 column×1 row) in the similar margin mentioned above, and the six LCD panels of the 26-inch model are arranged as one row on the mother substrate, wherein the major axis of the LCD panel corresponds to the minor axis of the mother substrate.

In addition, arranging the eight LCD panels of the 40-inch model has a similar size mother substrate as arranging the six LCD panels of the 47-inch model. To achieve substrate efficiency of 90% or more, the size of the mother substrate satisfies 1851~2057×2121~2356 mm$^2$ when arranging the eight LCD panels of the 40-inch model, and the size of the mother substrate satisfies 1868~2075×2171~2412 mm$^2$ when arranging the six LCD panels of the 47-inch model. Under these conditions, the optimal size of the mother substrate satisfying the above two cases is 1870×2200 mm$^2$.

The layout of cases for arranging eight LCD panels of the 40-inch model on the mother substrate (1870×2200 mm$^2$) and arranging six LCD panels of the 47-inch model on the mother substrate (1870×2200 mm$^2$) will be explained as follows. FIGS. 12A to 12M are layouts illustrating the respective models on the mother substrate having a size of 1870×2200 mm$^2$, according to the fifth embodiment of the present invention.

Figure 12A:
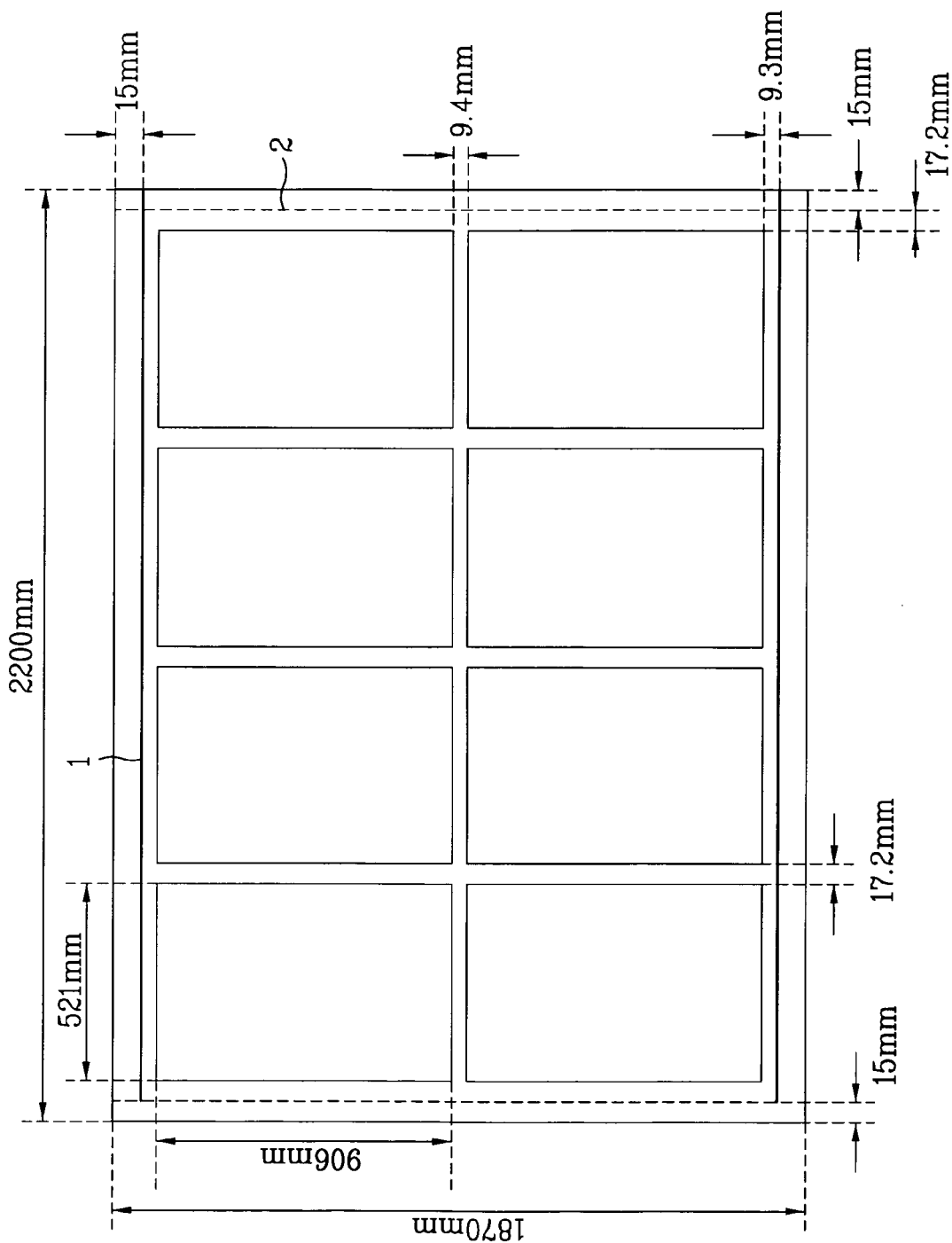
FIGS. 12A to 12M are layouts illustrating the respective models on the mother substrate having a size of 1870×2200 mm², according to the fifth embodiment of the present invention.

FIG. 12A illustrates the layout of arranging eight LCD panels (4 column×2 row) of 40-inch model (40WU, picture ratio of 16:9, IPS mode, virtual diagonal length of 39.8-inch, panel size of 906×521 mm$^2$) on the mother substrate having a size of 1870×2200 mm$^2$. That is, the process key center (1) is provided at the interval of 15 mm from the edge of the mother substrate in the direction of major axis, and the dummy region (2) is provided at the interval of 15 mm from the edge of the mother substrate in the direction of minor axis. The eight LCD panels of the 40-inch model are arranged in a matrix (4 column×2 row) in the margin of 9.3 mm from the process key center (1), and in the margin of 17.2 mm from the dummy region (2), wherein the margin between each column is 17.2 mm, and the margin between each row is 9.4 mm. Accordingly, the margin in the direction of the minor axis of mother substrate is 1.1% of the length of LCD panel, and the margin in the direction of the major axis of mother substrate is 3.3% of the length of LCD panel. In FIG. 12A, the eight LCD panels of the 40-inch model are arranged in the matrix type (4 column×2 row), and the major axis of the LCD panel corresponds to the minor axis of the mother substrate. Also, the margin value is not limited to the above description, which can be controllable within ±30%.

Figure 12B:
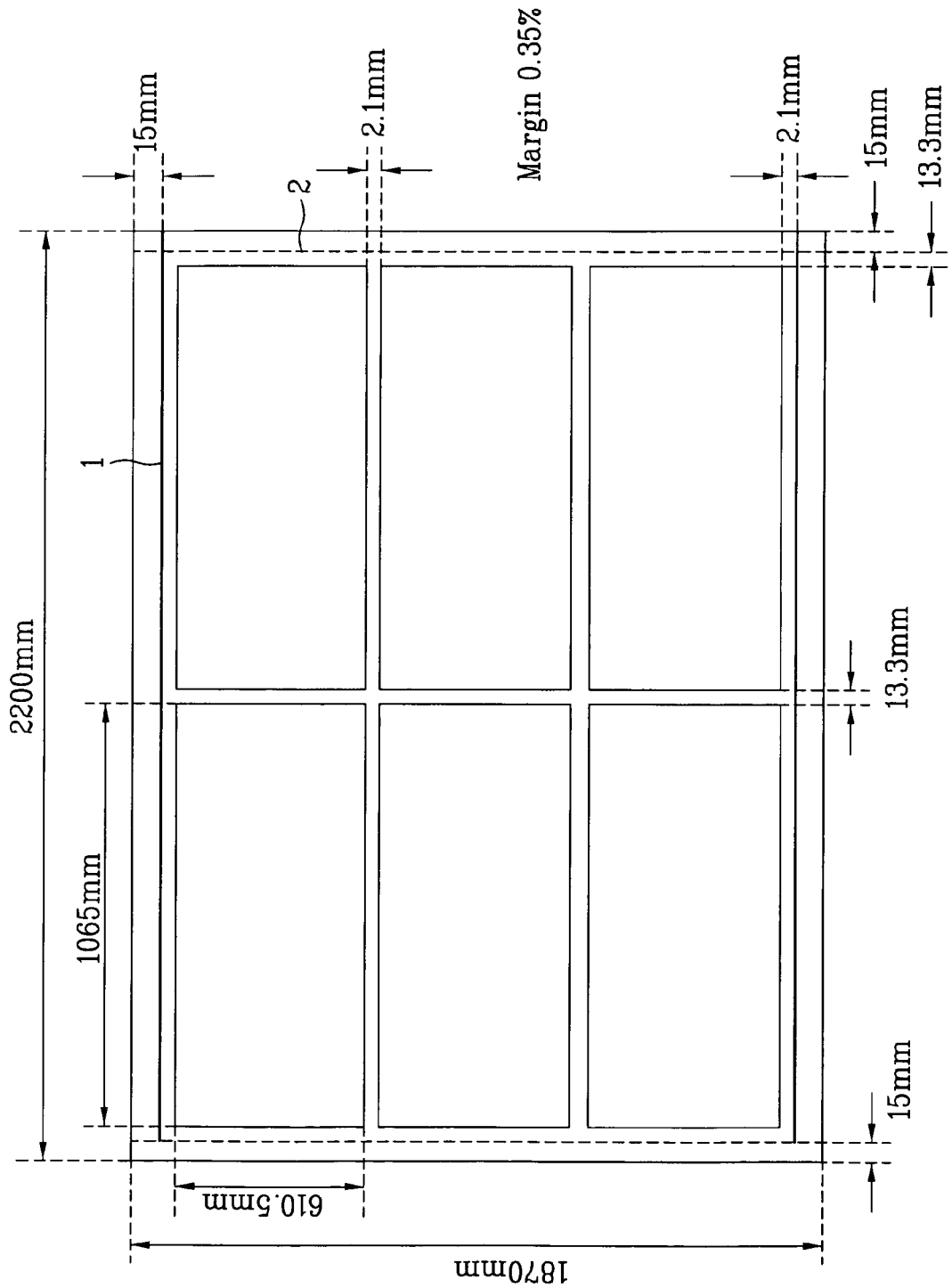

FIG. 12B illustrates the layout of arranging six LCD panels (2 column×3 row) of the 47-inch model (47WU, picture ratio of 16:9, IPS mode, virtual diagonal length of the 47-inch, panel size of 1065×610.5 mm$^2$) on the mother substrate having a size of 1870×2200 mm$^2$. That is, the process key center (1) is provided at the interval of 15 mm from the edge of the mother substrate in the direction of major axis, and the dummy region (2) is provided at the interval of 15 mm from the edge of the mother substrate in the direction of minor axis. The six LCD panels of the 47-inch model are arranged in a matrix (2 column×3 row) in the margin of 2.1 mm from the process key center (1), and in the margin of 13.3 mm from the dummy region (2), wherein the margin between each column is 13.3 mm, and the margin between each row is 2.1 mm. Accordingly, the margin in the direction of the minor axis of mother substrate is 0.35% of the length of LCD panel, and the margin in the direction of the major axis of mother substrate is 3.3% of the length of LCD panel. In FIG. 12B, the six LCD panels of the 47-inch model are arranged in the matrix type (2 column×3 row), and the major axis of the LCD panel corresponds to the major axis of the mother substrate. Also, the margin value is not limited to the above description, which can be controllable within ±30%.

Figure 12C:
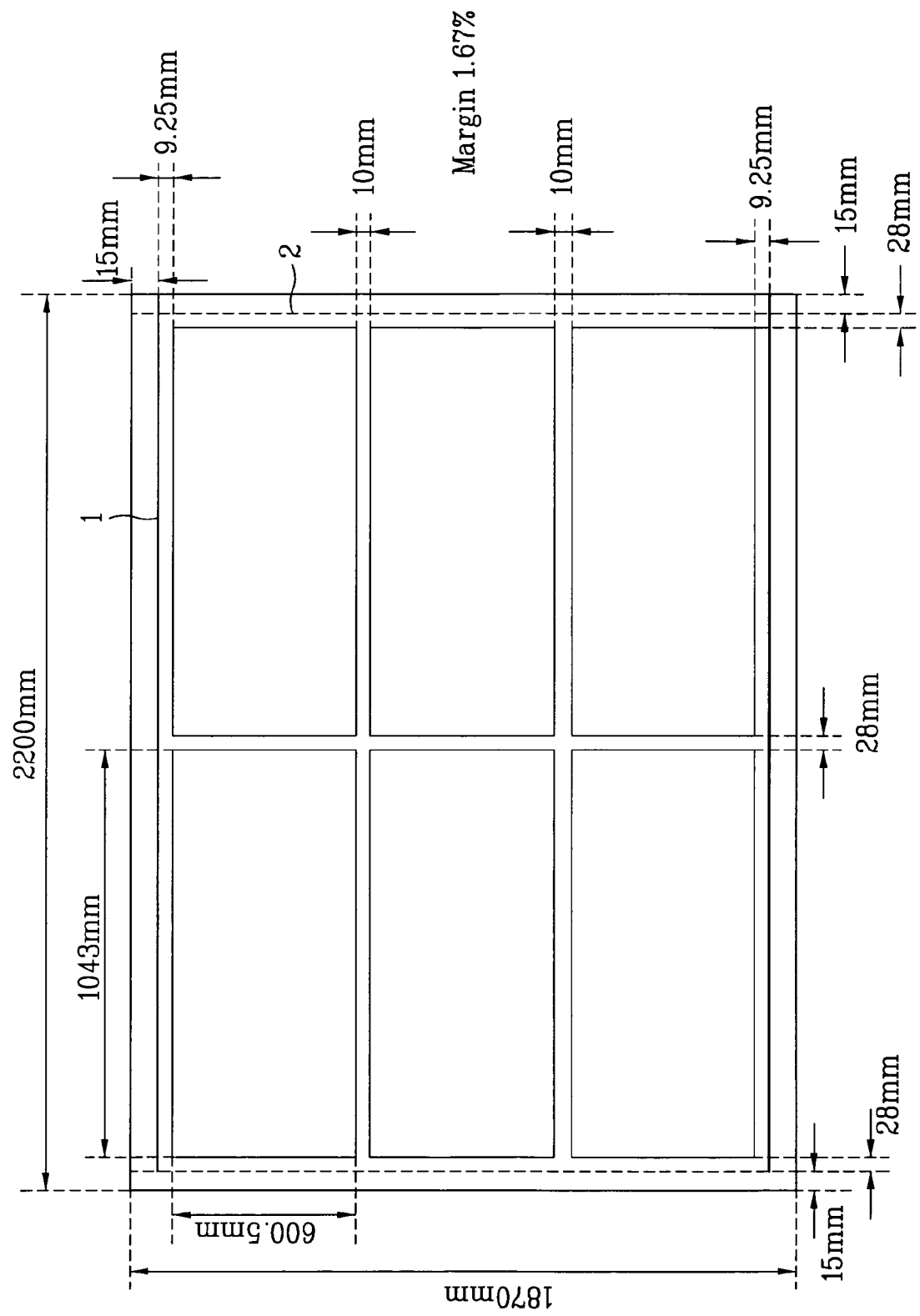

FIG. 12C illustrates the layout of arranging six LCD panels (2 column×3 row) of 46-inch model (46WU, picture ratio of 16:9, IPS mode, virtual diagonal length of 46.1-inch, panel size of 1043×600.5 mm$^2$) on the mother substrate having a size of 1870×2200 mm$^2$. That is, the process key center (1) is provided at the interval of 15 mm from the edge of the mother substrate in the direction of major axis, and the dummy region (2) is provided at the interval of 15 mm from the edge of the mother substrate in the direction of minor axis. The six LCD panels of the 46-inch model are arranged in a matrix (2 column×3 row) in the margin of 9.25 mm from the process key center (1), and in the margin of 28 mm from the dummy region (2), wherein the margin between each column is 28 mm, and the margin between each row is 10 mm. Accordingly, the margin in the direction of the minor axis of mother substrate is 1.67% of the length of LCD panel, and the margin in the direction of the major axis of mother substrate is 2.68% of the length of LCD panel. In FIG. 12C, the six LCD panels of the 46-inch model are arranged in the matrix type (2 column×3 row), and the major axis of the LCD panel corresponds to the major axis of the mother substrate. Also, the margin value is not limited to the above description, which can be controllable within ±30%

Figure 12D:
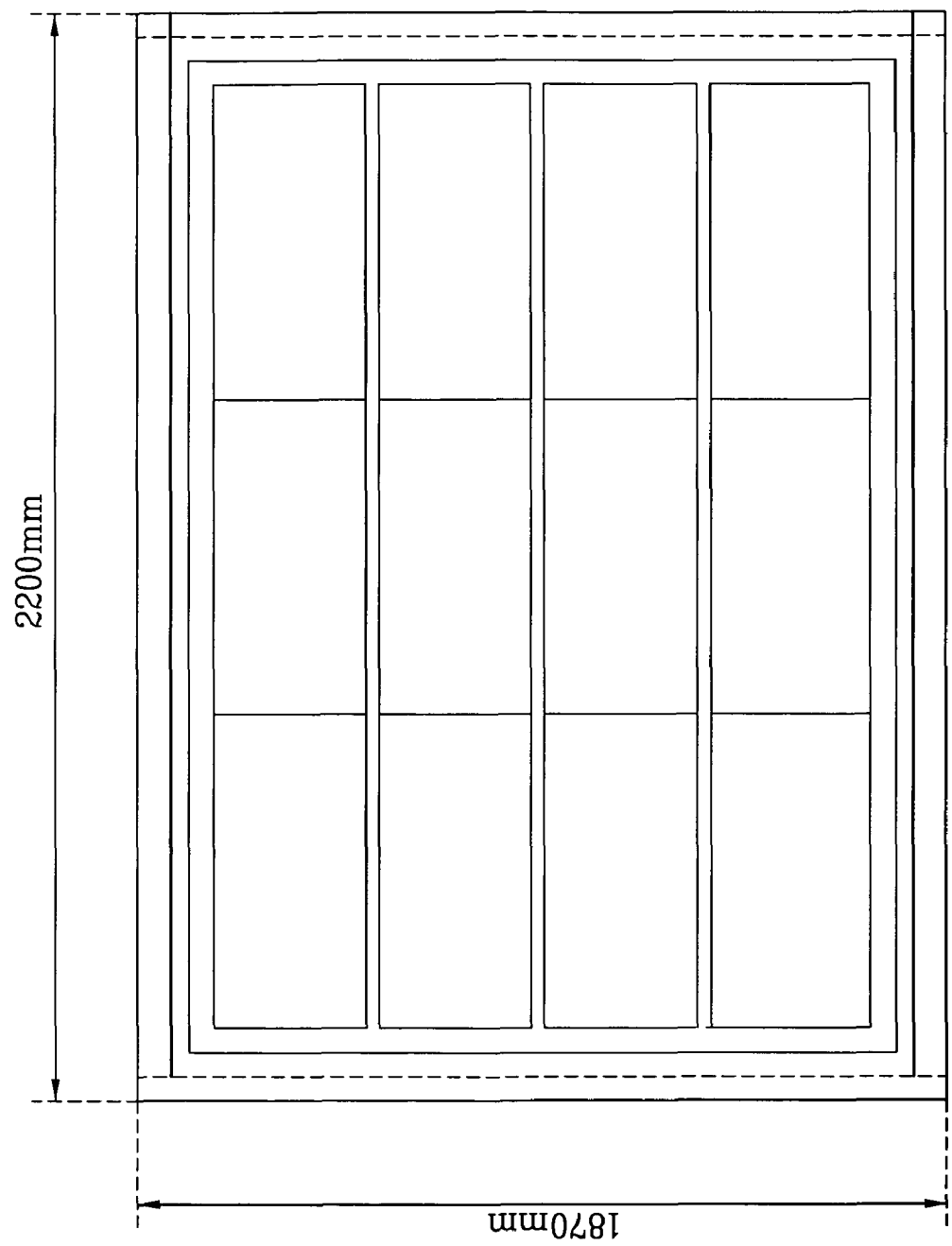

FIG. 12D illustrates the layout of arranging twelve LCD panels (3 column×4 row) of the 32-inch model (32WX, picture ratio of 16:10, IPS mode, virtual diagonal length of 31.5-inch, panel size of 715×413 mm$^2$) on the mother substrate having a size of 1870×2200 mm$^2$. That is, the twelve LCD panels of the 32-inch model are arranged in the matrix type (3 column×4 row), and the major axis of the LCD panel corresponds to the major axis of the mother substrate.

Figure 12E:
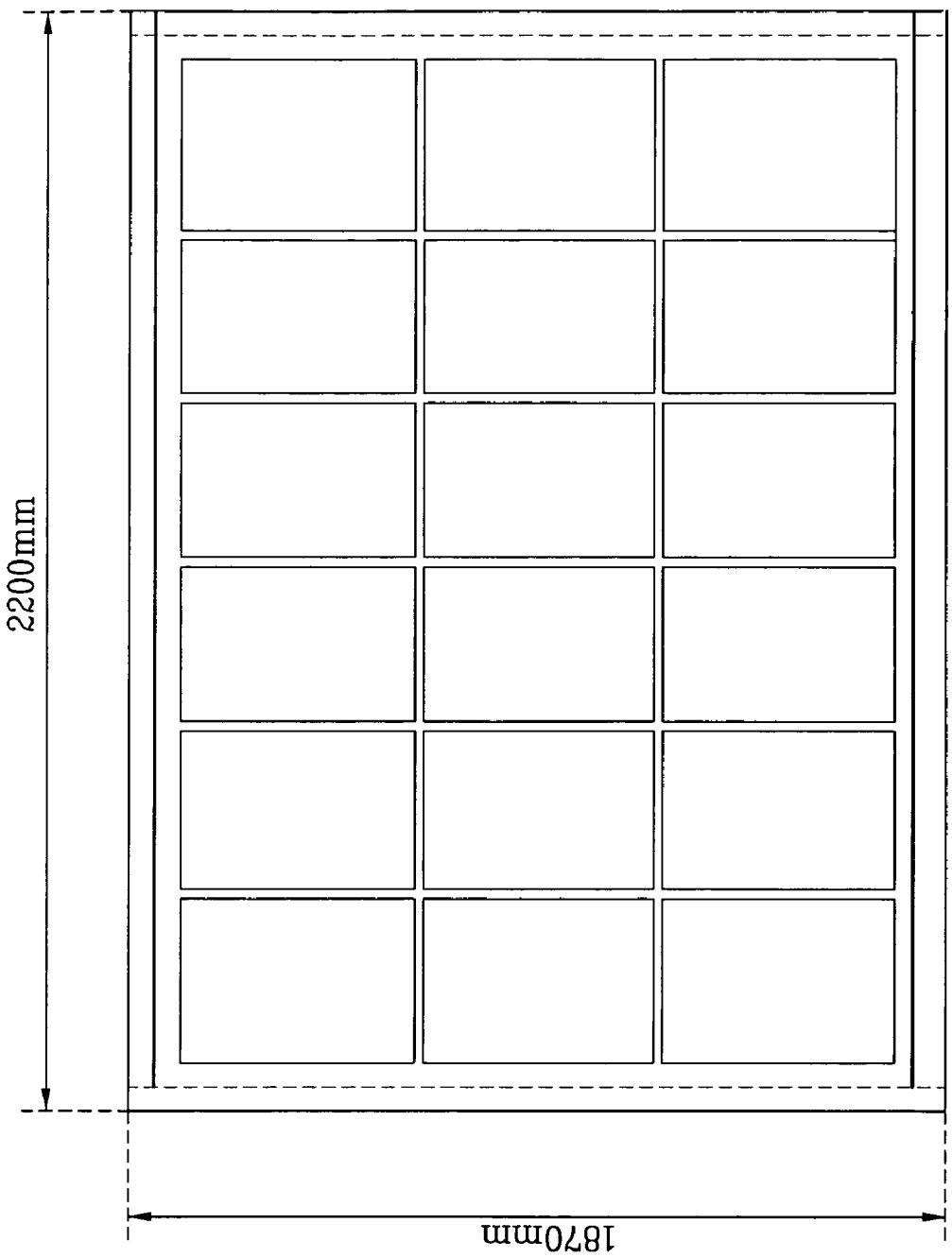

FIG. 12E illustrates the layout of arranging eighteen LCD panels (6 column×3 row) of the 26-inch model (26WX, picture ratio of 16:9, IPS mode, virtual diagonal length of the 26-inch, panel size of 590.9×341.5 mm$^2$) on the mother substrate having a size of 1870×2200 mm$^2$. That is, the eighteen LCD panels of the 26-inch model are arranged in the matrix type (6 column×3 row), and the major axis of the LCD panel corresponds to the minor axis of the mother substrate.

Figure 12F:
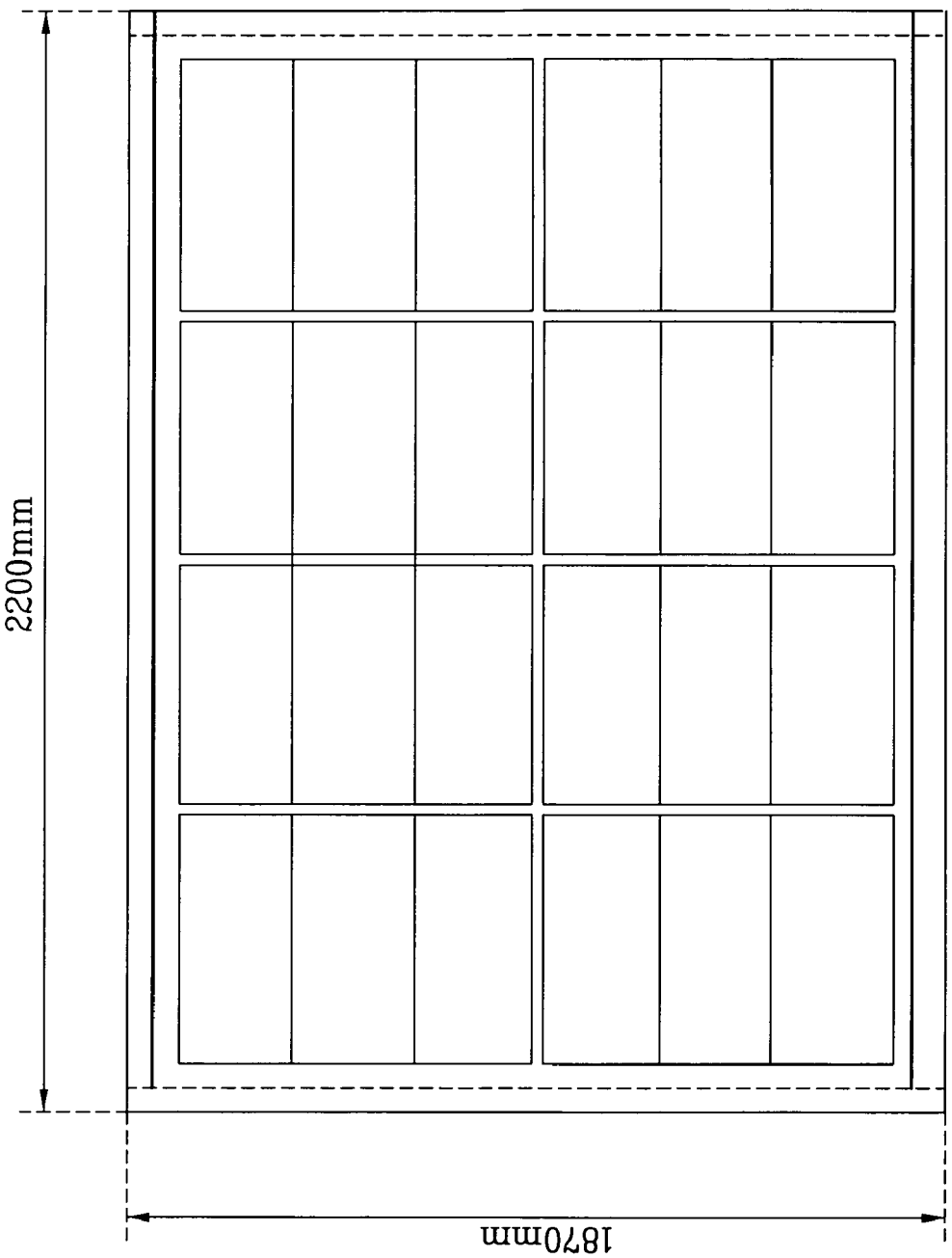

FIG. 12F illustrates the layout of arranging twenty four LCD panels (4 column×6 row) of the 23-inch model (23WX, picture ratio of 16:9, IPS mode, virtual diagonal length of 22.95-inch, panel size of 523.7×302.7 mm$^2$) on the mother substrate having a size of 1870×2200 mm$^2$. That is, the twenty four LCD panels of the 23-inch model are arranged in the matrix type (4 column×6 row), and the major axis of the LCD panel corresponds to the major axis of the mother substrate.

Figure 12G:
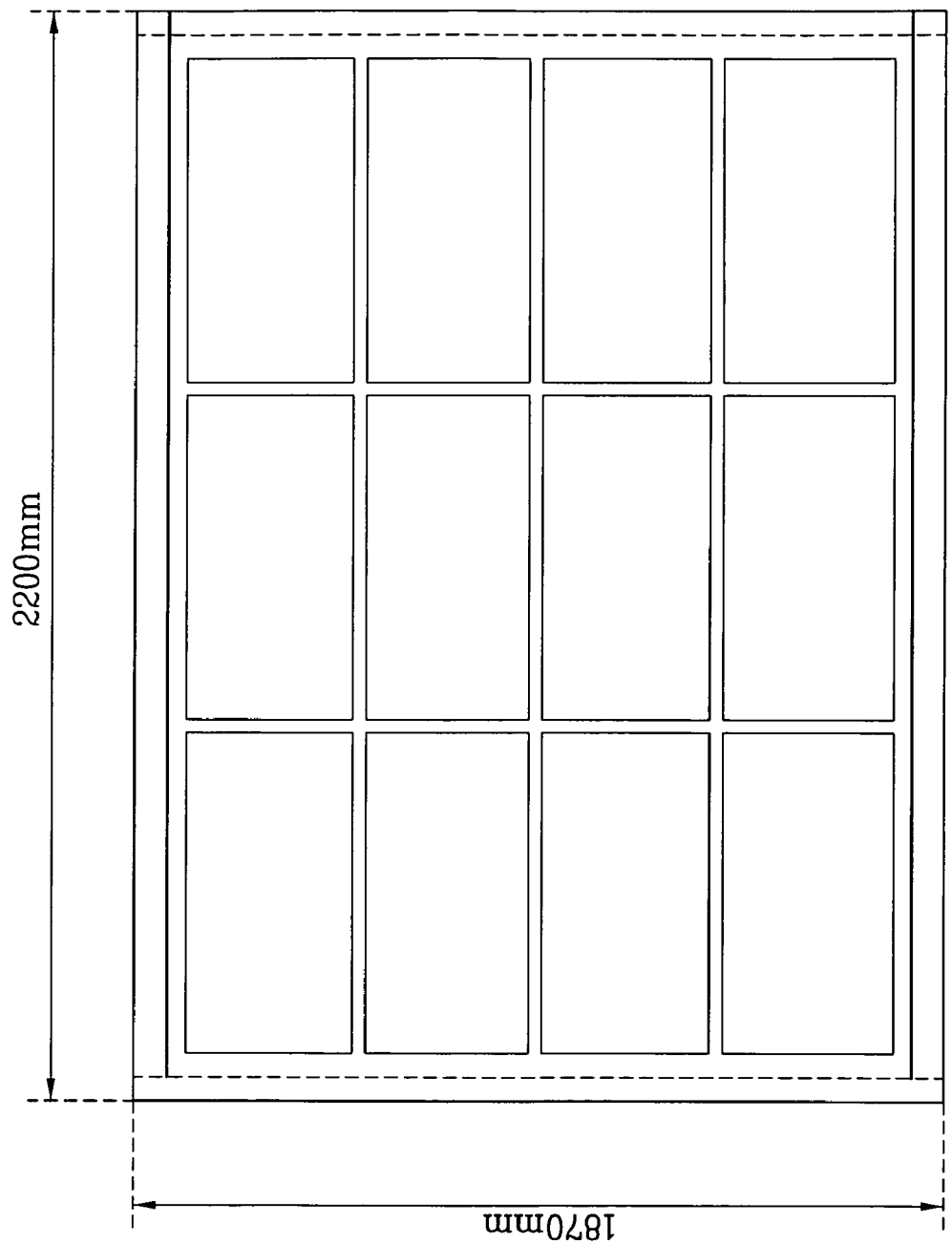

FIG. 12G illustrates the layout of arranging twelve LCD panels (3 column×4 row) of the 32-inch model (panel size of 700×455.5 mm$^2$) on the mother substrate having a size of 1870×2200 mm$^2$. That is, the twelve LCD panels of the 32-inch model are arranged in the matrix type (3 column×4 row), and the major axis of the LCD panel corresponds to the major axis of the mother substrate.

Figure 12H:
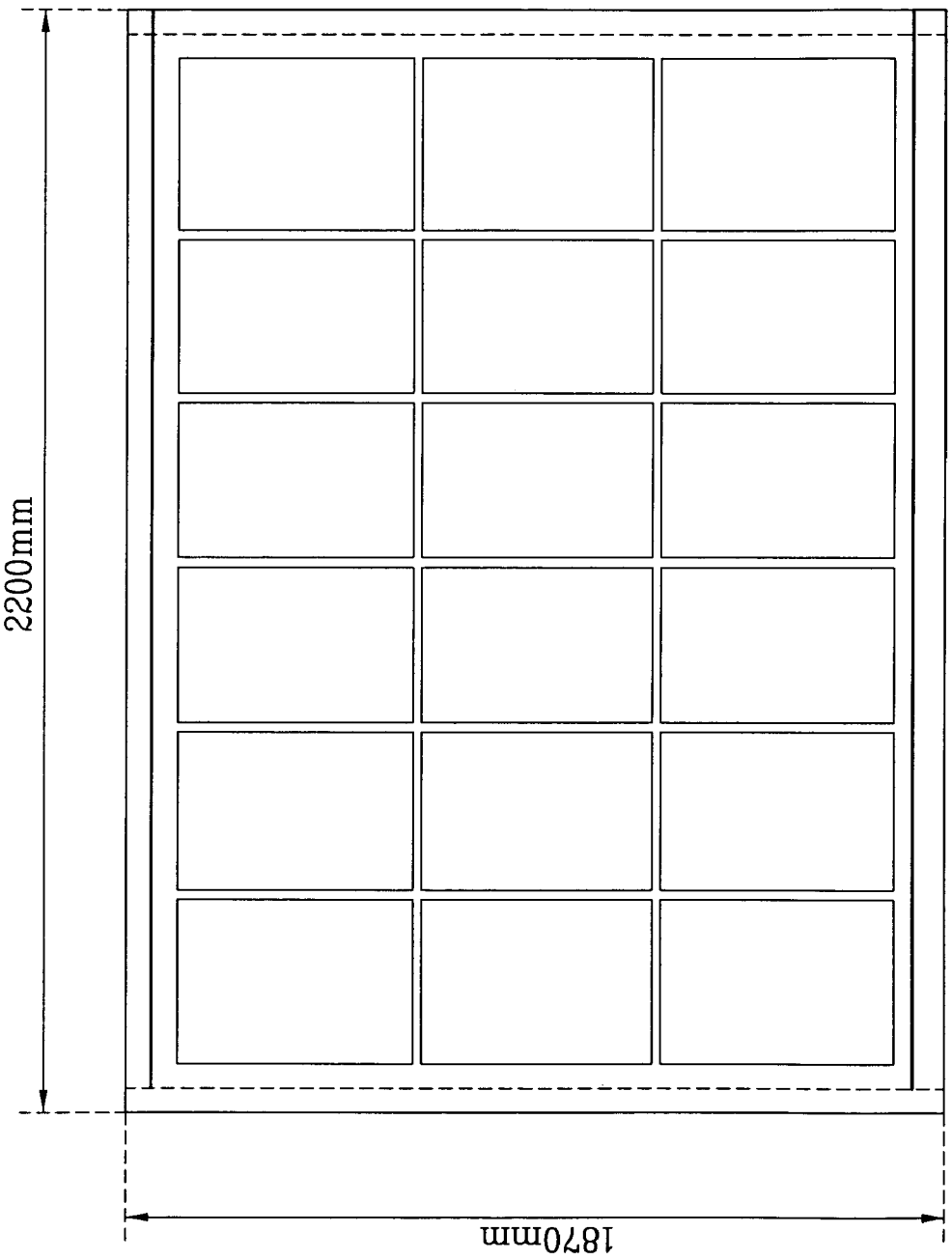

FIG. 12H illustrates the layout of arranging eighteen LCD panels (6 column×3 row) of the 26-inch model (panel size of 565×359 mm$^2$) on the mother substrate having a size of 1870×2200 mm$^2$. That is, the eighteen LCD panels of the 26-inch model are arranged in the matrix type (6 column×3 row), and the major axis of the LCD panel corresponds to the minor axis of the mother substrate.

Figure 12I:
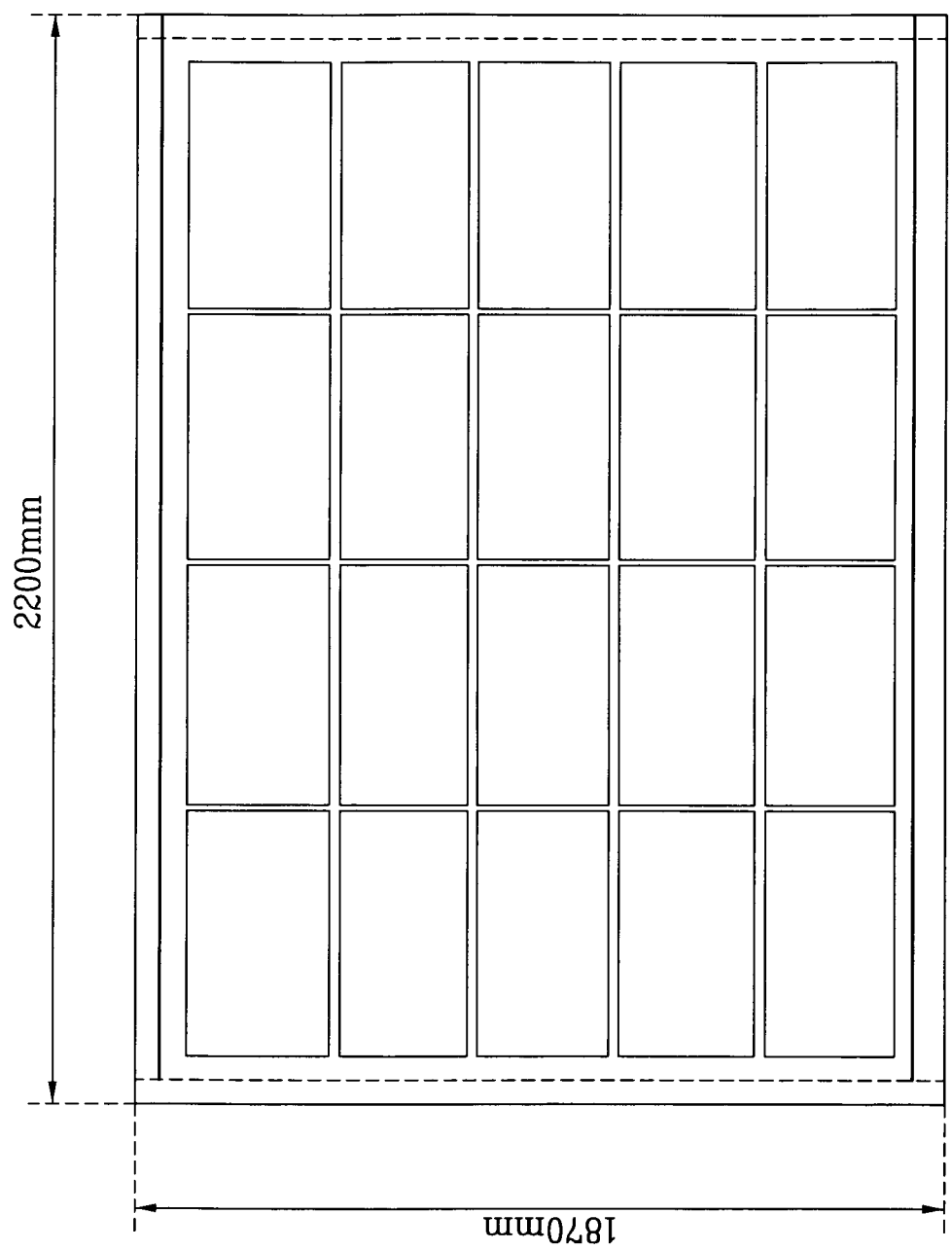

FIG. 12I illustrates the layout of arranging twenty LCD panels (4 column×5 row) of the 24-inch model (panel size of 531.9×337.5 mm$^2$) on the mother substrate having a size of 1870×2200 mm$^2$. That is, the twenty LCD panels of the 24-inch model are arranged in the matrix type (4 column×5 row), and the major axis of the LCD panel corresponds to the major axis of the mother substrate.

Figure 12J:
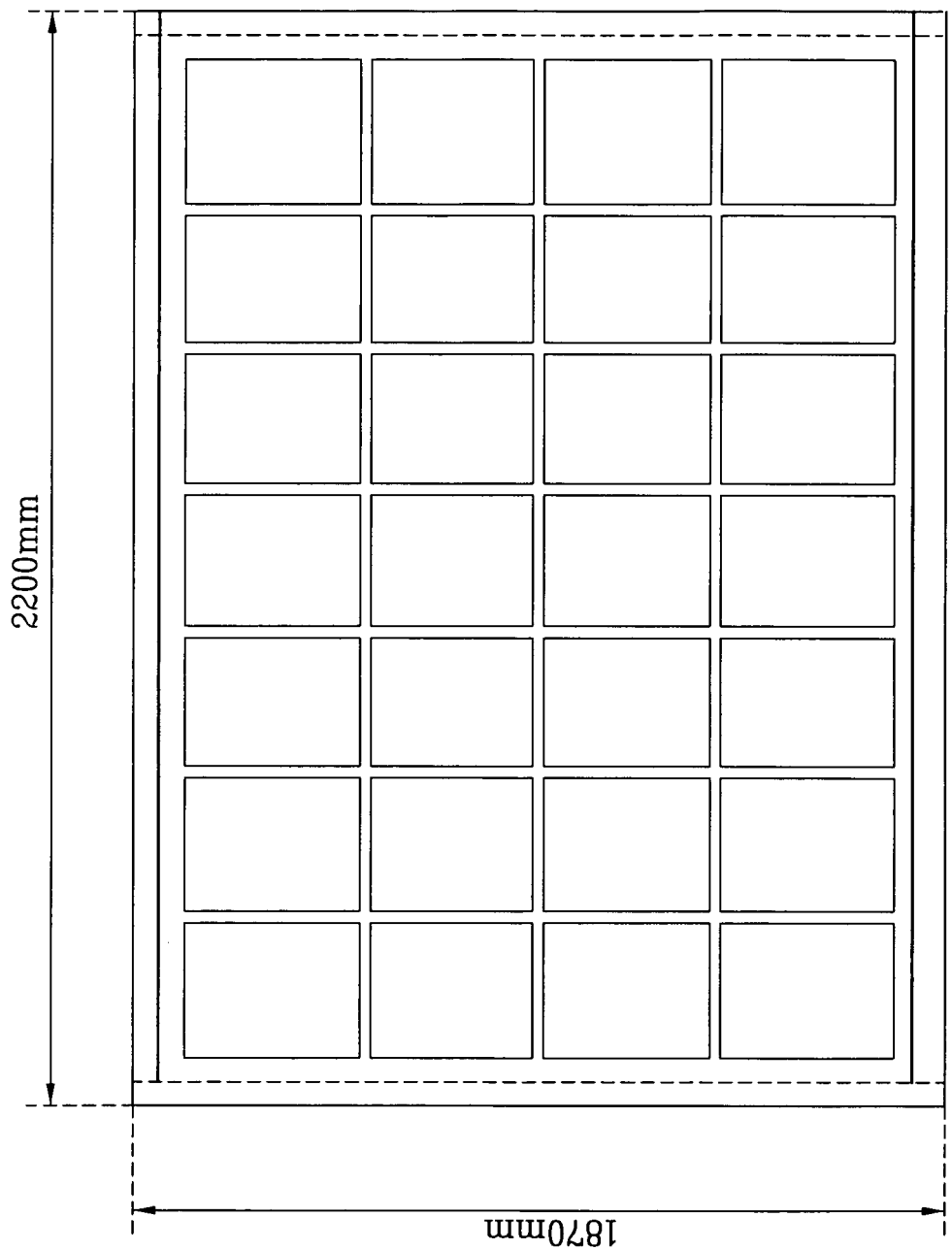

FIG. 12J illustrates the layout of arranging twenty eight LCD panels (7 column×4 row) of 20-inch model (panel size of 447.6×285.1 mm$^2$) on the mother substrate having a size of 1870×2200 mm$^2$. That is, the twenty eight LCD panels of the 20-inch model are arranged in the matrix type (7 column×4 row), and the major axis of the LCD panel corresponds to the minor axis of the mother substrate.

Figure 12K:
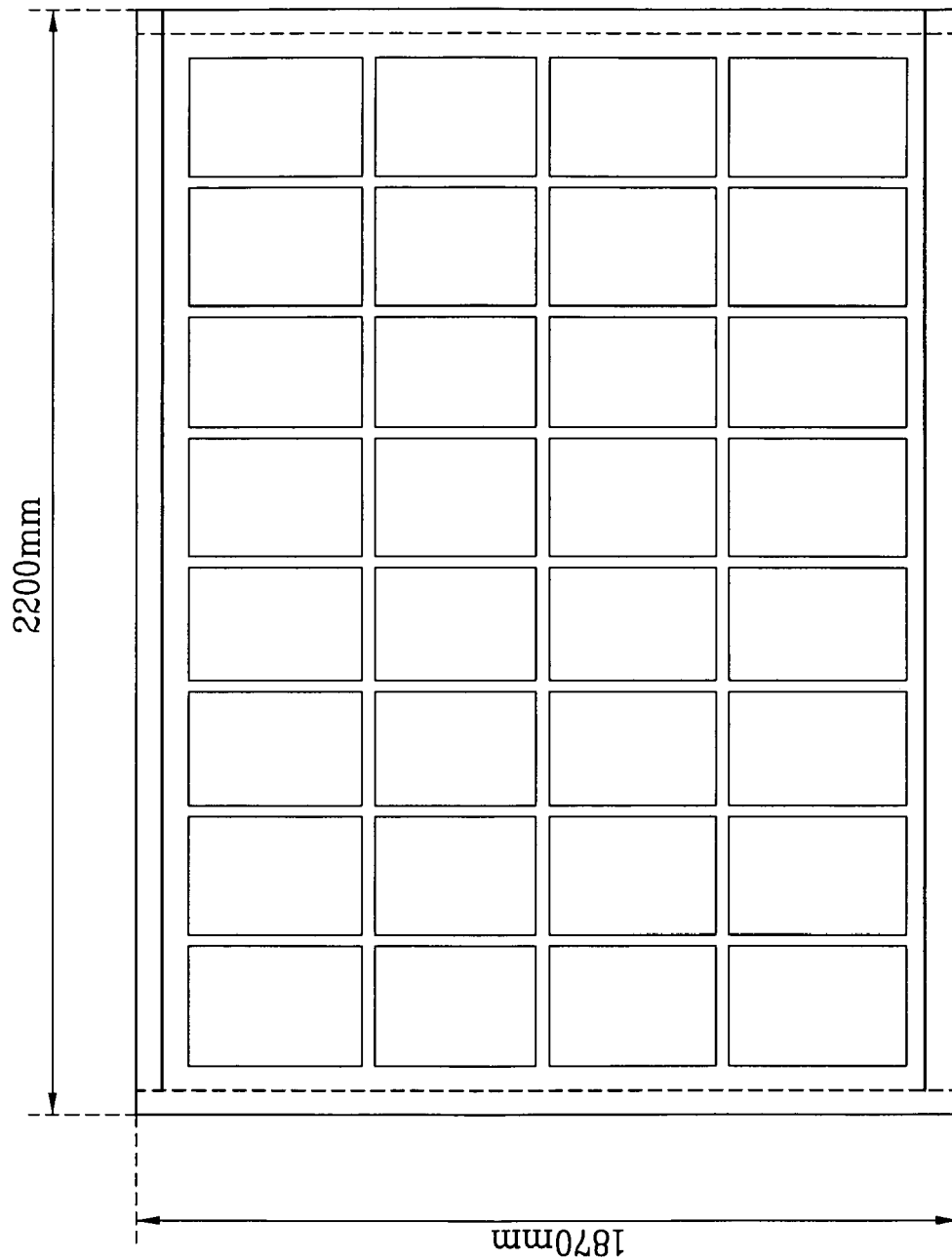

FIG. 12K illustrates the layout of arranging thirty two LCD panels (8 column×4 row) of the 19-inch model (19WU, IPS mode, panel size of 430.2×274.7 mm$^2$) on the mother substrate having a size of 1870×2200 mm$^2$. That is, the thirty two LCD panels of the 19-inch model are arranged in the matrix type (8 column×4 row), and the major axis of the LCD panel corresponds to the minor axis of the mother substrate.

Figure 12L:
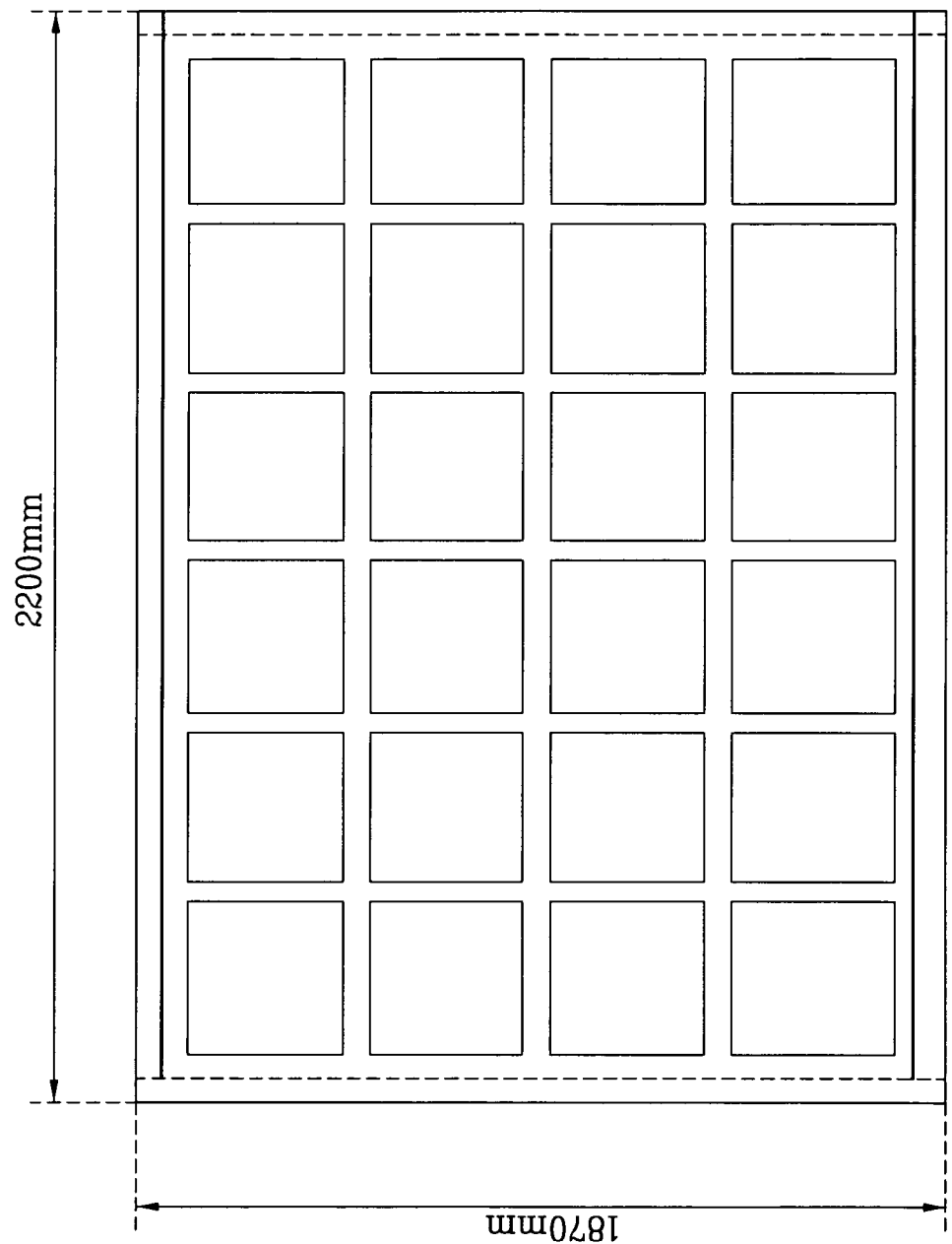

FIG. 12L illustrates the layout of arranging twenty four LCD panels (6 column×4 row) of the 19-inch model (19SX, picture ratio of 5:4, TN mode, virtual diagonal length of 18.97-inch, panel size of 387×312 mm$^2$) on the mother substrate having a size of 1870×2200 mm$^2$. That is, the twenty four LCD panels of the 19-inch model are arranged in the matrix type (6 column×4 row), and the major axis of the LCD panel corresponds to the minor axis of the mother substrate.

Figure 12M:
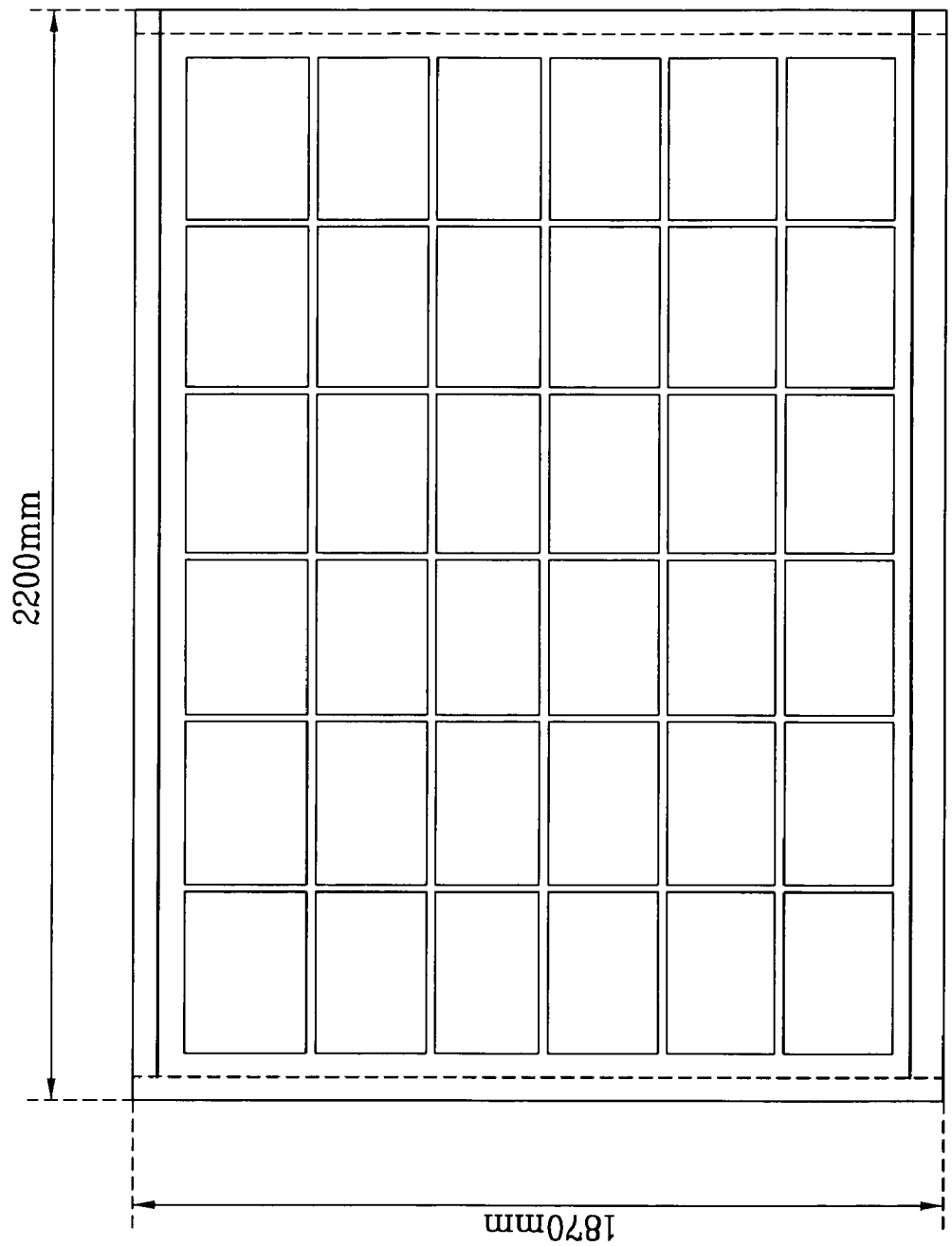

FIG. 12M illustrates the layout of arranging thirty six LCD panels (6 column×6 row) of the 17-inch model (17SX, picture ratio of 5:4, TN mode, virtual diagonal length of 17.04-inch, panel size of 347×278.9 mm$^2$) on the mother substrate having a size of 1870×2200 mm$^2$. That is, the thirty six LCD panels of the 17-inch model are arranged in the matrix type (6 column×6 row), and the major axis of the LCD panel corresponds to the major axis of the mother substrate.

In addition, arranging eight LCD panels of the 47-inch model has a similar size mother substrate as arranging six LCD panels of the 55-inch model. To achieve substrate efficiency of 90% or more, the size of the mother substrate satisfies 2171~2412×2478~2753 mm$^2$ when arranging the eight LCD panels of the 47-inch model, and the size of the mother substrate satisfies 2167~2408×2508~2787 mm$^2$ when arranging the six LCD panels of the 55-inch model. Under these conditions, the optimal size of the mother substrate satisfying the above two cases is 2200×2500 mm$^2$.

The layout of cases for arranging eight LCD panels of the 47-inch model on the mother substrate (2200×2500 mm$^2$) and arranging six LCD panels of the 55-inch model on the mother substrate (2200×2500 mm$^2$) will be explained as follows. FIGS. 13A to 13G are layouts illustrating the respective models on the mother substrate having a size of 2200×2500 mm$^2$, according to the sixth embodiment of the present invention.

Figure 13A:
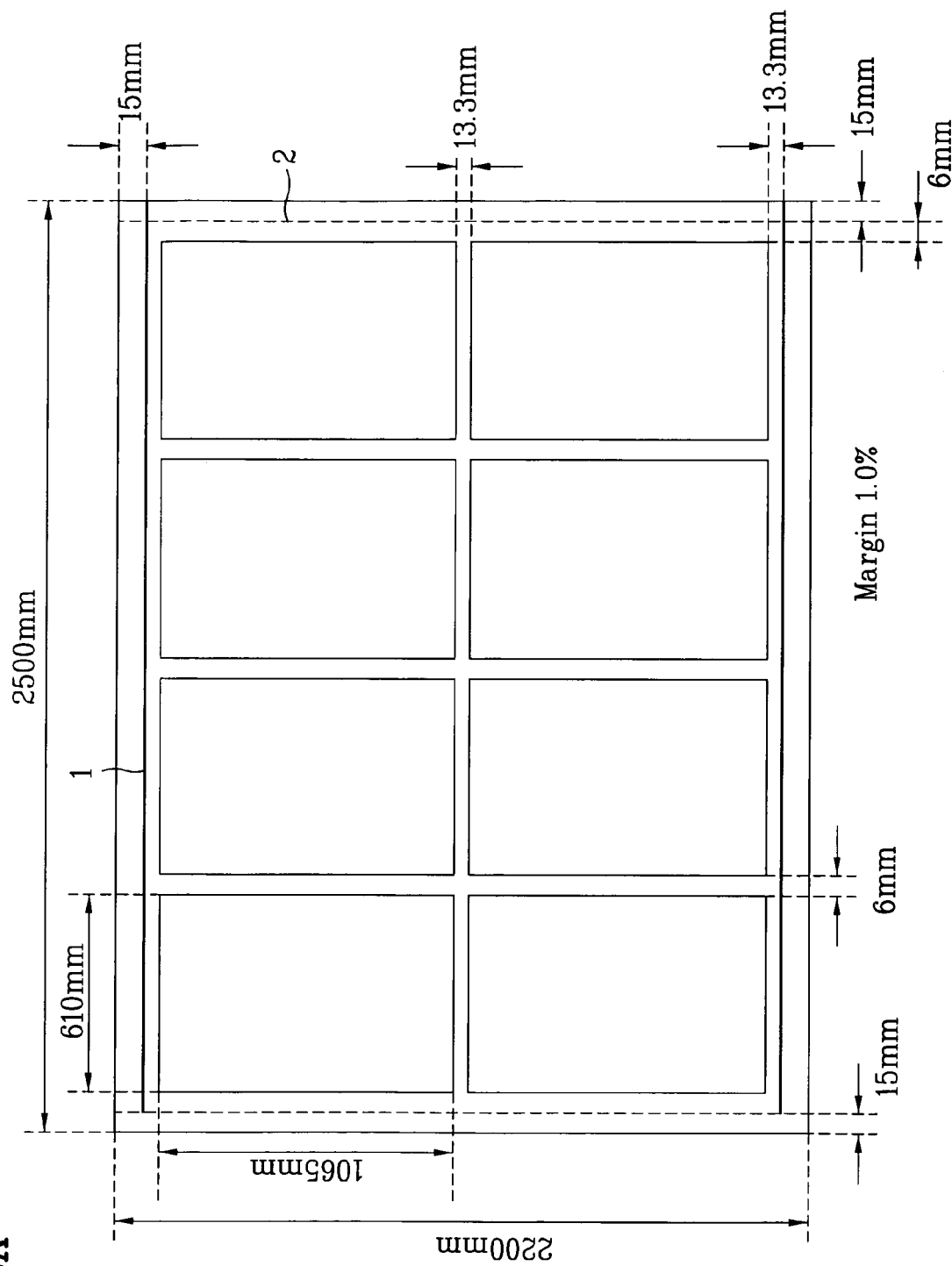
FIGS. 13A to 13G are layouts illustrating the respective models on the mother substrate having a size of 2200×2500 mm², according to the sixth embodiment of the present invention.

FIG. 13A illustrates the layout of arranging eight LCD panels (4 column×2 row) of the 47-inch model (47WU, picture ratio of 16:9, IPS mode, virtual diagonal length of 47.0-inch, panel size of 1065×610.5 mm$^2$) on the mother substrate having a size of 2200×2500 mm$^2$. That is, the process key center (1) is provided at the interval of 15 mm from the edge of the mother substrate in the direction of major axis, and the dummy region (2) is provided at the interval of 15 mm from the edge of the mother substrate in the direction of minor axis. The eight LCD panels of the 47-inch model are arranged in a matrix (4 column×2 row) in the margin of 13.3 mm from the process key center (1), and in the margin of 6 mm from the dummy region (2), wherein the margin between each column is 6 mm, and the margin between each row is 13.3 mm. Accordingly, the margin in the direction of the minor axis of mother substrate is 1.6% of the length of LCD panel, and the margin in the direction of the major axis of mother substrate is 1% of the length of LCD panel. In FIG. 13A, the eight LCD panels of the 47-inch model are arranged in the matrix type (4 column×2 row), and the major axis of the LCD panel corresponds to the minor axis of the mother substrate. Also, the margin value is not limited to the above description, which can be controllable within ±30%.

Figure 13B:
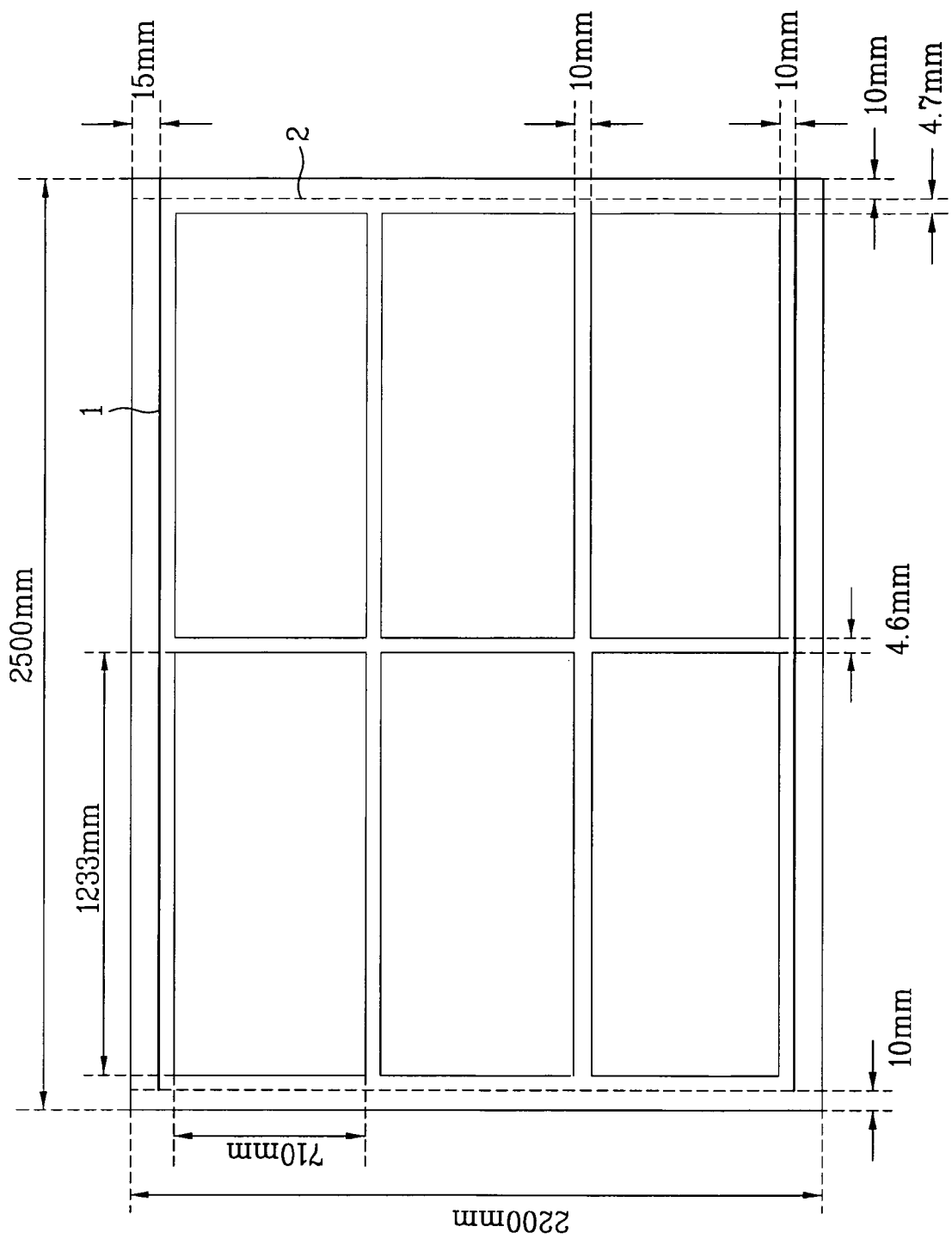

FIG. 13B illustrates the layout of arranging six LCD panels (2 column×3 row) of the 55-inch model (55WU, picture ratio of 16:9, IPS mode, virtual diagonal length of 54.6-inch, panel size of 1233×710 mm$^2$) on the mother substrate having a size of 2200×2500 mm$^2$. That is, the process key center (1) is provided at the interval of 15 mm from the edge of the mother substrate in the direction of major axis, and the dummy region (2) is provided at the interval of 10 mm from the edge of the mother substrate in the direction of minor axis. The six LCD panels of the 55-inch model are arranged in a matrix (2 column×3 row) in the margin of 10 mm from the process key center (1), and in the margin of 4.7 mm from the dummy region (2), wherein the margin between each column is 4.6 mm, and the margin between each row is 10 mm. Accordingly, the margin in the direction of the minor axis of mother substrate is 1.5% of the length of LCD panel, and the margin in the direction of the major axis of mother substrate is 0.4% of the length of LCD panel. In FIG. 13B, the six LCD panels of the 55-inch model are arranged in the matrix type (2 column×3 row), and the major axis of the LCD panel corresponds to the major axis of the mother substrate. Also, the margin value is not limited to the above description, which can be controllable within ±30%.

Figure 13C:
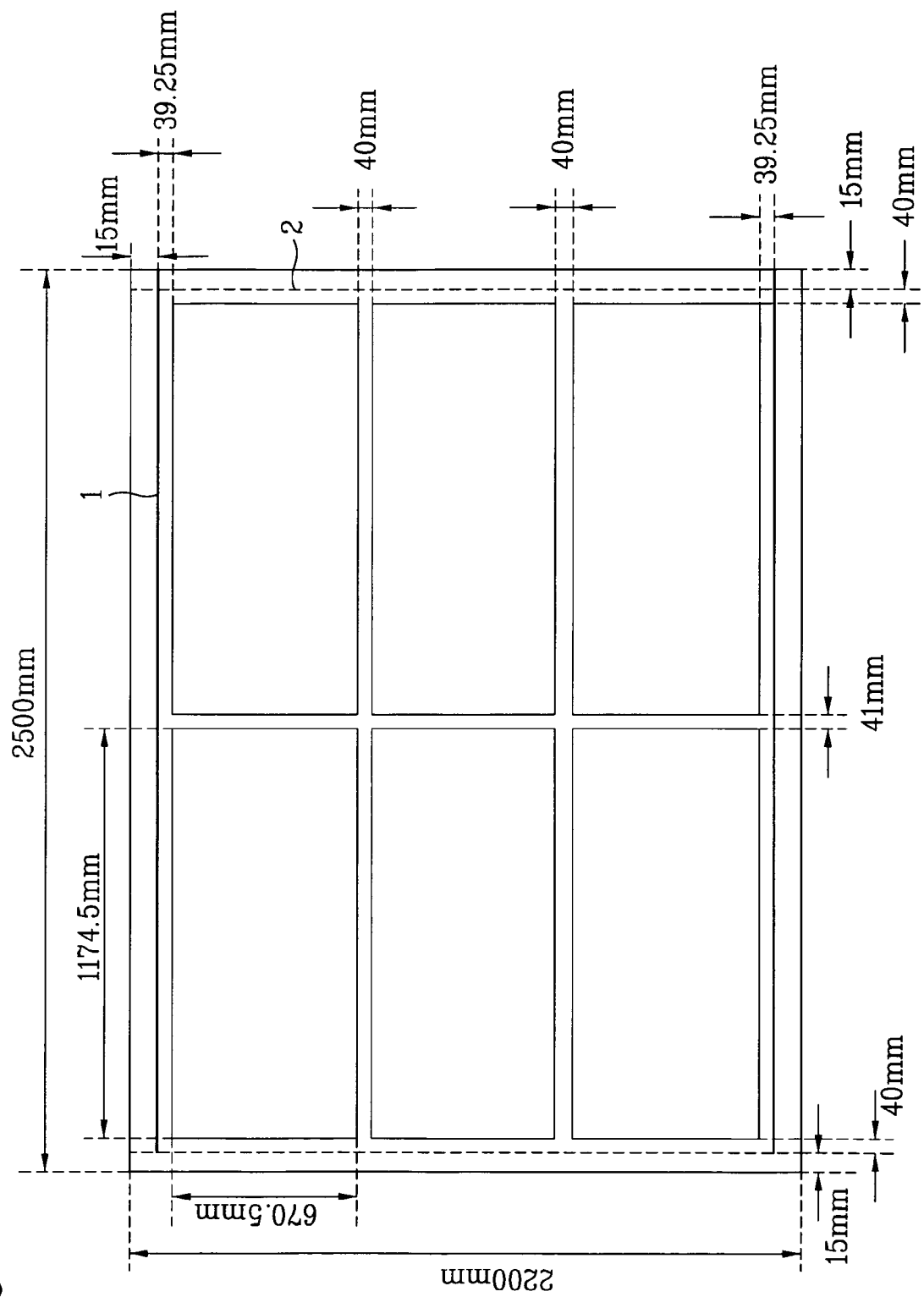

FIG. 13C illustrates the layout of arranging six LCD panels (2 column×3 row) of the 52-inch model (52WU, picture ratio of 16:9, IPS mode, virtual diagonal length of the 52-inch, panel size of 1174.5×670.5 mm$^2$) on the mother substrate having a size of 2200×2500 mm$^2$. That is, the process key center (1) is provided at the interval of 15 mm from the edge of the mother substrate in the direction of major axis, and the dummy region (2) is provided at the interval of 15 mm from the edge of the mother substrate in the direction of minor axis. The six LCD panels of the 52-inch model are arranged in a matrix (2 column×3 row) in the margin of 39.25 mm from the process key center (1), and in the margin of 40 mm from the dummy region (2), wherein the margin between each column is 41 mm, and the margin between each row is 40 mm. Accordingly, the margin in the direction of the minor axis of mother substrate is 6% of the length of LCD panel, and the margin in the direction of the major axis of mother substrate is 3.5% of the length of LCD panel. In FIG. 13B, the six LCD panels of the 52-inch model are arranged in the matrix type (2 column×3 row), and the major axis of the LCD panel corresponds to the major axis of the mother substrate. Also, the margin value is not limited to the above description, which can be controllable within ±30%.

Figure 13D:
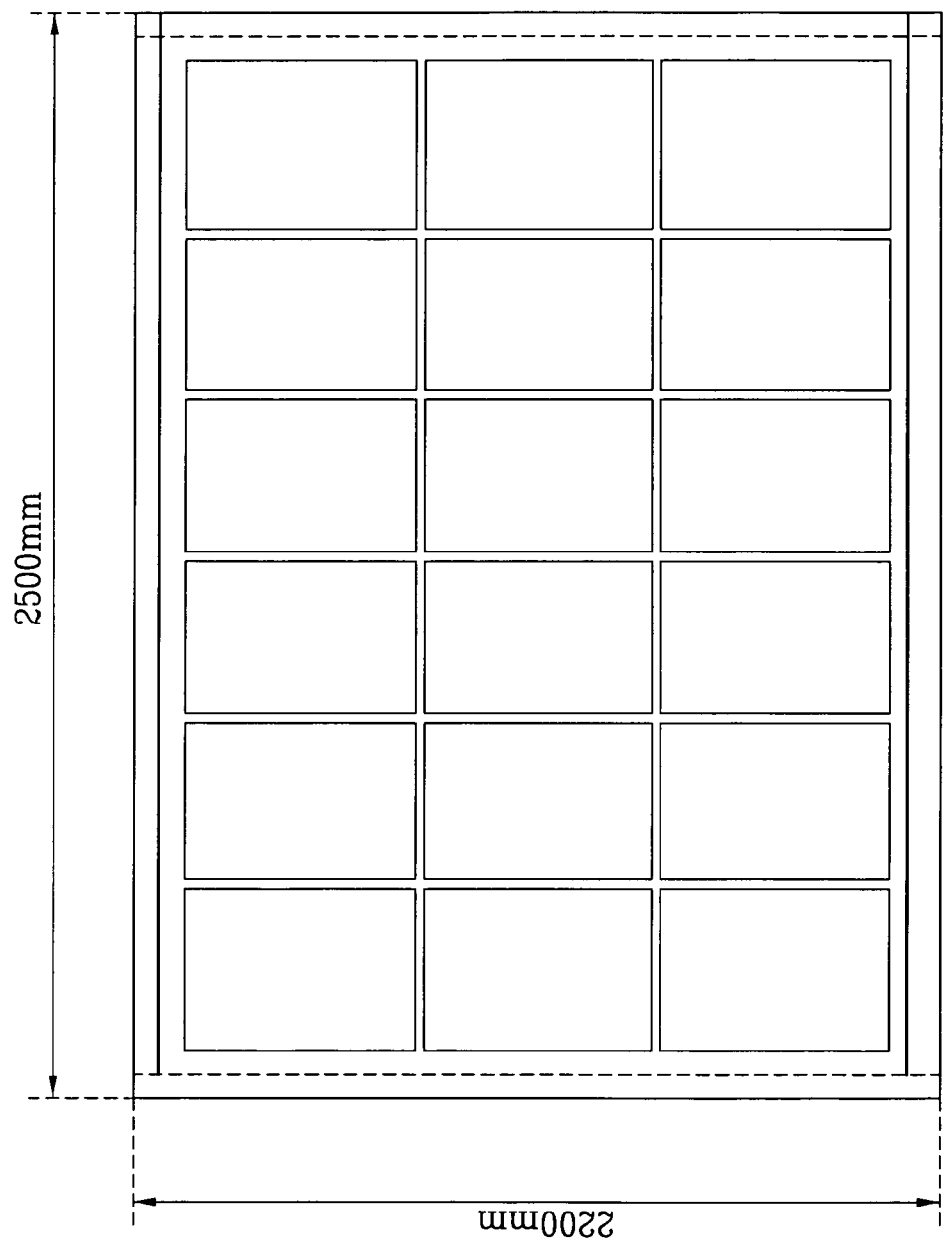

FIG. 13D illustrates the layout of arranging eighteen LCD panels (6 column×3 row) of the 32-inch model (32WX picture ratio of 16:10, IPS mode, virtual diagonal length of 31.5-inch, panel size of 715×413 mm$^2$) on the mother substrate having a size of 2200×2500 mm$^2$. That is, the eighteen LCD panels of the 32-inch model are arranged in the matrix type (6 column×3 row), and the major axis of the LCD panel corresponds to the minor axis of the mother substrate.

Figure 13E:
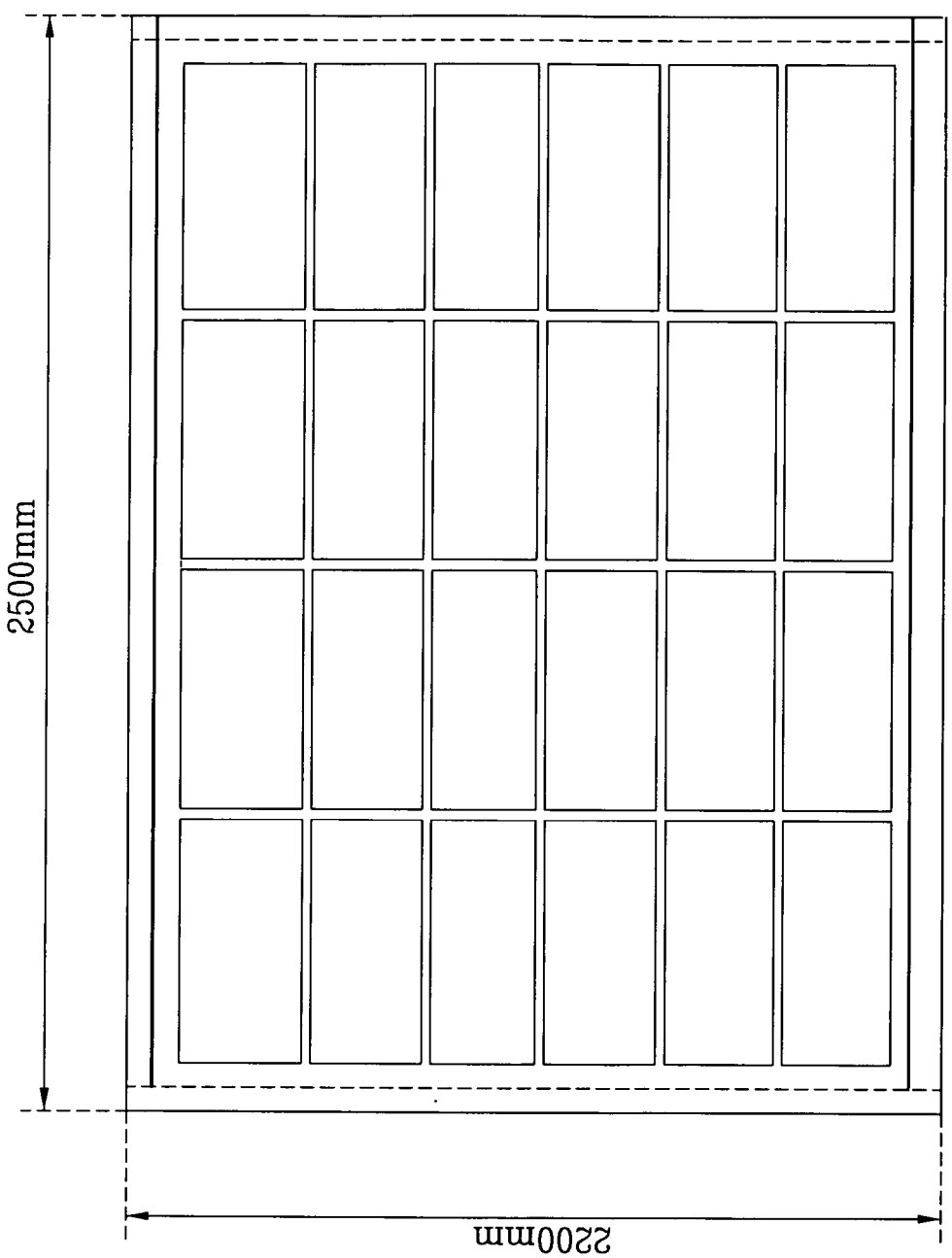

FIG. 13E illustrates the layout of arranging twenty four LCD panels (4 column×6 row) of the 26-inch model (26WX picture ratio of 16:9, IPS mode, virtual diagonal length of the 26-inch, panel size of 590.9×341.5 mm$^2$) on the mother substrate having a size of 2200×2500 mm$^2$. That is, the twenty four LCD panels of the 26-inch model are arranged in the matrix type (4 column×6 row), and the major axis of the LCD panel corresponds to the major axis of the mother substrate.

Figure 13F:
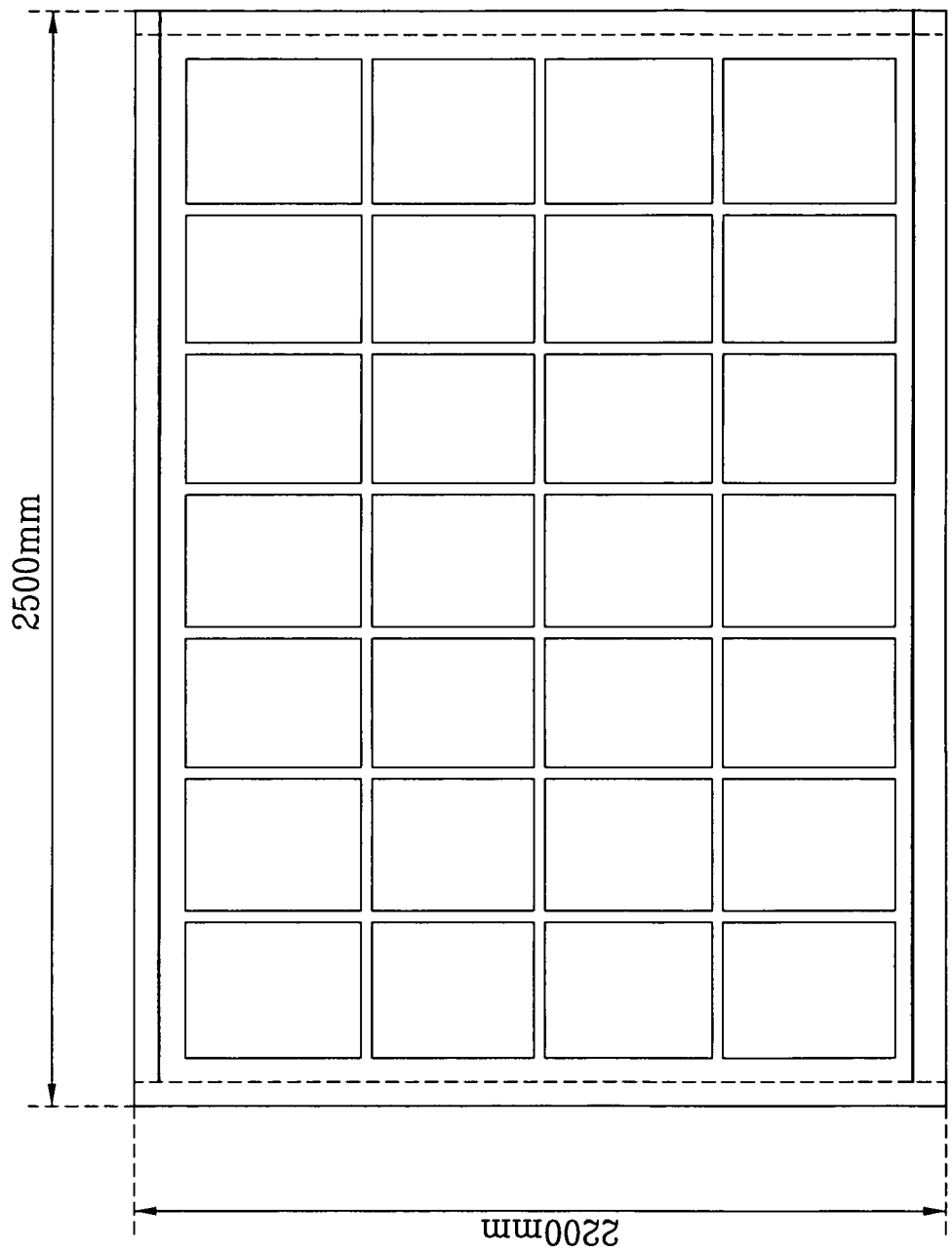

FIG. 13F illustrates the layout of arranging twenty eight LCD panels (7 column×4 row) of the 24-inch model (panel size of 531.9×337.5 mm$^2$) on the mother substrate having a size of 2200×2500 mm$^2$. That is, the twenty eight LCD panels of the 24-inch model are arranged in the matrix type (7 column×4 row), and the major axis of the LCD panel corresponds to the minor axis of the mother substrate.

Figure 13G:
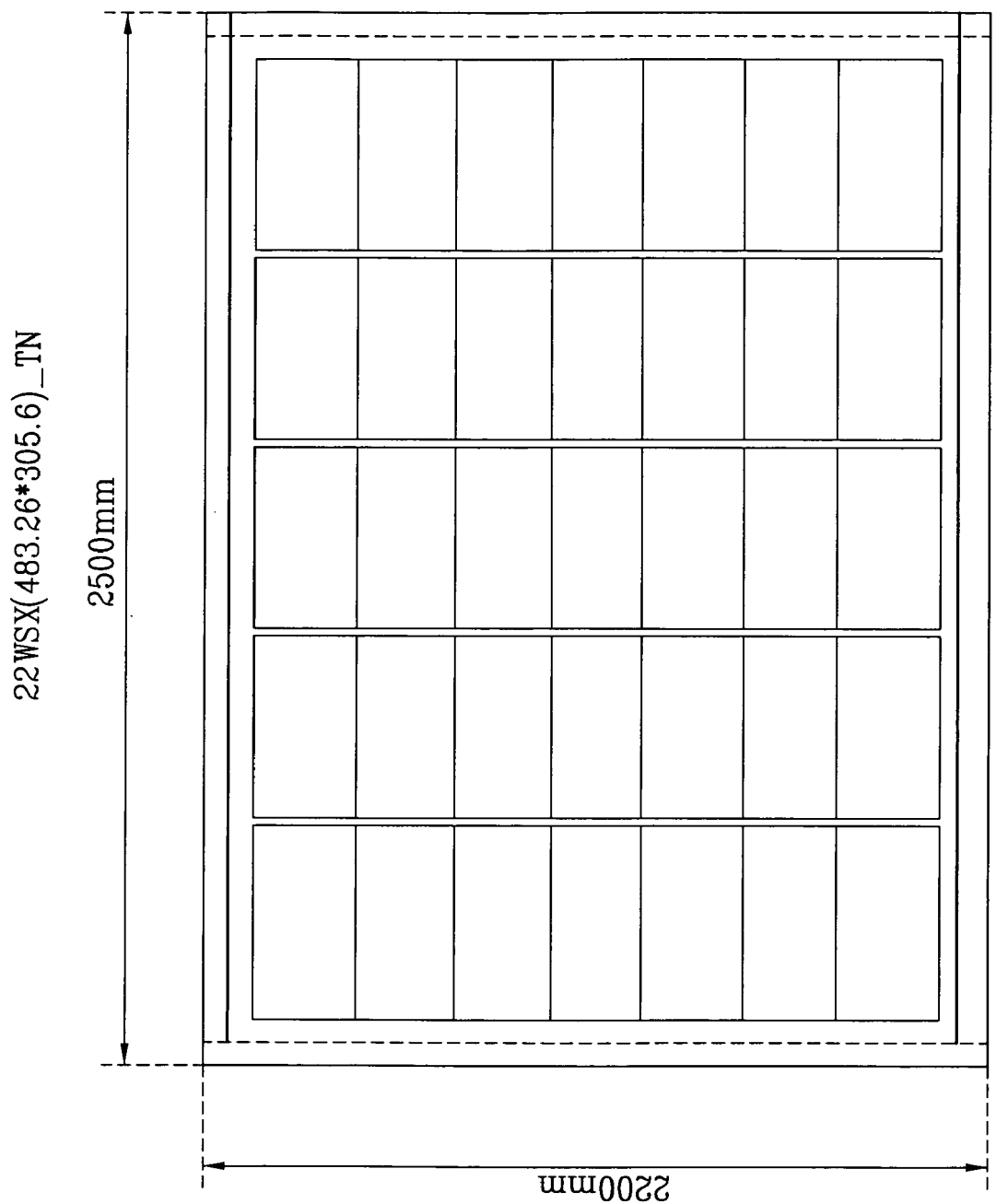

FIG. 13G illustrates the layout of arranging thirty five LCD panels (5 column×7 row) of the 22-inch model (panel size of 483.26×305.6 mm$^2$) on the mother substrate having a size of 2200×2500 mm$^2$. That is, the thirty five LCD panels of the 22-inch model are arranged in the matrix type (5 column×7 row), and the major axis of the LCD panel corresponds to the major axis of the mother substrate.

In addition, arranging eight LCD panels of the 47-inch model has a similar size mother substrate as arranging six LCD panels of the 57-inch model. To achieve substrate efficiency of 90% or more, the size of the mother substrate satisfies 2171~2412×2478~2753 mm$^2$ when arranging the eight LCD panels of the 47-inch model, and the size of the mother substrate satisfies 2167~2408×2508~2787 mm$^2$ when arranging the six LCD panels of the 57-inch model. Under these conditions, the optimal size of the mother substrate satisfying the above two cases is 2230×2600 mm$^2$.

The layout of cases for arranging eight LCD panels of the 47-inch model on the mother substrate (2230×2600 mm$^2$) and arranging six LCD panels of the 57-inch model on the mother substrate (2230×2600 mm$^2$) will be explained as follows. FIGS. 14A to 14J are layouts illustrating the respective models on the mother substrate having a size of 2230×2600 mm$^2$, according to the seventh embodiment of the present invention.

Figure 14A:
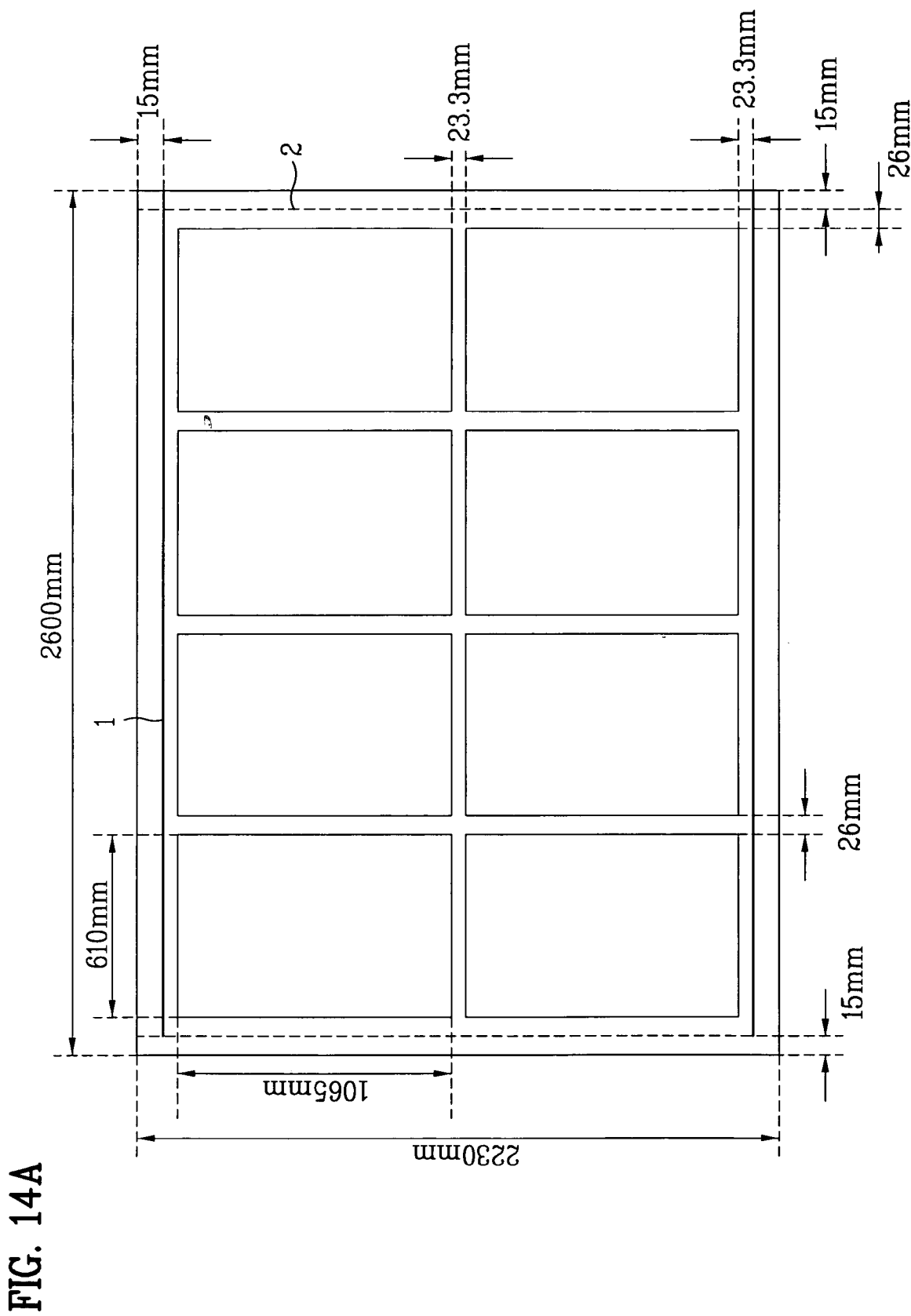
FIGS. 14A to 14J are layouts illustrating the respective models on the mother substrate having a size of 2230×2600 mm², according to the seventh embodiment of the present invention.

FIG. 14A illustrates the layout of arranging eight LCD panels (4 column×2 row) of the 47-inch model (47WU, picture ratio of 16:9, IPS mode, virtual diagonal length of 47.0-inch, panel size of 1065×610.5 mm$^2$) on the mother substrate having a size of 2230×2600 mm$^2$. That is, the process key center (1) is provided at the interval of 15 mm from the edge of the mother substrate in the direction of major axis, and the dummy region (2) is provided at the interval of 15 mm from the edge of the mother substrate in the direction of minor axis. The eight LCD panels of the 47-inch model are arranged in a matrix (4 column×2 row) in the margin of 23.3 mm from the process key center (1), and in the margin of 26 mm from the dummy region (2), wherein the margin between each column is 26 mm, and the margin between each row is 23.3 mm. Accordingly, the margin in the direction of the minor axis of mother substrate is 2.2% of the length of LCD panel, and the margin in the direction of the major axis of mother substrate is 4.3% of the length of LCD panel. In FIG. 14A, the eight LCD panels of the 47-inch model are arranged in the matrix type (4 column×2 row), and the major axis of the LCD panel corresponds to the minor axis of the mother substrate. Also, the margin value is not limited to the above description, which can be controllable within ±30%.

Figure 14B:
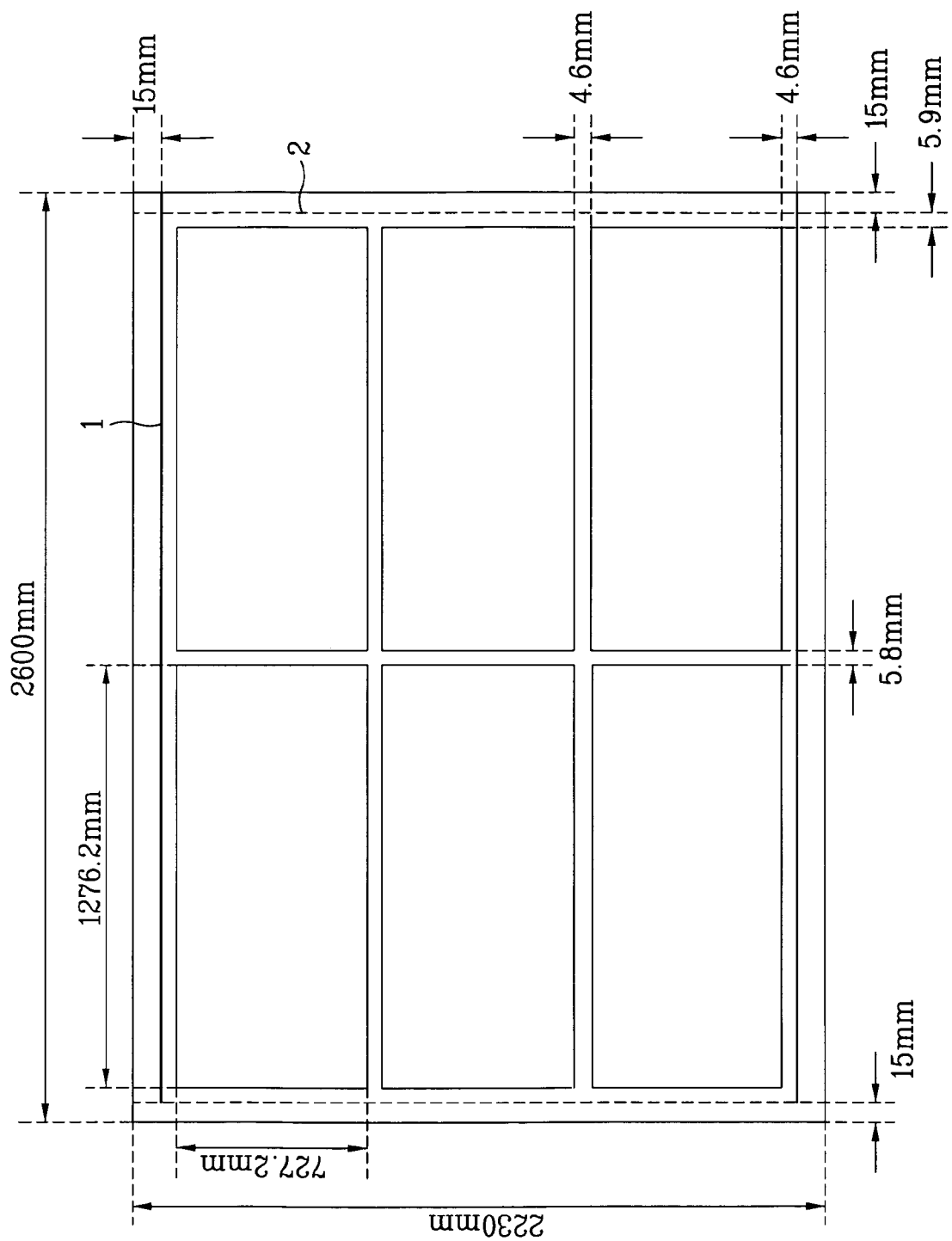

FIG. 14B illustrates the layout of arranging six LCD panels (2 column×3 row) of the 57-inch model (57WU, picture ratio of 16:9, IPS mode, virtual diagonal length of 57.0-inch, panel size of 1276.2×727.2 mm$^2$) on the mother substrate having a size of 2230×2600 mm$^2$. That is, the process key center (1) is provided at the interval of 15 mm from the edge of the mother substrate in the direction of major axis, and the dummy region (2) is provided at the interval of 15 mm from the edge of the mother substrate in the direction of minor axis. The six LCD panels of the 57-inch model are arranged in a matrix (2 column×3 row) in the margin of 4.6 mm from the process key center (1), and in the margin of 5.9 mm from the dummy region (2), wherein the margin between each column is 5.8 mm, and the margin between each row is 4.6 mm. Accordingly, the margin in the direction of the minor axis of mother substrate is 0.6% of the length of LCD panel, and the margin in the direction of the major axis of mother substrate is 0.5% of the length of LCD panel. In FIG. 14B, the six LCD panels of the 57-inch model are arranged in the matrix type (2 column×3 row), and the major axis of the LCD panel corresponds to the major axis of the mother substrate. Also, the margin value is not limited to the above description, which can be controllable within ±30%.

Figure 14C:
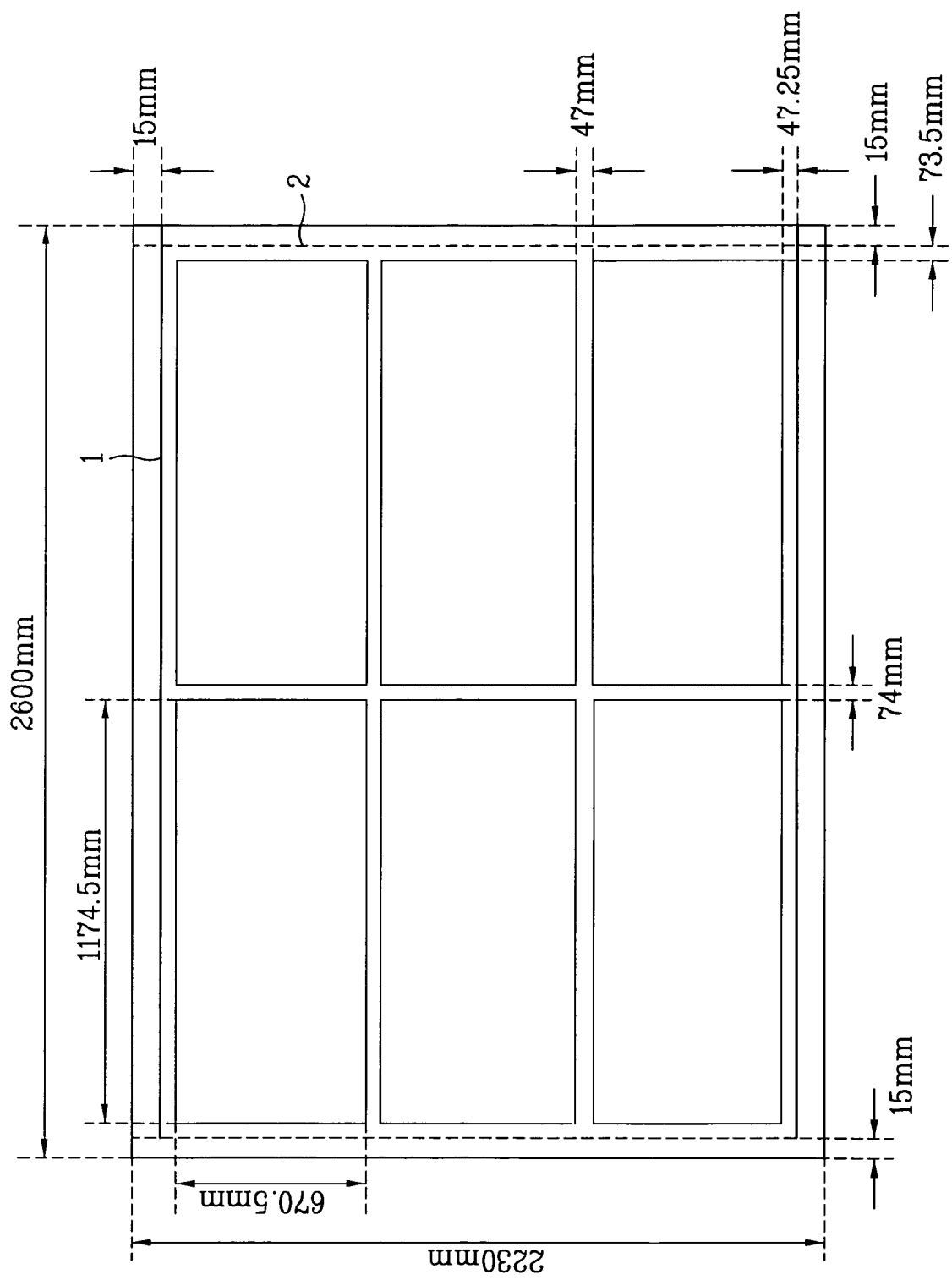

FIG. 14C illustrates the layout of arranging six LCD panels (2 column×3 row) of the 52-inch model (52WU, picture ratio of 16:9, IPS mode, virtual diagonal length of the 52-inch, panel size of 1174.5×670.5 mm$^2$) on the mother substrate having a size of 2230×2600 mm$^2$. That is, the process key center (1) is provided at the interval of 15 mm from the edge of the mother substrate in the direction of major axis, and the dummy region (2) is provided at the interval of 15 mm from the edge of the mother substrate in the direction of minor axis. The six LCD panels of the 52-inch model are arranged in a matrix (2 column×3 row) in the margin of 47.25 mm from the process key center (1), and in the margin of 73.5 mm from the dummy region (2), wherein the margin between each column is 74 mm, and the margin between each row is 47 mm. Accordingly, the margin in the direction of the minor axis of mother substrate is 7% of the length of LCD panel, and the margin in the direction of the major axis of mother substrate is 6.3% of the length of LCD panel. In FIG. 14C, the six LCD panels of the 52-inch model are arranged in the matrix type (2 column×3 row), and the major axis of the LCD panel corresponds to the major axis of the mother substrate. Also, the margin value is not limited to the above description, which can be controllable within ±30%.

Figure 14D:
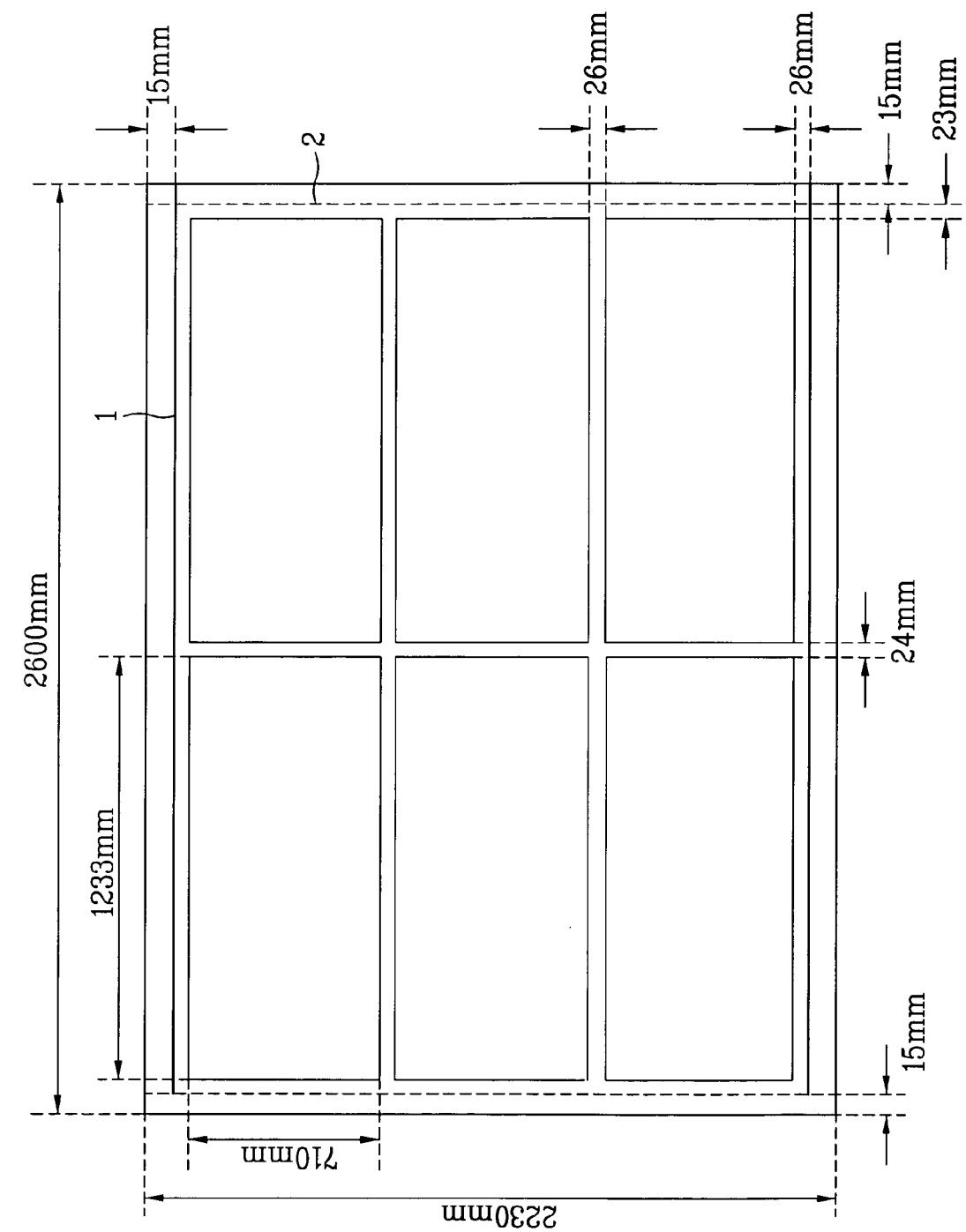

FIG. 14D illustrates the layout of arranging six LCD panels (2 column×3 row) of the 55-inch model (55WU, picture ratio of 16:9, IPS mode, virtual diagonal length of 54.6-inch, panel size of 1233×710 mm$^2$) on the mother substrate having a size of 2230×2600 mm$^2$. That is, the process key center (1) is provided at the interval of 15 mm from the edge of the mother substrate in the direction of major axis, and the dummy region (2) is provided at the interval of 15 mm from the edge of the mother substrate in the direction of minor axis. The six LCD panels of the 55-inch model are arranged in a matrix (2 column×3 row) in the margin of 26 mm from the process key center (1), and in the margin of 23 mm from the dummy region (2), wherein the margin between each column is 24 mm, and the margin between each row is 26 mm. Accordingly, the margin in the direction of the minor axis of mother substrate is 3.7% of the length of LCD panel, and the margin in the direction of the major axis of mother substrate is 1.9% of the length of LCD panel. In FIG. 14D, the six LCD panels of the 55-inch model are arranged in the matrix type (2 column×3 row), and the major axis of the LCD panel corresponds to the major axis of the mother substrate. Also, the margin value is not limited to the above description, which can be controllable within ±30%.

Figure 14E:
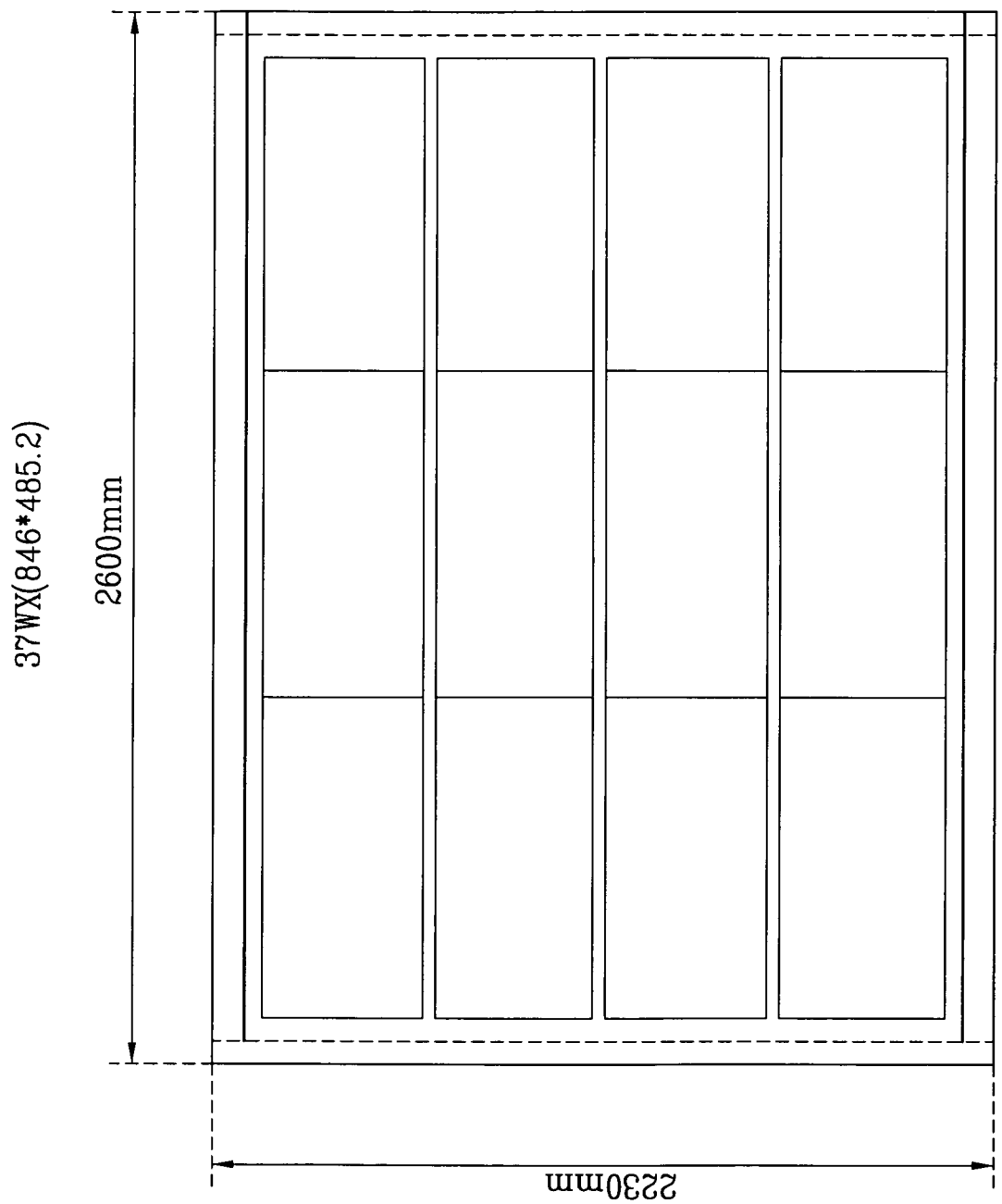

FIG. 14E illustrates the layout of arranging twelve LCD panels (3 column×4 row) of the 37-inch model (37WU, picture ratio of 16:9, IPS mode, virtual diagonal length of the 37-inch, panel size of 846.0×485.2 mm$^2$) on the mother substrate having a size of 2230×2600 mm$^2$. That is, the twelve LCD panels of the 37-inch model are arranged in a matrix (3 column×4 row) in the similar margin mentioned above, and the major axis of the LCD panel corresponds to the major axis of the mother substrate.

Figure 14F:
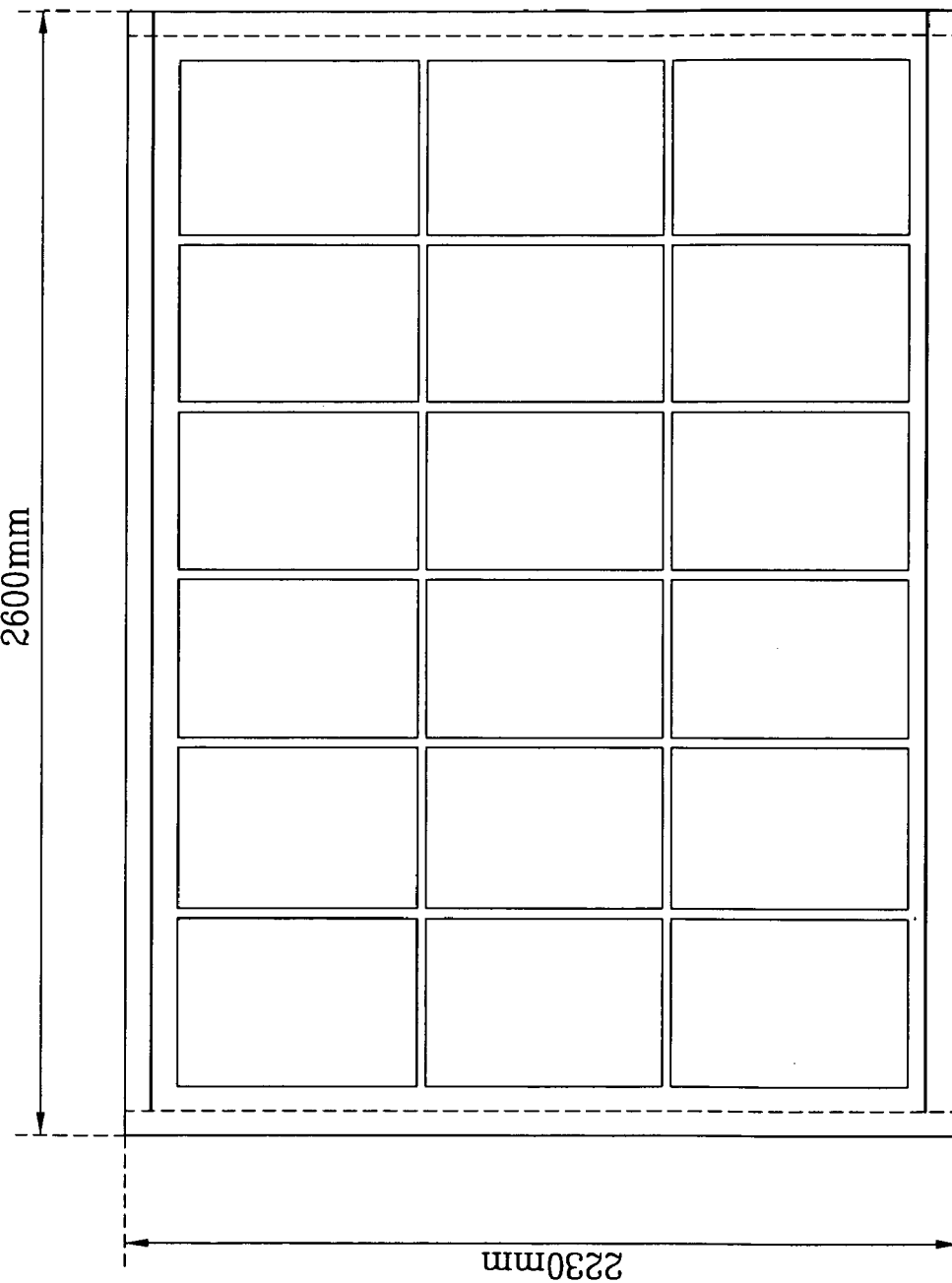

FIG. 14F illustrates the layout of arranging eighteen LCD panels (6 column×3 row) of the 32-inch model (32WX, picture ratio of 16:9, IPS mode, virtual diagonal length of 31.5-inch, panel size of 715.0×413.05 mm$^2$) on the mother substrate having a size of 2230×2600 mm$^2$. That is, the eighteen LCD panels of the 32-inch model are arranged in a matrix (6 column×3 row) in the similar margin mentioned above, and the major axis of the LCD panel corresponds to the minor axis of the mother substrate.

Figure 14G:
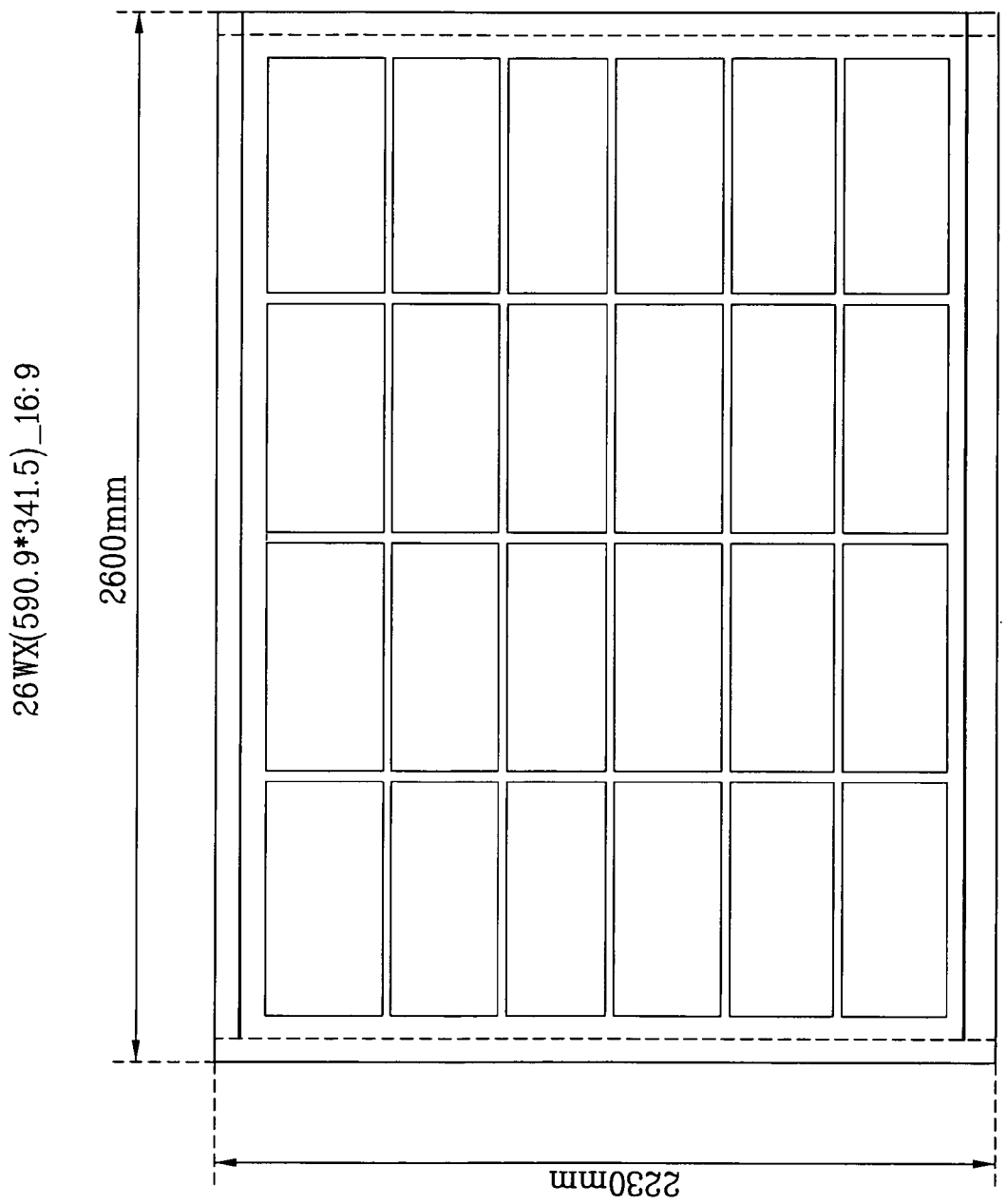

FIG. 14G illustrates the layout of arranging twenty four LCD panels (4 column×6 row) of the 26-inch model (26WX, picture ratio of 16:9, IPS mode, virtual diagonal length of the 26-inch, panel size of 590.9×341.5 mm$^2$) on the mother substrate having a size of 2230×2600 mm$^2$. That is, the twenty four LCD panels of the 26-inch model are arranged in a matrix (4 column×6 row) in the similar margin mentioned above, and the major axis of the LCD panel corresponds to the major axis of the mother substrate.

Figure 14H:
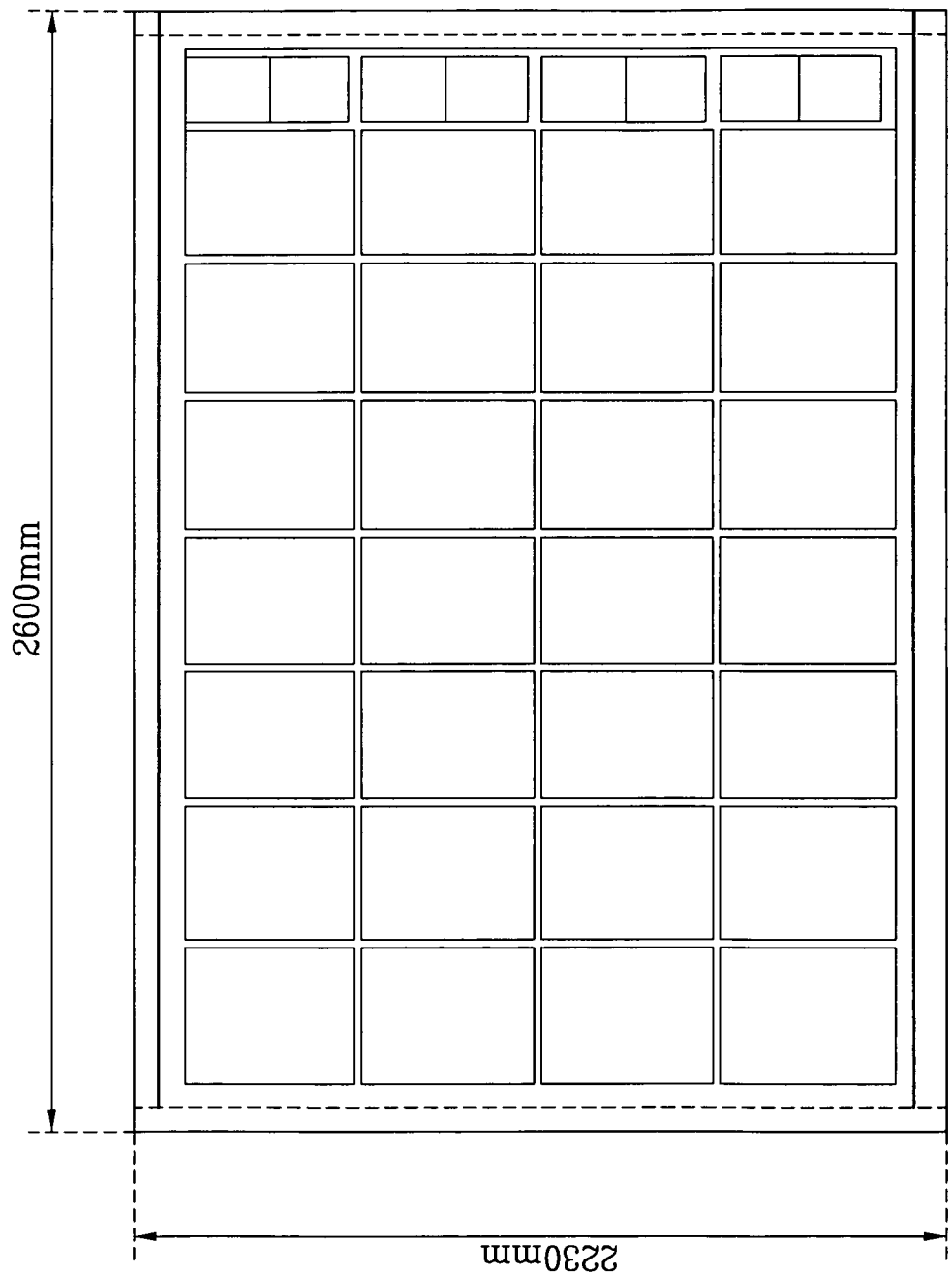

FIG. 14H illustrates the layout of arranging twenty eight LCD panels (7 column×4 row) of the 24-inch model (panel size of 531.9×337.5 mm$^2$) on the mother substrate having a size of 2230×2600 mm$^2$, and arranging eight LCD panels of 10.2-inch model (10W, picture ratio of 15:9, IPS mode, panel size of 233.8×145.7 mm$^2$) as one column on the mother substrate. That is, the twenty eight LCD panels of the 24-inch model are arranged in a matrix (7 column×4 row), and the eight LCD panels of 10-inch model are arranged as one column in the similar margin mentioned above, wherein the major axis of the LCD panel corresponds to the minor axis of the mother substrate.

Figure 14I:
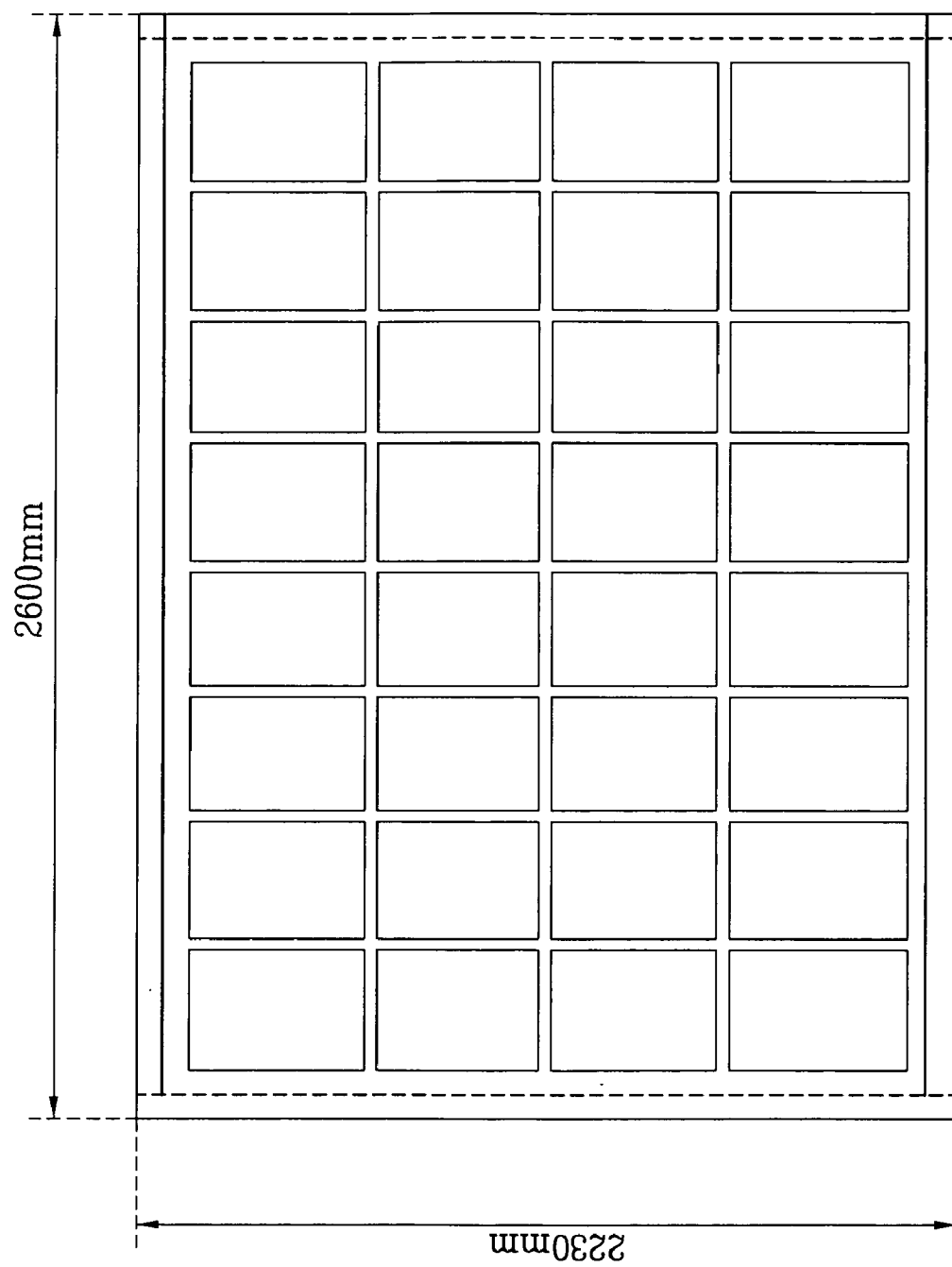

FIG. 14I illustrates the layout of arranging thirty two LCD panels (8 column×4 row) of the 23-inch model (panel size of 504.86×319.1 mm$^2$) on the mother substrate having a size of 2230×2600 mm$^2$. That is, the thirty two LCD panels of the 23-inch model are arranged in a matrix (8 column×4 row) in the similar margin mentioned above, wherein the major axis of the LCD panel corresponds to the minor axis of the mother substrate.

Figure 14J:
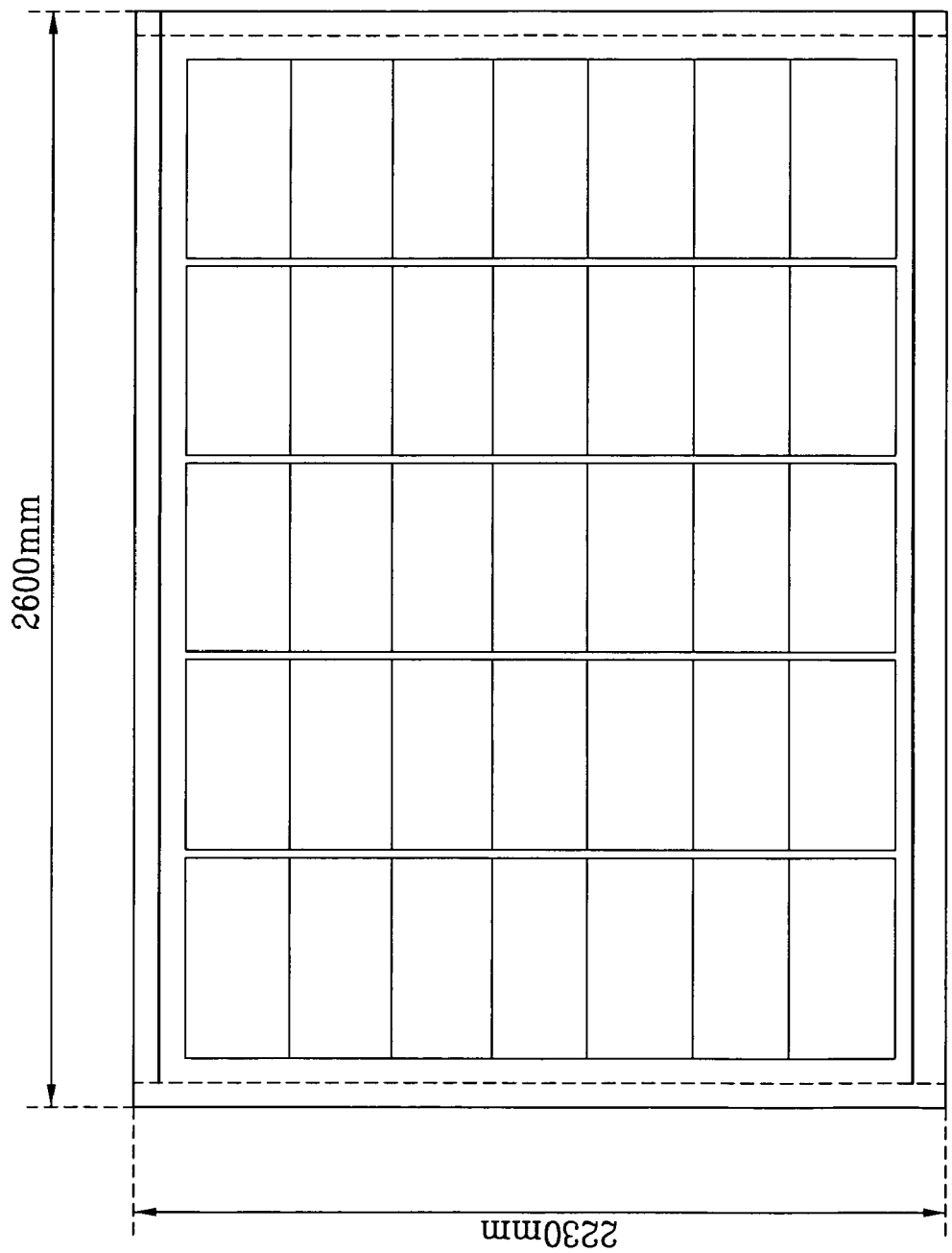

FIG. 14J illustrates the layout of arranging thirty five LCD panels (5 column×7 row) of the 22-inch model (panel size of 483.26×305.6 mm$^2$) on the mother substrate having a size of 2230×2600 mm$^2$. That is, the thirty five LCD panels of the 22-inch model are arranged in a matrix (5 column×7 row) in the similar margin mentioned above, wherein the major axis of the LCD panel corresponds to the major axis of the mother substrate.

As mentioned above, the layout of the LCD panel and the substrate size according to the present invention has the following advantages.

First, it is possible to provide the size of the mother substrate which can realize the substrate efficiency of 90% or more in the respective models, to thereby decrease the manufacturing cost.

Also, it is possible to provide the data for arranging the LCD panels of the same model or the different models at maximum on the mother substrate having the predetermined size, thereby improving the productivity with the maximum substrate efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of arranging LCD panels on mother substrates, comprising:
    setting a length of a minor axis of each of a plurality of mother substrates to be between approximately 50.333L+D+18.673 millimeters and 45.299L+D+13.805 millimeters, where L is a diagonal length, in inches, of each of eight LCD panels formed on a first of said mother substrates, and D is the total width, in millimeters, of a plurality of dummy regions of the first mother substrate;
    setting a length of a major axis of each mother substrate to be between approximately 51.509L+D+33.636 millimeters and 57.232L+D+40.707 millimeters; and
    forming the eight LCD panels on the first mother substrate.
2. The method of claim 1, wherein D=30 mm.
3. The method of claim 1, further comprising:
    setting the length of the minor axis of each mother substrate to be between approximately 42.96L$_2$+61.387 millimeters and 38.664L$_2$+55.248 millimeters, where L$_2$ is a diagonal length, in inches, of each of six LCD panels formed on a second of said mother substrates, and D is the total width, in millimeters, of a plurality of dummy regions of the second mother substrate.
4. The method of claim 3, further comprising:
    setting the length of the major axis of each mother substrate to be between approximately 50.333L$_2$+48.673 millimeters and 45.299L$_2$+43.805 millimeters; and
    forming the six LCD panels on the second mother substrate.

\* \* \* \* \*